(12) United States Patent
Viswanathan et al.

(10) Patent No.: US 11,775,348 B2
(45) Date of Patent: Oct. 3, 2023

(54) MANAGING CUSTOM WORKFLOWS FOR DOMAIN OBJECTS DEFINED WITHIN MICROSERVICES

(71) Applicant: OneTrust, LLC, Atlanta, GA (US)

(72) Inventors: Subramanian Viswanathan, San Ramon, CA (US); Milap Shah, Bengaluru (IN)

(73) Assignee: OneTrust, LLC, Atlanta, GA (US)

(*) Notice: Subject to any disclaimer, the term of this patent is extended or adjusted under 35 U.S.C. 154(b) by 0 days.

(21) Appl. No.: 17/674,187

(22) Filed: Feb. 17, 2022

(65) Prior Publication Data

US 2022/0261288 A1     Aug. 18, 2022

Related U.S. Application Data

(60) Provisional application No. 63/150,299, filed on Feb. 17, 2021.

(51) Int. Cl.
    *G06F 9/50*             (2006.01)

(52) U.S. Cl.
    CPC .............. *G06F 9/5027* (2013.01); *G06F 9/50* (2013.01); *G06F 9/5061* (2013.01); *G06F 9/5077* (2013.01)

(58) Field of Classification Search
    CPC ........ G06F 9/50; G06F 9/5027; G06F 9/5061; G06F 9/5077
    See application file for complete search history.

(56) References Cited

U.S. PATENT DOCUMENTS

| | | | |
|---|---|---|---|
| 4,536,866 | A | 8/1985 | Jerome et al. |
| 4,574,350 | A | 3/1986 | Starr |
| 5,193,162 | A | 3/1993 | Bordsen et al. |

(Continued)

FOREIGN PATENT DOCUMENTS

| | | |
|---|---|---|
| CN | 111496802 | 8/2020 |
| CN | 112115859 | 12/2020 |

(Continued)

OTHER PUBLICATIONS

Bao et al, "Performance Modelling and Workflow Scheduling of Microservice-Based Applications in Clouds", IEEE Transactions On Parallel and Distributed Systems, vol. 30, No. 9, Sep. 2019, pp. 2101-2116 (Year: 2019).*

(Continued)

*Primary Examiner* — Charles M Swift
(74) *Attorney, Agent, or Firm* — Keller Preece PLLC

(57) ABSTRACT

In general, various aspects of the present invention provide methods, apparatuses, systems, computing devices, computing entities, and/or the like for generating and managing custom workflows for domain objects defined within microservices. In accordance with various aspects, a method is that comprises: receiving an attribute value for a custom workflow to include in a microservice that corresponds to an attribute defined for a workflow component; accessing mapping data for an attribute; identifying, based on the mapping data, a corresponding field of a workflows table mapped to the attribute; storing a record in the workflows table for the custom workflow with the attribute value stored in the corresponding field for the record to persist the custom workflow in the microservice.

20 Claims, 17 Drawing Sheets

(56) References Cited

U.S. PATENT DOCUMENTS

| | | |
|---|---|---|
| 5,276,735 A | 1/1994 | Boebert et al. |
| 5,329,447 A | 7/1994 | Leedom, Jr. |
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,710,917 A | 1/1998 | Musa et al. |
| 5,761,529 A | 6/1998 | Raji |
| 5,764,906 A | 6/1998 | Edelstein et al. |
| 5,872,973 A | 2/1999 | Mitchell et al. |
| 5,913,041 A | 6/1999 | Ramanathan et al. |
| 5,913,214 A | 6/1999 | Madnick et al. |
| 6,016,394 A | 1/2000 | Walker |
| 6,122,627 A | 9/2000 | Carey et al. |
| 6,148,297 A | 11/2000 | Swor et al. |
| 6,148,342 A | 11/2000 | Ho |
| 6,240,416 B1 | 5/2001 | Immon et al. |
| 6,240,422 B1 | 5/2001 | Atkins et al. |
| 6,243,816 B1 | 6/2001 | Fang et al. |
| 6,253,203 B1 | 6/2001 | Oflaherty et al. |
| 6,263,335 B1 | 7/2001 | Paik et al. |
| 6,272,631 B1 | 8/2001 | Thomlinson et al. |
| 6,275,824 B1 | 8/2001 | Oflaherty et al. |
| 6,282,548 B1 | 8/2001 | Burner et al. |
| 6,330,562 B1 | 12/2001 | Boden et al. |
| 6,363,488 B1 | 3/2002 | Ginter et al. |
| 6,374,237 B1 | 4/2002 | Reese |
| 6,374,252 B1 | 4/2002 | Althoff et al. |
| 6,408,336 B1 | 6/2002 | Schneider et al. |
| 6,427,230 B1 | 7/2002 | Goiffon et al. |
| 6,442,688 B1 | 8/2002 | Moses et al. |
| 6,446,120 B1 | 9/2002 | Dantressangle |
| 6,463,488 B1 | 10/2002 | San Juan |
| 6,484,149 B1 | 11/2002 | Jammes et al. |
| 6,484,180 B1 | 11/2002 | Lyons et al. |
| 6,516,314 B1 | 2/2003 | Birkler et al. |
| 6,516,337 B1 | 2/2003 | Tripp et al. |
| 6,519,571 B1 | 2/2003 | Guheen et al. |
| 6,574,631 B1 | 6/2003 | Subramanian et al. |
| 6,591,272 B1 | 7/2003 | Williams |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,629,081 B1 | 9/2003 | Cornelius et al. |
| 6,633,878 B1 | 10/2003 | Underwood |
| 6,662,192 B1 | 12/2003 | Rebane |
| 6,662,357 B1 | 12/2003 | Bowman-Amuah |
| 6,697,824 B1 | 2/2004 | Bowman-Amuah |
| 6,699,042 B2 | 3/2004 | Smith et al. |
| 6,701,314 B1 | 3/2004 | Conover et al. |
| 6,721,713 B1 | 4/2004 | Guheen et al. |
| 6,725,200 B1 | 4/2004 | Rost |
| 6,732,109 B2 | 5/2004 | Lindberg et al. |
| 6,754,665 B1 | 6/2004 | Futagami et al. |
| 6,755,344 B1 | 6/2004 | Mollett et al. |
| 6,757,685 B2 | 6/2004 | Raffaele et al. |
| 6,757,888 B1 | 6/2004 | Knutson et al. |
| 6,816,944 B2 | 11/2004 | Peng |
| 6,826,693 B1 | 11/2004 | Yoshida et al. |
| 6,850,252 B1 | 2/2005 | Hoffberg |
| 6,886,101 B2 | 4/2005 | Glazer et al. |
| 6,901,346 B2 | 5/2005 | Tracy et al. |
| 6,904,417 B2 | 6/2005 | Clayton et al. |
| 6,909,897 B2 | 6/2005 | Kikuchi |
| 6,925,443 B1 | 8/2005 | Baggett, Jr. et al. |
| 6,938,041 B1 | 8/2005 | Brandow et al. |
| 6,956,845 B2 | 10/2005 | Baker et al. |
| 6,978,270 B1 | 12/2005 | Carty et al. |
| 6,980,927 B2 | 12/2005 | Tracy et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | McIntosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,003,560 B1 | 2/2006 | Mullen et al. |
| 7,003,662 B2 | 2/2006 | Genty et al. |
| 7,013,290 B2 | 3/2006 | Ananian |
| 7,017,105 B2 | 3/2006 | Flanagin et al. |
| 7,023,979 B1 | 4/2006 | Wu et al. |
| 7,039,594 B1 | 5/2006 | Gersting |
| 7,039,654 B1 | 5/2006 | Eder |
| 7,047,517 B1 | 5/2006 | Brown et al. |
| 7,051,036 B2 | 5/2006 | Rosnow et al. |
| 7,051,038 B1 | 5/2006 | Yeh et al. |
| 7,058,970 B2 | 6/2006 | Shaw |
| 7,069,427 B2 | 6/2006 | Adler et al. |
| 7,076,558 B1 | 7/2006 | Dunn |
| 7,093,200 B2 | 8/2006 | Schreiber et al. |
| 7,095,854 B1 | 8/2006 | Ginter et al. |
| 7,100,195 B1 | 8/2006 | Underwood |
| 7,120,800 B2 | 10/2006 | Ginter et al. |
| 7,124,101 B1 | 10/2006 | Mikurak |
| 7,124,107 B1 | 10/2006 | Pishevar et al. |
| 7,127,705 B2 | 10/2006 | Christfort et al. |
| 7,127,741 B2 | 10/2006 | Bandini et al. |
| 7,133,845 B1 | 11/2006 | Ginter et al. |
| 7,139,999 B2 | 11/2006 | Bowman-Amuah |
| 7,143,091 B2 | 11/2006 | Charnock et al. |
| 7,149,698 B2 | 12/2006 | Guheen et al. |
| 7,165,041 B1 | 1/2007 | Guheen et al. |
| 7,167,842 B1 | 1/2007 | Josephson, II et al. |
| 7,167,844 B1 | 1/2007 | Leong et al. |
| 7,171,379 B2 | 1/2007 | Menninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrishnan et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,247,625 B2 | 7/2007 | Zhang et al. |
| 7,251,624 B1 | 7/2007 | Lee et al. |
| 7,260,830 B2 | 8/2007 | Sugimoto |
| 7,266,566 B1 | 9/2007 | Kennaley et al. |
| 7,272,818 B2 | 9/2007 | Ishimitsu et al. |
| 7,275,063 B2 | 9/2007 | Horn |
| 7,281,020 B2 | 10/2007 | Fine |
| 7,284,232 B1 | 10/2007 | Bates et al. |
| 7,284,271 B2 | 10/2007 | Lucovsky et al. |
| 7,287,280 B2 | 10/2007 | Young |
| 7,290,275 B2 | 10/2007 | Baudoin et al. |
| 7,293,119 B2 | 11/2007 | Beale |
| 7,299,299 B2 | 11/2007 | Hollenbeck et al. |
| 7,302,569 B2 | 11/2007 | Betz et al. |
| 7,313,575 B2 | 12/2007 | Carr et al. |
| 7,313,699 B2 | 12/2007 | Koga |
| 7,313,825 B2 | 12/2007 | Redlich et al. |
| 7,315,826 B1 | 1/2008 | Guheen et al. |
| 7,315,849 B2 | 1/2008 | Bakalash et al. |
| 7,322,047 B2 | 1/2008 | Redlich et al. |
| 7,330,850 B1 | 2/2008 | Seibel et al. |
| 7,340,447 B2 | 3/2008 | Ghatare |
| 7,340,776 B2 | 3/2008 | Zobel et al. |
| 7,343,434 B2 | 3/2008 | Kapoor et al. |
| 7,346,518 B1 | 3/2008 | Frank et al. |
| 7,353,204 B2 | 4/2008 | Liu |
| 7,356,559 B1 | 4/2008 | Jacobs et al. |
| 7,367,014 B2 | 4/2008 | Griffin |
| 7,370,025 B1 | 5/2008 | Pandit |
| 7,376,835 B2 | 5/2008 | Olkin et al. |
| 7,380,120 B1 | 5/2008 | Garcia |
| 7,382,903 B2 | 6/2008 | Ray |
| 7,383,570 B2 | 6/2008 | Pinkas et al. |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,409,354 B2 | 8/2008 | Putnam et al. |
| 7,412,402 B2 | 8/2008 | Cooper |
| 7,424,680 B2 | 9/2008 | Carpenter |

(56) References Cited

U.S. PATENT DOCUMENTS

| | | |
|---|---|---|
| 7,428,546 B2 | 9/2008 | Nori et al. |
| 7,430,585 B2 | 9/2008 | Sibert |
| 7,454,457 B1 | 11/2008 | Lowery et al. |
| 7,454,508 B2 | 11/2008 | Mathew et al. |
| 7,478,157 B2 | 1/2009 | Bohrer et al. |
| 7,480,755 B2 | 1/2009 | Herrell et al. |
| 7,487,170 B2 | 2/2009 | Stevens |
| 7,493,282 B2 | 2/2009 | Manly et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,529,836 B1 | 5/2009 | Bolen |
| 7,533,113 B1 | 5/2009 | Haddad |
| 7,548,968 B1 | 6/2009 | Bura et al. |
| 7,552,480 B1 | 6/2009 | Voss |
| 7,562,339 B2 | 7/2009 | Racca et al. |
| 7,565,685 B2 | 7/2009 | Ross et al. |
| 7,567,541 B2 | 7/2009 | Karimi et al. |
| 7,584,505 B2 | 9/2009 | Mondri et al. |
| 7,584,508 B1 | 9/2009 | Kashchenko et al. |
| 7,587,749 B2 | 9/2009 | Leser et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,783 B1 | 10/2009 | Carter |
| 7,606,790 B2 | 10/2009 | Levy |
| 7,607,120 B2 | 10/2009 | Sanyal et al. |
| 7,613,700 B1 | 11/2009 | Lobo et al. |
| 7,617,136 B1 | 11/2009 | Lessing et al. |
| 7,617,167 B2 | 11/2009 | Griffis et al. |
| 7,620,644 B2 | 11/2009 | Cote et al. |
| 7,627,666 B1 | 12/2009 | DeGiulio et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,640,322 B2 | 12/2009 | Wendkos et al. |
| 7,650,497 B2 | 1/2010 | Thornton et al. |
| 7,653,592 B1 | 1/2010 | Flaxman et al. |
| 7,657,476 B2 | 2/2010 | Barney |
| 7,657,694 B2 | 2/2010 | Mansell et al. |
| 7,665,073 B2 | 2/2010 | Meijer et al. |
| 7,665,125 B2 | 2/2010 | Heard et al. |
| 7,668,947 B2 | 2/2010 | Hutchinson et al. |
| 7,673,282 B2 | 3/2010 | Amaru et al. |
| 7,676,034 B1 | 3/2010 | Wu et al. |
| 7,681,034 B1 | 3/2010 | Lee et al. |
| 7,681,140 B2 | 3/2010 | Ebert |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,698,398 B1 | 4/2010 | Lai |
| 7,702,639 B2 | 4/2010 | Stanley et al. |
| 7,707,224 B2 | 4/2010 | Chastagnol et al. |
| 7,711,995 B1 | 5/2010 | Morris |
| 7,712,029 B2 | 5/2010 | Ferreira et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |
| 7,730,142 B2 | 6/2010 | Levasseur et al. |
| 7,752,124 B2 | 7/2010 | Green et al. |
| 7,756,826 B2 | 7/2010 | Bots et al. |
| 7,756,987 B2 | 7/2010 | Wang et al. |
| 7,761,586 B2 | 7/2010 | Olenick et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,801,758 B2 | 9/2010 | Gracie et al. |
| 7,801,826 B2 | 9/2010 | Labrou et al. |
| 7,801,912 B2 | 9/2010 | Ransil et al. |
| 7,802,305 B1 | 9/2010 | Leeds |
| 7,805,349 B2 | 9/2010 | Yu et al. |
| 7,805,451 B2 | 9/2010 | Hosokawa |
| 7,813,947 B2 | 10/2010 | DeAngelis et al. |
| 7,822,620 B2 | 10/2010 | Dixon et al. |
| 7,827,523 B2 | 11/2010 | Ahmed et al. |
| 7,836,078 B2 | 11/2010 | Dettinger et al. |
| 7,844,640 B2 | 11/2010 | Bender et al. |
| 7,849,143 B2 | 12/2010 | Vuong |
| 7,853,468 B2 | 12/2010 | Callahan et al. |
| 7,853,470 B2 | 12/2010 | Sonnleithner et al. |
| 7,853,925 B2 | 12/2010 | Kemmler |
| 7,860,816 B2 | 12/2010 | Fokoue-Nkoutche et al. |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,890,461 B2 | 2/2011 | Oeda et al. |
| 7,895,260 B2 | 2/2011 | Archer et al. |
| 7,904,360 B2 | 3/2011 | Evans |
| 7,904,478 B2 | 3/2011 | Yu et al. |
| 7,904,487 B2 | 3/2011 | Ghatare |
| 7,917,888 B2 | 3/2011 | Chong et al. |
| 7,917,963 B2 | 3/2011 | Goyal et al. |
| 7,921,152 B2 | 4/2011 | Ashley et al. |
| 7,930,197 B2 | 4/2011 | Ozzie et al. |
| 7,930,753 B2 | 4/2011 | Mellinger et al. |
| 7,953,725 B2 | 5/2011 | Burris et al. |
| 7,954,150 B2 | 5/2011 | Croft et al. |
| 7,958,087 B2 | 6/2011 | Blumenau |
| 7,958,494 B2 | 6/2011 | Chaar et al. |
| 7,962,900 B2 | 6/2011 | Barraclough et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,974,992 B2 | 7/2011 | Fastabend et al. |
| 7,975,000 B2 | 7/2011 | Dixon et al. |
| 7,991,559 B2 | 8/2011 | Dzekunov et al. |
| 7,991,747 B1 | 8/2011 | Upadhyay et al. |
| 7,996,372 B2 | 8/2011 | Rubel, Jr. |
| 8,005,891 B2 | 8/2011 | Knowles et al. |
| 8,010,612 B2 | 8/2011 | Costea et al. |
| 8,010,720 B2 | 8/2011 | Iwaoka et al. |
| 8,019,881 B2 | 9/2011 | Sandhu et al. |
| 8,020,206 B2 | 9/2011 | Hubbard et al. |
| 8,024,384 B2 | 9/2011 | Prabhakar et al. |
| 8,032,721 B2 | 10/2011 | Murai |
| 8,036,374 B2 | 10/2011 | Noble, Jr. |
| 8,037,409 B2 | 10/2011 | Jacob et al. |
| 8,041,749 B2 | 10/2011 | Beck |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,090,754 B2 | 1/2012 | Schmidt et al. |
| 8,095,923 B2 | 1/2012 | Harvey et al. |
| 8,099,709 B2 | 1/2012 | Baikov et al. |
| 8,099,765 B2 | 1/2012 | Parkinson |
| 8,103,962 B2 | 1/2012 | Embley et al. |
| 8,117,441 B2 | 2/2012 | Kurien et al. |
| 8,135,815 B2 | 3/2012 | Mayer |
| 8,146,054 B2 | 3/2012 | Baker et al. |
| 8,146,074 B2 | 3/2012 | Ito et al. |
| 8,150,717 B2 | 4/2012 | Whitmore |
| 8,156,105 B2 | 4/2012 | Altounian et al. |
| 8,156,158 B2 | 4/2012 | Rolls et al. |
| 8,156,159 B2 | 4/2012 | Ebrahimi et al. |
| 8,166,406 B1 | 4/2012 | Goldfeder et al. |
| 8,176,061 B2 | 5/2012 | Swanbeck et al. |
| 8,176,177 B2 | 5/2012 | Sussman et al. |
| 8,176,334 B2 | 5/2012 | Vainstein |
| 8,176,470 B2 | 5/2012 | Klumpp et al. |
| 8,180,759 B2 | 5/2012 | Hamzy |
| 8,181,151 B2 | 5/2012 | Sedukhin et al. |
| 8,185,409 B2 | 5/2012 | Putnam et al. |
| 8,185,497 B2 | 5/2012 | Vermeulen et al. |
| 8,196,176 B2 | 6/2012 | Berteau et al. |
| 8,205,093 B2 | 6/2012 | Argott |
| 8,205,140 B2 | 6/2012 | Hafeez et al. |
| 8,214,362 B1 | 7/2012 | Djabarov |

(56) References Cited

U.S. PATENT DOCUMENTS

| | | |
|---|---|---|
| 8,214,803 B2 | 7/2012 | Horii et al. |
| 8,234,377 B2 | 7/2012 | Cohn |
| 8,239,244 B2 | 8/2012 | Ginsberg et al. |
| 8,250,051 B2 | 8/2012 | Bugir et al. |
| 8,255,468 B2 | 8/2012 | Vitaldevara et al. |
| 8,260,262 B2 | 9/2012 | Ben Ayed |
| 8,261,362 B2 | 9/2012 | Goodwin et al. |
| 8,266,231 B1 | 9/2012 | Golovin et al. |
| 8,275,632 B2 | 9/2012 | Awaraji et al. |
| 8,275,793 B2 | 9/2012 | Ahmad et al. |
| 8,286,239 B1 | 10/2012 | Sutton |
| 8,312,549 B2 | 11/2012 | Goldberg et al. |
| 8,316,237 B1 | 11/2012 | Felsher et al. |
| 8,332,908 B2 | 12/2012 | Hatakeyama et al. |
| 8,340,999 B2 | 12/2012 | Kumaran et al. |
| 8,341,405 B2 | 12/2012 | Meijer et al. |
| 8,346,929 B1 | 1/2013 | Lai |
| 8,364,713 B2 | 1/2013 | Pollard |
| 8,370,224 B2 | 2/2013 | Grewal |
| 8,370,794 B2 | 2/2013 | Moosmann et al. |
| 8,380,630 B2 | 2/2013 | Felsher |
| 8,380,743 B2 | 2/2013 | Convertino et al. |
| 8,381,180 B2 | 2/2013 | Rostoker |
| 8,381,297 B2 | 2/2013 | Touboul |
| 8,386,314 B2 | 2/2013 | Kirkby et al. |
| 8,392,982 B2 | 3/2013 | Harris et al. |
| 8,418,226 B2 | 4/2013 | Gardner |
| 8,423,954 B2 | 4/2013 | Ronen et al. |
| 8,429,179 B1 | 4/2013 | Mirhaji |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,448,252 B1 | 5/2013 | King et al. |
| 8,463,247 B2 | 6/2013 | Misiag |
| 8,464,311 B2 | 6/2013 | Ashley et al. |
| 8,468,244 B2 | 6/2013 | Redlich et al. |
| 8,473,324 B2 | 6/2013 | Alvarez et al. |
| 8,474,012 B2 | 6/2013 | Ahmed et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,515,988 B2 | 8/2013 | Jones et al. |
| 8,516,076 B2 | 8/2013 | Thomas |
| 8,527,337 B1 | 9/2013 | Lim et al. |
| 8,533,746 B2 | 9/2013 | Nolan et al. |
| 8,533,844 B2 | 9/2013 | Mahaffey et al. |
| 8,538,817 B2 | 9/2013 | Wilson |
| 8,539,359 B2 | 9/2013 | Rapaport et al. |
| 8,539,437 B2 | 9/2013 | Finlayson et al. |
| 8,560,645 B2 | 10/2013 | Linden et al. |
| 8,560,841 B2 | 10/2013 | Chin et al. |
| 8,560,956 B2 | 10/2013 | Curtis et al. |
| 8,561,100 B2 | 10/2013 | Hu et al. |
| 8,561,153 B2 | 10/2013 | Grason et al. |
| 8,565,729 B2 | 10/2013 | Moseler et al. |
| 8,566,726 B2 | 10/2013 | Dixon et al. |
| 8,566,938 B1 | 10/2013 | Prakash et al. |
| 8,571,909 B2 | 10/2013 | Miller et al. |
| 8,572,717 B2 | 10/2013 | Narayanaswamy |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,589,372 B2 | 11/2013 | Krislov |
| 8,601,467 B2 | 12/2013 | Hofhansl et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,615,549 B2 | 12/2013 | Knowles et al. |
| 8,615,731 B2 | 12/2013 | Doshi |
| 8,620,952 B2 | 12/2013 | Bennett et al. |
| 8,621,637 B2 | 12/2013 | Al-Harbi et al. |
| 8,626,671 B2 | 1/2014 | Federgreen |
| 8,627,114 B2 | 1/2014 | Resch et al. |
| 8,630,961 B2 | 1/2014 | Beilby et al. |
| 8,631,048 B1 | 1/2014 | Davis et al. |
| 8,640,110 B2 | 1/2014 | Kopp et al. |
| 8,646,072 B1 | 2/2014 | Savant |
| 8,650,399 B2 | 2/2014 | Le Bihan et al. |
| 8,655,939 B2 | 2/2014 | Redlich et al. |
| 8,656,265 B1 | 2/2014 | Paulin et al. |
| 8,656,456 B2 | 2/2014 | Maxson et al. |
| 8,661,036 B2 | 2/2014 | Turski et al. |
| 8,667,074 B1 | 3/2014 | Farkas |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,689,292 B2 | 4/2014 | Williams et al. |
| 8,693,689 B2 | 4/2014 | Belenkiy et al. |
| 8,700,524 B2 | 4/2014 | Williams et al. |
| 8,700,699 B2 | 4/2014 | Shen et al. |
| 8,706,742 B1 | 4/2014 | Ravid et al. |
| 8,707,451 B2 | 4/2014 | Ture et al. |
| 8,712,813 B2 | 4/2014 | King |
| 8,713,098 B1 | 4/2014 | Adya et al. |
| 8,713,638 B2 | 4/2014 | Hu et al. |
| 8,719,366 B2 | 5/2014 | Mathew et al. |
| 8,732,839 B2 | 5/2014 | Hohl |
| 8,744,894 B2 | 6/2014 | Christiansen et al. |
| 8,751,285 B2 | 6/2014 | Deb et al. |
| 8,762,406 B2 | 6/2014 | Ho et al. |
| 8,762,413 B2 | 6/2014 | Graham, Jr. et al. |
| 8,763,071 B2 | 6/2014 | Sinha et al. |
| 8,763,082 B2 | 6/2014 | Huber et al. |
| 8,763,131 B2 | 6/2014 | Archer et al. |
| 8,767,947 B1 | 7/2014 | Ristock et al. |
| 8,769,242 B2 | 7/2014 | Tkac et al. |
| 8,769,412 B2 | 7/2014 | Gill et al. |
| 8,769,671 B2 | 7/2014 | Shraim et al. |
| 8,776,241 B2 | 7/2014 | Zaitsev |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,781 B2 | 7/2014 | Grossi et al. |
| 8,793,809 B2 | 7/2014 | Falkenburg et al. |
| 8,799,984 B2 | 8/2014 | Ahn |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |
| 8,812,752 B1 | 8/2014 | Shih et al. |
| 8,812,766 B2 | 8/2014 | Kranendonk et al. |
| 8,813,028 B2 | 8/2014 | Farooqi |
| 8,813,214 B1 | 8/2014 | McNair et al. |
| 8,819,253 B2 | 8/2014 | Simeloff et al. |
| 8,819,617 B1 | 8/2014 | Koenig et al. |
| 8,819,800 B2 | 8/2014 | Gao et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,839,346 B2 | 9/2014 | Murgia |
| 8,843,487 B2 | 9/2014 | McGraw et al. |
| 8,843,745 B2 | 9/2014 | Roberts, Jr. |
| 8,849,757 B2 | 9/2014 | Kruglick |
| 8,856,534 B2 | 10/2014 | Khosravi et al. |
| 8,856,936 B2 | 10/2014 | Datta Ray et al. |
| 8,862,507 B2 | 10/2014 | Sandhu et al. |
| 8,863,261 B2 | 10/2014 | Yang |
| 8,875,232 B2 | 10/2014 | Blom et al. |
| 8,893,078 B2 | 11/2014 | Schaude et al. |
| 8,893,286 B1 | 11/2014 | Oliver |
| 8,893,297 B2 | 11/2014 | Eversoll et al. |
| 8,904,494 B2 | 12/2014 | Kindler et al. |
| 8,914,263 B2 | 12/2014 | Shimada et al. |
| 8,914,299 B2 | 12/2014 | Pesci-Anderson et al. |

(56) References Cited

U.S. PATENT DOCUMENTS

| | | |
|---|---|---|
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,930,364 B1 | 1/2015 | Brooker |
| 8,930,896 B1 | 1/2015 | Wiggins |
| 8,930,897 B2 | 1/2015 | Nassar |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,938,221 B2 | 1/2015 | Brazier et al. |
| 8,943,076 B2 | 1/2015 | Stewart et al. |
| 8,943,548 B2 | 1/2015 | Drokov et al. |
| 8,949,137 B2 | 2/2015 | Crapo et al. |
| 8,955,038 B2 | 2/2015 | Nicodemus et al. |
| 8,959,568 B2 | 2/2015 | Hudis et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,973,108 B1 | 3/2015 | Roth et al. |
| 8,977,234 B2 | 3/2015 | Chava |
| 8,977,643 B2 | 3/2015 | Schindlauer et al. |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,002,939 B2 | 4/2015 | Laden et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,014,661 B2 | 4/2015 | DeCharms |
| 9,015,796 B1 | 4/2015 | Fujioka |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,047,583 B2 | 6/2015 | Patton et al. |
| 9,047,639 B1 | 6/2015 | Quintiliani et al. |
| 9,049,244 B2 | 6/2015 | Prince et al. |
| 9,049,314 B2 | 6/2015 | Pugh et al. |
| 9,055,071 B1 | 6/2015 | Gates et al. |
| 9,058,590 B2 | 6/2015 | Criddle et al. |
| 9,064,033 B2 | 6/2015 | Jin et al. |
| 9,069,940 B2 | 6/2015 | Hars |
| 9,076,231 B1 | 7/2015 | Hill et al. |
| 9,077,736 B2 | 7/2015 | Werth et al. |
| 9,081,952 B2 | 7/2015 | Sagi et al. |
| 9,087,090 B1 | 7/2015 | Cormier et al. |
| 9,092,478 B2 | 7/2015 | Vaitheeswaran et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,778 B2 | 8/2015 | Stogaitis et al. |
| 9,106,691 B1 | 8/2015 | Burger et al. |
| 9,106,710 B1 | 8/2015 | Feimster |
| 9,110,918 B1 | 8/2015 | Rajaa et al. |
| 9,111,105 B2 | 8/2015 | Barton et al. |
| 9,111,295 B2 | 8/2015 | Tietzen et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,135,444 B2 | 9/2015 | Carter et al. |
| 9,141,823 B2 | 9/2015 | Dawson |
| 9,141,911 B2 | 9/2015 | Zhao et al. |
| 9,152,818 B1 | 10/2015 | Hathaway et al. |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,165,036 B2 | 10/2015 | Mehra |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,026 B1 | 12/2015 | Reeves |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,218,596 B2 | 12/2015 | Ronca et al. |
| 9,224,009 B1 | 12/2015 | Liu et al. |
| 9,230,036 B2 | 1/2016 | Davis |
| 9,231,935 B1 | 1/2016 | Bridge et al. |
| 9,232,040 B2 | 1/2016 | Barash et al. |
| 9,235,476 B2 | 1/2016 | McHugh et al. |
| 9,240,987 B2 | 1/2016 | Barrett-Bowen et al. |
| 9,241,259 B2 | 1/2016 | Daniela et al. |
| 9,245,126 B2 | 1/2016 | Christodorescu et al. |
| 9,245,266 B2 | 1/2016 | Hardt |
| 9,253,609 B2 | 2/2016 | Hosier, Jr. |
| 9,258,116 B2 | 2/2016 | Moskowitz |
| 9,264,443 B2 | 2/2016 | Weisman |
| 9,274,858 B2 | 3/2016 | Milliron et al. |
| 9,280,581 B1 | 3/2016 | Grimes et al. |
| 9,286,149 B2 | 3/2016 | Sampson et al. |
| 9,286,282 B2 | 3/2016 | Ling, III et al. |
| 9,288,118 B1 | 3/2016 | Pattan |
| 9,288,556 B2 | 3/2016 | Kim et al. |
| 9,294,498 B1 | 3/2016 | Yampolskiy et al. |
| 9,299,050 B2 | 3/2016 | Stiffler et al. |
| 9,306,939 B2 | 4/2016 | Chan et al. |
| 9,317,697 B2 | 4/2016 | Maier et al. |
| 9,317,715 B2 | 4/2016 | Schuette et al. |
| 9,325,731 B2 | 4/2016 | McGeehan |
| 9,336,184 B2 | 5/2016 | Mital et al. |
| 9,336,220 B2 | 5/2016 | Li et al. |
| 9,336,324 B2 | 5/2016 | Lomme et al. |
| 9,336,332 B2 | 5/2016 | Davis et al. |
| 9,336,400 B2 | 5/2016 | Milman et al. |
| 9,338,188 B1 | 5/2016 | Ahn |
| 9,342,706 B2 | 5/2016 | Chawla et al. |
| 9,344,297 B2 | 5/2016 | Shah et al. |
| 9,344,424 B2 | 5/2016 | Tenenboym et al. |
| 9,344,484 B2 | 5/2016 | Ferris |
| 9,348,802 B2 | 5/2016 | Massand |
| 9,348,862 B2 | 5/2016 | Kawecki, III |
| 9,348,929 B2 | 5/2016 | Eberlein |
| 9,349,016 B1 | 5/2016 | Brisebois et al. |
| 9,350,718 B2 | 5/2016 | Sondhi et al. |
| 9,355,157 B2 | 5/2016 | Mohammed et al. |
| 9,356,961 B1 | 5/2016 | Todd et al. |
| 9,361,446 B1 | 6/2016 | Demirjian et al. |
| 9,369,488 B2 | 6/2016 | Woods et al. |
| 9,374,693 B1 | 6/2016 | Olincy et al. |
| 9,384,199 B2 | 7/2016 | Thereska et al. |
| 9,384,357 B2 | 7/2016 | Patil et al. |
| 9,386,078 B2 | 7/2016 | Reno et al. |
| 9,386,104 B2 | 7/2016 | Adams et al. |
| 9,396,332 B2 | 7/2016 | Abrams et al. |
| 9,401,900 B2 | 7/2016 | Levasseur et al. |
| 9,411,967 B2 | 8/2016 | Parecki et al. |
| 9,411,982 B1 | 8/2016 | Dippenaar et al. |
| 9,417,859 B2 | 8/2016 | Gounares et al. |
| 9,418,221 B2 | 8/2016 | Turgeman |
| 9,424,021 B2 | 8/2016 | Zamir |
| 9,424,414 B1 | 8/2016 | Demirjian et al. |
| 9,426,177 B2 | 8/2016 | Wang et al. |
| 9,450,940 B2 | 9/2016 | Belov et al. |
| 9,460,136 B1 | 10/2016 | Todd et al. |
| 9,460,171 B2 | 10/2016 | Marrelli et al. |
| 9,460,307 B2 | 10/2016 | Breslau et al. |
| 9,461,876 B2 | 10/2016 | Van Dusen et al. |

(56) References Cited

U.S. PATENT DOCUMENTS

| | | |
|---|---|---|
| 9,462,009 B1 | 10/2016 | Kolman et al. |
| 9,465,702 B2 | 10/2016 | Gventer et al. |
| 9,465,800 B2 | 10/2016 | Lacey |
| 9,473,446 B2 | 10/2016 | Vijay et al. |
| 9,473,505 B1 | 10/2016 | Asano et al. |
| 9,473,535 B2 | 10/2016 | Sartor |
| 9,477,523 B1 | 10/2016 | Warman et al. |
| 9,477,660 B2 | 10/2016 | Scott et al. |
| 9,477,685 B1 | 10/2016 | Leung et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,495,547 B1 | 11/2016 | Schepis et al. |
| 9,501,523 B2 | 11/2016 | Hyatt et al. |
| 9,507,960 B2 | 11/2016 | Bell et al. |
| 9,509,674 B1 | 11/2016 | Nasserbakht et al. |
| 9,509,702 B2 | 11/2016 | Grigg et al. |
| 9,514,231 B2 | 12/2016 | Eden |
| 9,516,012 B2 | 12/2016 | Chochois et al. |
| 9,521,166 B2 | 12/2016 | Wilson |
| 9,524,500 B2 | 12/2016 | Dave et al. |
| 9,529,989 B2 | 12/2016 | Kling et al. |
| 9,536,108 B2 | 1/2017 | Powell et al. |
| 9,537,546 B2 | 1/2017 | Cordeiro et al. |
| 9,542,568 B2 | 1/2017 | Francis et al. |
| 9,549,047 B1 | 1/2017 | Fredinburg et al. |
| 9,552,395 B2 | 1/2017 | Bayer et al. |
| 9,552,470 B2 | 1/2017 | Turgeman et al. |
| 9,553,918 B1 | 1/2017 | Manion et al. |
| 9,558,497 B2 | 1/2017 | Carvalho |
| 9,569,752 B2 | 2/2017 | Deering et al. |
| 9,571,509 B1 | 2/2017 | Satish et al. |
| 9,571,526 B2 | 2/2017 | Sartor |
| 9,571,559 B2 | 2/2017 | Raleigh et al. |
| 9,571,991 B1 | 2/2017 | Brizendine et al. |
| 9,576,289 B2 | 2/2017 | Henderson et al. |
| 9,578,060 B1 | 2/2017 | Brisebois et al. |
| 9,578,173 B2 | 2/2017 | Sanghavi et al. |
| 9,582,681 B2 | 2/2017 | Mishra |
| 9,584,964 B2 | 2/2017 | Pelkey |
| 9,589,110 B2 | 3/2017 | Carey et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,652 B2 | 4/2017 | Slater |
| 9,619,661 B1 | 4/2017 | Finkelstein |
| 9,621,357 B2 | 4/2017 | Williams et al. |
| 9,621,566 B2 | 4/2017 | Gupta et al. |
| 9,626,124 B2 | 4/2017 | Lipinski et al. |
| 9,626,680 B1 | 4/2017 | Ryan et al. |
| 9,629,064 B2 | 4/2017 | Graves et al. |
| 9,642,008 B2 | 5/2017 | Wyatt et al. |
| 9,646,095 B1 | 5/2017 | Gottlieb et al. |
| 9,647,949 B2 | 5/2017 | Varki et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasundaram et al. |
| 9,665,733 B1 | 5/2017 | Sills et al. |
| 9,665,883 B2 | 5/2017 | Roullier et al. |
| 9,672,053 B2 | 6/2017 | Tang et al. |
| 9,672,355 B2 | 6/2017 | Titonis et al. |
| 9,678,794 B1 | 6/2017 | Barrett et al. |
| 9,691,090 B1 | 6/2017 | Barday |
| 9,699,209 B2 | 7/2017 | Ng et al. |
| 9,703,549 B2 | 7/2017 | Dufresne |
| 9,704,103 B2 | 7/2017 | Suskind et al. |
| 9,705,840 B2 | 7/2017 | Pujare et al. |
| 9,705,880 B2 | 7/2017 | Siris |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,734,148 B2 | 8/2017 | Bendersky et al. |
| 9,734,255 B2 | 8/2017 | Jiang |
| 9,736,004 B2 | 8/2017 | Jung et al. |
| 9,740,985 B2 | 8/2017 | Byron et al. |
| 9,740,987 B2 | 8/2017 | Dolan |
| 9,749,408 B2 | 8/2017 | Subramani et al. |
| 9,753,796 B2 | 9/2017 | Mahaffey et al. |
| 9,754,091 B2 | 9/2017 | Kode et al. |
| 9,756,059 B2 | 9/2017 | Demirjian et al. |
| 9,760,620 B2 | 9/2017 | Nachnani et al. |
| 9,760,635 B2 | 9/2017 | Bliss et al. |
| 9,760,697 B1 | 9/2017 | Walker |
| 9,760,849 B2 | 9/2017 | Vinnakota et al. |
| 9,762,553 B2 | 9/2017 | Ford et al. |
| 9,767,202 B2 | 9/2017 | Darby et al. |
| 9,767,309 B1 | 9/2017 | Patel et al. |
| 9,769,124 B2 | 9/2017 | Yan |
| 9,773,269 B1 | 9/2017 | Lazarus |
| 9,785,795 B2 | 10/2017 | Grondin et al. |
| 9,787,671 B1 | 10/2017 | Bogrett |
| 9,798,749 B2 | 10/2017 | Saner |
| 9,798,826 B2 | 10/2017 | Wilson et al. |
| 9,798,896 B2 | 10/2017 | Jakobsson |
| 9,800,605 B2 | 10/2017 | Baikalov et al. |
| 9,800,606 B1 | 10/2017 | Yumer |
| 9,804,649 B2 | 10/2017 | Cohen et al. |
| 9,804,928 B2 | 10/2017 | Davis et al. |
| 9,805,381 B2 | 10/2017 | Frank et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,819,684 B2 | 11/2017 | Cernoch et al. |
| 9,825,928 B2 | 11/2017 | Lelcuk et al. |
| 9,830,563 B2 | 11/2017 | Paknad |
| 9,832,633 B2 | 11/2017 | Gerber, Jr. et al. |
| 9,836,598 B2 | 12/2017 | Iyer et al. |
| 9,838,407 B1 | 12/2017 | Oprea et al. |
| 9,838,839 B2 | 12/2017 | Vudali et al. |
| 9,841,969 B2 | 12/2017 | Seibert, Jr. et al. |
| 9,842,042 B2 | 12/2017 | Chhatwal et al. |
| 9,842,349 B2 | 12/2017 | Sawczuk et al. |
| 9,848,005 B2 | 12/2017 | Ardeli et al. |
| 9,848,061 B1 | 12/2017 | Jain et al. |
| 9,852,150 B2 | 12/2017 | Sharpe et al. |
| 9,853,959 B1 | 12/2017 | Kapczynski et al. |
| 9,860,226 B2 | 1/2018 | Thormaehlen |
| 9,864,735 B1 | 1/2018 | Lamprecht |
| 9,876,825 B2 | 1/2018 | Amar et al. |
| 9,877,138 B1 | 1/2018 | Franklin |
| 9,880,157 B2 | 1/2018 | Levak et al. |
| 9,882,935 B2 | 1/2018 | Barday |
| 9,887,965 B2 | 2/2018 | Kay et al. |
| 9,888,377 B1 | 2/2018 | McCorkendale et al. |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,894,076 B2 | 2/2018 | Li et al. |
| 9,898,613 B1 | 2/2018 | Swerdlow et al. |
| 9,898,739 B2 | 2/2018 | Monastyrsky et al. |
| 9,898,769 B2 | 2/2018 | Barday |
| 9,912,625 B2 | 3/2018 | Mutha et al. |
| 9,912,677 B2 | 3/2018 | Chien |
| 9,912,810 B2 | 3/2018 | Segre et al. |
| 9,916,703 B2 | 3/2018 | Levinson et al. |
| 9,922,124 B2 | 3/2018 | Rathod |
| 9,923,927 B1 | 3/2018 | McClintock et al. |
| 9,928,379 B1 | 3/2018 | Hoffer |
| 9,934,406 B2 | 4/2018 | Khan et al. |
| 9,934,493 B2 | 4/2018 | Castinado et al. |
| 9,934,544 B1 | 4/2018 | Whitfield et al. |
| 9,936,127 B2 | 4/2018 | Todasco |
| 9,942,214 B1 | 4/2018 | Burciu et al. |
| 9,942,244 B2 | 4/2018 | Lahoz et al. |
| 9,942,276 B2 | 4/2018 | Sartor |
| 9,946,897 B2 | 4/2018 | Lovin |
| 9,948,652 B2 | 4/2018 | Yu et al. |
| 9,948,663 B1 | 4/2018 | Wang et al. |
| 9,953,189 B2 | 4/2018 | Cook et al. |

(56) References Cited

U.S. PATENT DOCUMENTS

| | | |
|---|---|---|
| 9,954,879 B1 | 4/2018 | Sadaghiani et al. |
| 9,954,883 B2 | 4/2018 | Ahuja et al. |
| 9,959,551 B1 | 5/2018 | Schermerhorn et al. |
| 9,959,582 B2 | 5/2018 | Sukman et al. |
| 9,961,070 B2 | 5/2018 | Tang |
| 9,973,518 B2 | 5/2018 | Lee et al. |
| 9,973,585 B2 | 5/2018 | Ruback et al. |
| 9,977,904 B2 | 5/2018 | Khan et al. |
| 9,977,920 B2 | 5/2018 | Danielson et al. |
| 9,983,936 B2 | 5/2018 | Dornemann et al. |
| 9,984,252 B2 | 5/2018 | Pollard |
| 9,990,499 B2 | 6/2018 | Chan et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,019,591 B1 | 7/2018 | Beguin |
| 10,019,741 B2 | 7/2018 | Hesselink |
| 10,021,143 B2 | 7/2018 | Cabrera et al. |
| 10,025,804 B2 | 7/2018 | Vranyes et al. |
| 10,028,226 B2 | 7/2018 | Ayyagari et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,055,869 B2 | 8/2018 | Borrelli et al. |
| 10,061,847 B2 | 8/2018 | Mohammed et al. |
| 10,069,858 B2 | 9/2018 | Robinson et al. |
| 10,069,914 B1 | 9/2018 | Smith |
| 10,073,924 B2 | 9/2018 | Karp et al. |
| 10,075,437 B1 | 9/2018 | Costigan et al. |
| 10,075,451 B1 | 9/2018 | Hall et al. |
| 10,084,817 B2 | 9/2018 | Saher et al. |
| 10,091,214 B2 | 10/2018 | Godlewski et al. |
| 10,091,312 B1 | 10/2018 | Khanwalkar et al. |
| 10,097,551 B2 | 10/2018 | Chan et al. |
| 10,102,533 B2 | 10/2018 | Barday |
| 10,108,409 B2 | 10/2018 | Pirzadeh et al. |
| 10,122,663 B2 | 11/2018 | Hu et al. |
| 10,122,760 B2 | 11/2018 | Terrill et al. |
| 10,127,403 B2 | 11/2018 | Kong et al. |
| 10,129,211 B2 | 11/2018 | Heath |
| 10,140,666 B1 | 11/2018 | Wang et al. |
| 10,142,113 B2 | 11/2018 | Zaidi et al. |
| 10,152,560 B2 | 12/2018 | Potiagalov et al. |
| 10,158,676 B2 | 12/2018 | Barday |
| 10,165,011 B2 | 12/2018 | Barday |
| 10,169,762 B2 | 1/2019 | Ogawa |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,187,363 B2 | 1/2019 | Smirnoff et al. |
| 10,187,394 B2 | 1/2019 | Bar et al. |
| 10,204,154 B2 | 2/2019 | Barday et al. |
| 10,205,994 B2 | 2/2019 | Splaine et al. |
| 10,212,134 B2 | 2/2019 | Rai |
| 10,212,175 B2 | 2/2019 | Seul et al. |
| 10,223,533 B2 | 3/2019 | Dawson |
| 10,230,571 B2 | 3/2019 | Rangasamy et al. |
| 10,230,711 B2 | 3/2019 | Kohli |
| 10,250,594 B2 | 4/2019 | Chathoth et al. |
| 10,255,602 B2 | 4/2019 | Wang |
| 10,257,127 B2 | 4/2019 | Dotan-Cohen et al. |
| 10,257,181 B1 | 4/2019 | Sherif et al. |
| 10,268,838 B2 | 4/2019 | Yadgiri et al. |
| 10,275,221 B2 | 4/2019 | Thattai et al. |
| 10,275,614 B2 | 4/2019 | Barday et al. |
| 10,282,370 B1 | 5/2019 | Barday et al. |
| 10,282,559 B2 | 5/2019 | Barday et al. |
| 10,284,604 B2 | 5/2019 | Barday et al. |
| 10,289,584 B2 | 5/2019 | Chiba |
| 10,289,857 B1 | 5/2019 | Brinskelle |
| 10,289,866 B2 | 5/2019 | Barday et al. |
| 10,289,867 B2 | 5/2019 | Barday et al. |
| 10,289,870 B2 | 5/2019 | Barday et al. |
| 10,296,504 B2 | 5/2019 | Hock et al. |
| 10,304,442 B1 | 5/2019 | Rudden et al. |
| 10,310,723 B2 | 6/2019 | Rathod |
| 10,311,042 B1 | 6/2019 | Kumar |
| 10,311,475 B2 | 6/2019 | Yuasa |
| 10,311,492 B2 | 6/2019 | Gelfenbeyn et al. |
| 10,318,761 B2 | 6/2019 | Barday et al. |
| 10,320,940 B1 | 6/2019 | Brennan et al. |
| 10,324,960 B1 | 6/2019 | Skvortsov et al. |
| 10,326,768 B2 | 6/2019 | Verweyst et al. |
| 10,326,798 B2 | 6/2019 | Lambert |
| 10,326,841 B2 | 6/2019 | Bradley et al. |
| 10,327,100 B1 | 6/2019 | Davis et al. |
| 10,331,689 B2 | 6/2019 | Sorrentino et al. |
| 10,331,904 B2 | 6/2019 | Sher-Jan et al. |
| 10,333,975 B2 | 6/2019 | Soman et al. |
| 10,339,470 B1 | 7/2019 | Dutta et al. |
| 10,346,186 B2 | 7/2019 | Kalyanpur |
| 10,346,635 B2 | 7/2019 | Kumar et al. |
| 10,346,637 B2 | 7/2019 | Barday et al. |
| 10,346,638 B2 | 7/2019 | Barday et al. |
| 10,346,849 B2 | 7/2019 | Ionescu et al. |
| 10,348,726 B2 | 7/2019 | Caluwaert |
| 10,348,775 B2 | 7/2019 | Barday |
| 10,353,673 B2 | 7/2019 | Barday et al. |
| 10,361,857 B2 | 7/2019 | Woo |
| 10,366,241 B2 | 7/2019 | Sartor |
| 10,373,119 B2 | 8/2019 | Driscoll et al. |
| 10,373,409 B2 | 8/2019 | White et al. |
| 10,375,115 B2 | 8/2019 | Mallya |
| 10,387,559 B1 | 8/2019 | Wendt et al. |
| 10,387,577 B2 | 8/2019 | Hill et al. |
| 10,387,657 B2 | 8/2019 | Belfiore, Jr. et al. |
| 10,387,952 B1 | 8/2019 | Sandhu et al. |
| 10,395,201 B2 | 8/2019 | Vescio |
| 10,402,545 B2 | 9/2019 | Gorfein et al. |
| 10,404,729 B2 | 9/2019 | Turgeman |
| 10,417,401 B2 | 9/2019 | Votaw et al. |
| 10,417,621 B2 | 9/2019 | Cassel et al. |
| 10,419,476 B2 | 9/2019 | Parekh |
| 10,423,985 B1 | 9/2019 | Dutta et al. |
| 10,425,492 B2 | 9/2019 | Comstock et al. |
| 10,430,608 B2 | 10/2019 | Peri et al. |
| 10,435,350 B2 | 10/2019 | Ito et al. |
| 10,437,412 B2 | 10/2019 | Barday et al. |
| 10,437,860 B2 | 10/2019 | Barday et al. |
| 10,438,016 B2 | 10/2019 | Barday et al. |
| 10,438,273 B2 | 10/2019 | Burns et al. |
| 10,440,062 B2 | 10/2019 | Barday et al. |
| 10,445,508 B2 | 10/2019 | Sher-Jan et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,453,076 B2 | 10/2019 | Parekh et al. |
| 10,453,092 B1 | 10/2019 | Wang et al. |
| 10,454,934 B2 | 10/2019 | Parimi et al. |
| 10,460,322 B2 | 10/2019 | Williamson et al. |
| 10,481,763 B2 | 11/2019 | Bartkiewicz et al. |
| 10,489,454 B1 | 11/2019 | Chen |
| 10,503,926 B2 | 12/2019 | Barday et al. |
| 10,510,031 B2 | 12/2019 | Barday et al. |
| 10,521,623 B2 | 12/2019 | Rodriguez et al. |
| 10,534,851 B1 | 1/2020 | Chan et al. |
| 10,535,081 B2 | 1/2020 | Ferreira et al. |
| 10,536,475 B1 | 1/2020 | McCorkle, Jr. et al. |
| 10,536,478 B2 | 1/2020 | Kirti et al. |
| 10,541,938 B1 | 1/2020 | Timmerman et al. |
| 10,546,135 B1 | 1/2020 | Kassoumeh et al. |
| 10,552,462 B1 | 2/2020 | Hart |
| 10,558,809 B1 | 2/2020 | Joyce et al. |
| 10,558,821 B2 | 2/2020 | Barday et al. |
| 10,564,815 B2 | 2/2020 | Soon-Shiong |
| 10,564,935 B2 | 2/2020 | Barday et al. |
| 10,564,936 B2 | 2/2020 | Barday et al. |
| 10,565,161 B2 | 2/2020 | Barday et al. |
| 10,565,236 B1 | 2/2020 | Barday et al. |

(56) References Cited

U.S. PATENT DOCUMENTS

| | | |
|---|---|---|
| 10,567,439 B2 | 2/2020 | Barday |
| 10,567,517 B2 | 2/2020 | Weinig et al. |
| 10,572,684 B2 | 2/2020 | Lafever et al. |
| 10,572,686 B2 | 2/2020 | Barday et al. |
| 10,574,705 B2 | 2/2020 | Barday et al. |
| 10,581,825 B2 | 3/2020 | Poschel et al. |
| 10,592,648 B2 | 3/2020 | Barday et al. |
| 10,592,692 B2 | 3/2020 | Brannon et al. |
| 10,606,916 B2 | 3/2020 | Brannon et al. |
| 10,613,971 B1 | 4/2020 | Vasikarla |
| 10,614,365 B2 | 4/2020 | Sathish et al. |
| 10,628,553 B1 | 4/2020 | Murrish et al. |
| 10,645,102 B2 | 5/2020 | Hamdi |
| 10,645,548 B2 | 5/2020 | Reynolds et al. |
| 10,649,630 B1 | 5/2020 | Vora et al. |
| 10,650,408 B1 | 5/2020 | Andersen et al. |
| 10,657,469 B2 | 5/2020 | Bade et al. |
| 10,657,504 B1 | 5/2020 | Zimmerman et al. |
| 10,659,566 B1 | 5/2020 | Luah et al. |
| 10,671,749 B2 | 6/2020 | Felice-Steele et al. |
| 10,671,760 B2 | 6/2020 | Esmailzadeh et al. |
| 10,678,945 B2 | 6/2020 | Barday et al. |
| 10,685,140 B2 | 6/2020 | Barday et al. |
| 10,706,176 B2 | 7/2020 | Brannon et al. |
| 10,706,226 B2 | 7/2020 | Byun et al. |
| 10,708,305 B2 | 7/2020 | Barday et al. |
| 10,713,387 B2 | 7/2020 | Brannon et al. |
| 10,726,145 B2 | 7/2020 | Duminy et al. |
| 10,726,153 B2 | 7/2020 | Nerurkar et al. |
| 10,726,158 B2 | 7/2020 | Brannon et al. |
| 10,732,865 B2 | 8/2020 | Jain et al. |
| 10,735,388 B2 | 8/2020 | Rose et al. |
| 10,740,487 B2 | 8/2020 | Barday et al. |
| 10,747,893 B2 | 8/2020 | Kiriyama et al. |
| 10,747,897 B2 | 8/2020 | Cook |
| 10,749,870 B2 | 8/2020 | Brouillette et al. |
| 10,762,213 B2 | 9/2020 | Rudek et al. |
| 10,762,236 B2 | 9/2020 | Brannon et al. |
| 10,769,302 B2 | 9/2020 | Barday et al. |
| 10,769,303 B2 | 9/2020 | Brannon et al. |
| 10,776,510 B2 | 9/2020 | Antonelli et al. |
| 10,776,518 B2 | 9/2020 | Barday et al. |
| 10,778,792 B1 | 9/2020 | Handy Bosma et al. |
| 10,783,256 B2 | 9/2020 | Brannon et al. |
| 10,785,173 B2 | 9/2020 | Willett et al. |
| 10,785,299 B2 | 9/2020 | Gupta et al. |
| 10,791,150 B2 | 9/2020 | Barday et al. |
| 10,795,527 B1 | 10/2020 | Legge et al. |
| 10,796,020 B2 | 10/2020 | Barday et al. |
| 10,796,260 B2 | 10/2020 | Brannon et al. |
| 10,798,133 B2 | 10/2020 | Barday et al. |
| 10,803,196 B2 | 10/2020 | Bodegas Martinez et al. |
| 10,805,331 B2 | 10/2020 | Boyer et al. |
| 10,831,831 B2 | 11/2020 | Greene |
| 10,834,590 B2 | 11/2020 | Turgeman et al. |
| 10,846,433 B2 | 11/2020 | Brannon et al. |
| 10,853,501 B2 | 12/2020 | Brannon |
| 10,860,721 B1 | 12/2020 | Gentile |
| 10,860,742 B2 | 12/2020 | Joseph et al. |
| 10,860,979 B2 | 12/2020 | Geffen et al. |
| 10,878,127 B2 | 12/2020 | Brannon et al. |
| 10,885,485 B2 | 1/2021 | Brannon et al. |
| 10,891,393 B2 | 1/2021 | Currier et al. |
| 10,893,074 B2 | 1/2021 | Sartor |
| 10,896,394 B2 | 1/2021 | Brannon et al. |
| 10,902,490 B2 | 1/2021 | He et al. |
| 10,909,488 B2 | 2/2021 | Hecht et al. |
| 10,924,514 B1 | 2/2021 | Altman et al. |
| 10,929,557 B2 | 2/2021 | Chavez |
| 10,949,555 B2 | 3/2021 | Rattan et al. |
| 10,949,565 B2 | 3/2021 | Barday et al. |
| 10,956,213 B1* | 3/2021 | Chambers ............ G06F 9/4881 |
| 10,957,326 B2 | 3/2021 | Bhaya et al. |
| 10,963,571 B2 | 3/2021 | Bar Joseph et al. |
| 10,963,572 B2 | 3/2021 | Belfiore, Jr. et al. |
| 10,965,547 B1 | 3/2021 | Esposito et al. |
| 10,970,418 B2 | 4/2021 | Durvasula et al. |
| 10,972,509 B2 | 4/2021 | Barday et al. |
| 10,976,950 B1 | 4/2021 | Trezzo et al. |
| 10,983,963 B1 | 4/2021 | Venkatasubramanian et al. |
| 10,984,458 B1 | 4/2021 | Gutierrez |
| 10,997,318 B2 | 5/2021 | Barday et al. |
| 11,003,748 B2 | 5/2021 | Oliker et al. |
| 11,012,475 B2 | 5/2021 | Patnala et al. |
| 11,023,528 B1* | 6/2021 | Lee ....................... H04L 65/762 |
| 11,037,168 B1* | 6/2021 | Lee ....................... G06Q 20/401 |
| 11,057,356 B2 | 7/2021 | Malhotra et al. |
| 11,057,427 B2 | 7/2021 | Wright et al. |
| 11,062,051 B2 | 7/2021 | Barday et al. |
| 11,068,318 B2 | 7/2021 | Kuesel et al. |
| 11,068,584 B2 | 7/2021 | Burriesci et al. |
| 11,068,618 B2 | 7/2021 | Brannon et al. |
| 11,068,797 B2 | 7/2021 | Bhide et al. |
| 11,068,847 B2 | 7/2021 | Boutros et al. |
| 11,093,950 B2 | 8/2021 | Hersh et al. |
| 11,138,299 B2 | 10/2021 | Brannon et al. |
| 11,144,622 B2 | 10/2021 | Brannon et al. |
| 11,144,678 B2 | 10/2021 | Dondini et al. |
| 11,144,862 B1 | 10/2021 | Jackson et al. |
| 11,195,134 B2 | 12/2021 | Brannon et al. |
| 11,201,929 B2 | 12/2021 | Dudmesh et al. |
| 11,210,420 B2 | 12/2021 | Brannon et al. |
| 11,238,390 B2 | 2/2022 | Brannon et al. |
| 11,240,273 B2 | 2/2022 | Barday et al. |
| 11,252,159 B2 | 2/2022 | Kannan et al. |
| 11,256,777 B2 | 2/2022 | Brannon et al. |
| 11,263,262 B2 | 3/2022 | Chen |
| 11,327,996 B2 | 5/2022 | Reynolds et al. |
| 11,443,062 B2 | 9/2022 | Latka |
| 2002/0004736 A1 | 1/2002 | Roundtree et al. |
| 2002/0049907 A1 | 4/2002 | Woods et al. |
| 2002/0055932 A1 | 5/2002 | Wheeler et al. |
| 2002/0077941 A1 | 6/2002 | Halligan et al. |
| 2002/0103854 A1 | 8/2002 | Okita |
| 2002/0129216 A1 | 9/2002 | Collins |
| 2002/0161594 A1 | 10/2002 | Bryan et al. |
| 2002/0161733 A1 | 10/2002 | Grainger |
| 2003/0041250 A1 | 2/2003 | Proudler |
| 2003/0065641 A1 | 4/2003 | Chaloux |
| 2003/0093680 A1 | 5/2003 | Astley et al. |
| 2003/0097451 A1 | 5/2003 | Bjorksten et al. |
| 2003/0097661 A1 | 5/2003 | Li et al. |
| 2003/0115142 A1 | 6/2003 | Brickell et al. |
| 2003/0130893 A1 | 7/2003 | Farmer |
| 2003/0131001 A1 | 7/2003 | Matsuo |
| 2003/0131093 A1 | 7/2003 | Aschen et al. |
| 2003/0140150 A1 | 7/2003 | Kemp et al. |
| 2003/0167216 A1 | 9/2003 | Brown et al. |
| 2003/0212604 A1 | 11/2003 | Cullen |
| 2004/0002818 A1 | 1/2004 | Kulp et al. |
| 2004/0025053 A1 | 2/2004 | Hayward |
| 2004/0088235 A1 | 5/2004 | Ziekle et al. |
| 2004/0098366 A1 | 5/2004 | Sinclair et al. |
| 2004/0098493 A1 | 5/2004 | Rees |
| 2004/0111359 A1 | 6/2004 | Hudock |
| 2004/0128508 A1 | 7/2004 | Wheeler et al. |
| 2004/0186912 A1 | 9/2004 | Harlow et al. |
| 2004/0193907 A1 | 9/2004 | Patanella |
| 2005/0022198 A1 | 1/2005 | Olapurath et al. |
| 2005/0033616 A1 | 2/2005 | Vavul et al. |
| 2005/0076294 A1 | 4/2005 | Dehamer et al. |
| 2005/0114343 A1 | 5/2005 | Wesinger et al. |
| 2005/0144066 A1 | 6/2005 | Cope et al. |
| 2005/0197884 A1 | 9/2005 | Mullen |
| 2005/0198177 A1 | 9/2005 | Black |
| 2005/0198646 A1 | 9/2005 | Kortela |
| 2005/0246292 A1 | 11/2005 | Sarcanin |
| 2005/0278538 A1 | 12/2005 | Fowler |
| 2006/0031078 A1 | 2/2006 | Pizzinger et al. |
| 2006/0035204 A1 | 2/2006 | LaMarche et al. |
| 2006/0041507 A1 | 2/2006 | Novack et al. |
| 2006/0075122 A1 | 4/2006 | Lindskog et al. |
| 2006/0149730 A1 | 7/2006 | Curtis |
| 2006/0156052 A1 | 7/2006 | Bodnar et al. |

(56) References Cited

U.S. PATENT DOCUMENTS

| | | |
|---|---|---|
| 2006/0190280 A1 | 8/2006 | Hoebel et al. |
| 2006/0206375 A1 | 9/2006 | Scott et al. |
| 2006/0224422 A1 | 10/2006 | Cohen |
| 2006/0253597 A1 | 11/2006 | Mujica |
| 2006/0259416 A1 | 11/2006 | Johnson |
| 2007/0011058 A1 | 1/2007 | Dev |
| 2007/0027715 A1 | 2/2007 | Gropper et al. |
| 2007/0061125 A1 | 3/2007 | Bhatt et al. |
| 2007/0061393 A1 | 3/2007 | Moore |
| 2007/0130101 A1 | 6/2007 | Anderson et al. |
| 2007/0130323 A1 | 6/2007 | Landsman et al. |
| 2007/0157311 A1 | 7/2007 | Meier et al. |
| 2007/0173355 A1 | 7/2007 | Klein |
| 2007/0179793 A1 | 8/2007 | Bagchi et al. |
| 2007/0180490 A1 | 8/2007 | Renzi et al. |
| 2007/0192438 A1 | 8/2007 | Goei |
| 2007/0266420 A1 | 11/2007 | Hawkins et al. |
| 2007/0283171 A1 | 12/2007 | Breslin et al. |
| 2008/0005194 A1 | 1/2008 | Smolen et al. |
| 2008/0015927 A1 | 1/2008 | Ramirez |
| 2008/0028065 A1 | 1/2008 | Caso et al. |
| 2008/0028435 A1 | 1/2008 | Strickland et al. |
| 2008/0046982 A1 | 2/2008 | Parkinson |
| 2008/0047016 A1 | 2/2008 | Spoonamore |
| 2008/0077512 A1 | 3/2008 | Grewal |
| 2008/0120699 A1 | 5/2008 | Spear |
| 2008/0140696 A1 | 6/2008 | Mathuria |
| 2008/0189306 A1 | 8/2008 | Hewett et al. |
| 2008/0195436 A1 | 8/2008 | Whyte |
| 2008/0222271 A1 | 9/2008 | Spires |
| 2008/0235177 A1 | 9/2008 | Kim et al. |
| 2008/0270203 A1 | 10/2008 | Holmes et al. |
| 2008/0270351 A1 | 10/2008 | Thomsen |
| 2008/0270381 A1 | 10/2008 | Thomsen |
| 2008/0270382 A1 | 10/2008 | Thomsen et al. |
| 2008/0270451 A1 | 10/2008 | Thomsen et al. |
| 2008/0270462 A1 | 10/2008 | Thomsen |
| 2008/0281649 A1 | 11/2008 | Morris |
| 2008/0282320 A1 | 11/2008 | Denovo et al. |
| 2008/0288271 A1 | 11/2008 | Faust |
| 2008/0288299 A1 | 11/2008 | Schultz |
| 2009/0012896 A1 | 1/2009 | Arnold |
| 2009/0022301 A1 | 1/2009 | Mudaliar |
| 2009/0037975 A1 | 2/2009 | Ishikawa et al. |
| 2009/0119500 A1 | 5/2009 | Roth et al. |
| 2009/0132419 A1 | 5/2009 | Grammer et al. |
| 2009/0138276 A1 | 5/2009 | Hayashida et al. |
| 2009/0140035 A1 | 6/2009 | Miller |
| 2009/0144702 A1 | 6/2009 | Atkin et al. |
| 2009/0158249 A1 | 6/2009 | Tomkins et al. |
| 2009/0172705 A1 | 7/2009 | Cheong |
| 2009/0182818 A1 | 7/2009 | Krywaniuk |
| 2009/0187764 A1 | 7/2009 | Astakhov et al. |
| 2009/0204452 A1 | 8/2009 | Iskandar et al. |
| 2009/0204820 A1 | 8/2009 | Brandenburg et al. |
| 2009/0210347 A1 | 8/2009 | Sarcanin |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0010912 A1 | 1/2010 | Jones et al. |
| 2010/0010968 A1 | 1/2010 | Redlich et al. |
| 2010/0077484 A1 | 3/2010 | Paretti et al. |
| 2010/0082533 A1 | 4/2010 | Nakamura et al. |
| 2010/0094650 A1 | 4/2010 | Tran et al. |
| 2010/0100398 A1 | 4/2010 | Auker et al. |
| 2010/0121773 A1 | 5/2010 | Currier et al. |
| 2010/0161973 A1 | 6/2010 | Chin et al. |
| 2010/0192201 A1 | 7/2010 | Shimoni et al. |
| 2010/0205057 A1 | 8/2010 | Hook et al. |
| 2010/0223349 A1 | 9/2010 | Thorson |
| 2010/0228786 A1 | 9/2010 | Török |
| 2010/0234987 A1 | 9/2010 | Benschop et al. |
| 2010/0235297 A1 | 9/2010 | Mamorsky |
| 2010/0235915 A1 | 9/2010 | Memon et al. |
| 2010/0262624 A1 | 10/2010 | Pullikottil |
| 2010/0268628 A1 | 10/2010 | Pitkow et al. |
| 2010/0268932 A1 | 10/2010 | Bhattacharjee |
| 2010/0281313 A1 | 11/2010 | White et al. |
| 2010/0287114 A1 | 11/2010 | Bartko et al. |
| 2010/0333012 A1 | 12/2010 | Adachi et al. |
| 2011/0006996 A1 | 1/2011 | Smith et al. |
| 2011/0010202 A1 | 1/2011 | Neale |
| 2011/0082794 A1 | 4/2011 | Blechman |
| 2011/0137696 A1 | 6/2011 | Meyer et al. |
| 2011/0145154 A1 | 6/2011 | Rivers et al. |
| 2011/0153396 A1 | 6/2011 | Marcuvitz et al. |
| 2011/0191664 A1 | 8/2011 | Sheleheda et al. |
| 2011/0208850 A1 | 8/2011 | Sheleheda et al. |
| 2011/0209067 A1 | 8/2011 | Bogess et al. |
| 2011/0231896 A1 | 9/2011 | Tovar |
| 2011/0238573 A1 | 9/2011 | Varadarajan |
| 2011/0252456 A1 | 10/2011 | Hatakeyama |
| 2011/0302643 A1 | 12/2011 | Pichna et al. |
| 2012/0019379 A1 | 1/2012 | Ayed |
| 2012/0041939 A1 | 2/2012 | Amsterdamski |
| 2012/0084151 A1 | 4/2012 | Kozak et al. |
| 2012/0084349 A1 | 4/2012 | Lee et al. |
| 2012/0102411 A1 | 4/2012 | Sathish |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0131438 A1 | 5/2012 | Li et al. |
| 2012/0143650 A1 | 6/2012 | Crowley et al. |
| 2012/0144499 A1 | 6/2012 | Tan et al. |
| 2012/0191596 A1 | 7/2012 | Kremen et al. |
| 2012/0226621 A1 | 9/2012 | Petran et al. |
| 2012/0239557 A1 | 9/2012 | Weinflash et al. |
| 2012/0254320 A1 | 10/2012 | Dove et al. |
| 2012/0259752 A1 | 10/2012 | Agee |
| 2012/0323700 A1 | 12/2012 | Aleksandrovich et al. |
| 2012/0324113 A1 | 12/2012 | Prince et al. |
| 2012/0330769 A1 | 12/2012 | Arceo |
| 2012/0330869 A1 | 12/2012 | Durham |
| 2013/0004933 A1 | 1/2013 | Bhaskaran |
| 2013/0018954 A1 | 1/2013 | Cheng |
| 2013/0085801 A1 | 4/2013 | Sharpe et al. |
| 2013/0091156 A1 | 4/2013 | Raiche et al. |
| 2013/0103485 A1 | 4/2013 | Postrel |
| 2013/0111323 A1 | 5/2013 | Taghaddos et al. |
| 2013/0124257 A1 | 5/2013 | Schubert |
| 2013/0152041 A1* | 6/2013 | Hatfield .......... G06Q 10/06 717/105 |
| 2013/0159351 A1 | 6/2013 | Hamann et al. |
| 2013/0166573 A1 | 6/2013 | Vaitheeswaran et al. |
| 2013/0171968 A1 | 7/2013 | Wang |
| 2013/0179982 A1 | 7/2013 | Bridges et al. |
| 2013/0179988 A1 | 7/2013 | Bekker et al. |
| 2013/0185806 A1 | 7/2013 | Hatakeyama |
| 2013/0211872 A1 | 8/2013 | Cherry et al. |
| 2013/0218829 A1 | 8/2013 | Martinez |
| 2013/0219459 A1 | 8/2013 | Bradley |
| 2013/0254649 A1 | 9/2013 | ONeill et al. |
| 2013/0254699 A1 | 9/2013 | Bashir et al. |
| 2013/0262328 A1 | 10/2013 | Federgreen |
| 2013/0282466 A1 | 10/2013 | Hampton |
| 2013/0290169 A1 | 10/2013 | Bathula et al. |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006355 A1 | 1/2014 | Kirihata |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Peter |
| 2014/0040161 A1 | 2/2014 | Jason |
| 2014/0040979 A1 | 2/2014 | Barton et al. |
| 2014/0041048 A1 | 2/2014 | Goodwin et al. |
| 2014/0047551 A1 | 2/2014 | Nagasundaram et al. |
| 2014/0052463 A1 | 2/2014 | Cashman et al. |

(56) References Cited

U.S. PATENT DOCUMENTS

| | | |
|---|---|---|
| 2014/0067973 A1 | 3/2014 | Eden |
| 2014/0074550 A1 | 3/2014 | Chourey |
| 2014/0074645 A1 | 3/2014 | Ingram |
| 2014/0089027 A1 | 3/2014 | Brown |
| 2014/0089039 A1 | 3/2014 | McClellan |
| 2014/0108173 A1 | 4/2014 | Cooper et al. |
| 2014/0108968 A1 | 4/2014 | Vishria |
| 2014/0137257 A1 | 5/2014 | Martinez et al. |
| 2014/0142988 A1 | 5/2014 | Grosso et al. |
| 2014/0143011 A1 | 5/2014 | Mudugu et al. |
| 2014/0143844 A1 | 5/2014 | Goertzen |
| 2014/0164476 A1 | 6/2014 | Thomson |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0222468 A1 | 8/2014 | Araya et al. |
| 2014/0244309 A1 | 8/2014 | Francois |
| 2014/0244325 A1 | 8/2014 | Cartwright |
| 2014/0244375 A1 | 8/2014 | Kim |
| 2014/0244399 A1 | 8/2014 | Orduna et al. |
| 2014/0257917 A1 | 9/2014 | Spencer et al. |
| 2014/0258093 A1 | 9/2014 | Gardiner et al. |
| 2014/0278539 A1 | 9/2014 | Edwards |
| 2014/0278663 A1 | 9/2014 | Samuel et al. |
| 2014/0278730 A1 | 9/2014 | Muhart et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289681 A1 | 9/2014 | Wielgosz |
| 2014/0289862 A1 | 9/2014 | Gorfein et al. |
| 2014/0317171 A1 | 10/2014 | Fox et al. |
| 2014/0324480 A1 | 10/2014 | Dufel et al. |
| 2014/0337041 A1 | 11/2014 | Madden et al. |
| 2014/0337466 A1 | 11/2014 | Li et al. |
| 2014/0344015 A1 | 11/2014 | Puértolas-Montañés et al. |
| 2015/0006514 A1 | 1/2015 | Hung |
| 2015/0012363 A1 | 1/2015 | Grant et al. |
| 2015/0019530 A1 | 1/2015 | Felch |
| 2015/0026056 A1 | 1/2015 | Calman et al. |
| 2015/0026260 A1 | 1/2015 | Worthley |
| 2015/0033112 A1 | 1/2015 | Norwood et al. |
| 2015/0066577 A1 | 3/2015 | Christiansen et al. |
| 2015/0066865 A1 | 3/2015 | Yara et al. |
| 2015/0088598 A1 | 3/2015 | Acharyya et al. |
| 2015/0089585 A1 | 3/2015 | Novack |
| 2015/0106264 A1 | 4/2015 | Johnson |
| 2015/0106867 A1 | 4/2015 | Liang |
| 2015/0106948 A1 | 4/2015 | Holman et al. |
| 2015/0106949 A1 | 4/2015 | Holman et al. |
| 2015/0121462 A1 | 4/2015 | Courage et al. |
| 2015/0143258 A1 | 5/2015 | Carolan et al. |
| 2015/0149362 A1 | 5/2015 | Baum et al. |
| 2015/0154520 A1 | 6/2015 | Federgreen et al. |
| 2015/0163121 A1 | 6/2015 | Mahaffey et al. |
| 2015/0169318 A1 | 6/2015 | Nash |
| 2015/0172296 A1 | 6/2015 | Fujioka |
| 2015/0178740 A1 | 6/2015 | Borawski et al. |
| 2015/0199534 A1 | 7/2015 | Francis et al. |
| 2015/0199541 A1 | 7/2015 | Koch et al. |
| 2015/0199702 A1 | 7/2015 | Singh |
| 2015/0205955 A1 | 7/2015 | Turgeman |
| 2015/0229664 A1 | 8/2015 | Hawthorn et al. |
| 2015/0235049 A1 | 8/2015 | Cohen et al. |
| 2015/0235050 A1 | 8/2015 | Wouhaybi et al. |
| 2015/0235283 A1 | 8/2015 | Nishikawa |
| 2015/0242778 A1 | 8/2015 | Wilcox et al. |
| 2015/0242858 A1 | 8/2015 | Smith et al. |
| 2015/0248391 A1 | 9/2015 | Watanabe |
| 2015/0254597 A1 | 9/2015 | Jahagirdar |
| 2015/0261887 A1 | 9/2015 | Joukov |
| 2015/0262189 A1 | 9/2015 | Vergeer |
| 2015/0264417 A1 | 9/2015 | Spitz et al. |
| 2015/0269384 A1 | 9/2015 | Holman et al. |
| 2015/0271167 A1 | 9/2015 | Kalai |
| 2015/0288715 A1 | 10/2015 | Hotchkiss |
| 2015/0309813 A1 | 10/2015 | Patel |
| 2015/0310227 A1 | 10/2015 | Ishida et al. |
| 2015/0310575 A1 | 10/2015 | Shelton |
| 2015/0348200 A1 | 12/2015 | Fair et al. |
| 2015/0356362 A1 | 12/2015 | Demos |
| 2015/0379430 A1 | 12/2015 | Dirac et al. |
| 2016/0006760 A1 | 1/2016 | Lala et al. |
| 2016/0012465 A1 | 1/2016 | Sharp |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071020 A1 | 3/2016 | Sathish et al. |
| 2016/0071112 A1 | 3/2016 | Unser |
| 2016/0080405 A1 | 3/2016 | Schler et al. |
| 2016/0087957 A1 | 3/2016 | Shah et al. |
| 2016/0094566 A1 | 3/2016 | Parekh |
| 2016/0099963 A1 | 4/2016 | Mahaffey et al. |
| 2016/0103963 A1 | 4/2016 | Mishra |
| 2016/0104259 A1 | 4/2016 | Menrad |
| 2016/0124742 A1 | 5/2016 | Rangasamy et al. |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0140466 A1 | 5/2016 | Sidebottom et al. |
| 2016/0143570 A1 | 5/2016 | Valacich et al. |
| 2016/0148143 A1 | 5/2016 | Anderson et al. |
| 2016/0162269 A1 | 6/2016 | Pogorelik et al. |
| 2016/0164915 A1 | 6/2016 | Cook |
| 2016/0180386 A1 | 6/2016 | Konig |
| 2016/0188450 A1 | 6/2016 | Appusamy et al. |
| 2016/0189156 A1 | 6/2016 | Kim et al. |
| 2016/0196189 A1 | 7/2016 | Miyagi et al. |
| 2016/0203331 A1 | 7/2016 | Khan et al. |
| 2016/0225000 A1 | 8/2016 | Glasgow |
| 2016/0232465 A1 | 8/2016 | Kurtz et al. |
| 2016/0232534 A1 | 8/2016 | Lacey et al. |
| 2016/0234319 A1 | 8/2016 | Griffin |
| 2016/0253497 A1 | 9/2016 | Christodorescu et al. |
| 2016/0255139 A1 | 9/2016 | Rathod |
| 2016/0261631 A1 | 9/2016 | Vissamsetty et al. |
| 2016/0262163 A1 | 9/2016 | Gonzalez Garrido et al. |
| 2016/0292453 A1 | 10/2016 | Patterson et al. |
| 2016/0292621 A1 | 10/2016 | Ciccone et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0335531 A1 | 11/2016 | Mullen et al. |
| 2016/0342811 A1 | 11/2016 | Whitcomb et al. |
| 2016/0350836 A1 | 12/2016 | Burns et al. |
| 2016/0359861 A1 | 12/2016 | Manov et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0032395 A1 | 2/2017 | Kaufman et al. |
| 2017/0032408 A1 | 2/2017 | Kumar et al. |
| 2017/0034101 A1 | 2/2017 | Kumar et al. |
| 2017/0041324 A1 | 2/2017 | Ionutescu et al. |
| 2017/0046399 A1 | 2/2017 | Sankaranarasimhan et al. |
| 2017/0046753 A1 | 2/2017 | Deupree, IV |
| 2017/0061501 A1 | 3/2017 | Horwich |
| 2017/0063881 A1 | 3/2017 | Doganata et al. |
| 2017/0068785 A1 | 3/2017 | Experton et al. |
| 2017/0070495 A1 | 3/2017 | Cherry et al. |
| 2017/0093917 A1 | 3/2017 | Chandra et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |

(56) References Cited

U.S. PATENT DOCUMENTS

| | | |
|---|---|---|
| 2017/0171325 A1 | 6/2017 | Perez |
| 2017/0177324 A1 | 6/2017 | Frank et al. |
| 2017/0177681 A1 | 6/2017 | Potiagalov |
| 2017/0180378 A1 | 6/2017 | Tyler et al. |
| 2017/0180505 A1 | 6/2017 | Shaw et al. |
| 2017/0193017 A1 | 7/2017 | Migliori |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220685 A1 | 8/2017 | Yan et al. |
| 2017/0220964 A1 | 8/2017 | Datta Ray |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278004 A1 | 9/2017 | McElhinney et al. |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0289168 A1 | 10/2017 | Bar et al. |
| 2017/0289199 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2017/0353404 A1 | 12/2017 | Hodge |
| 2018/0032757 A1 | 2/2018 | Michael |
| 2018/0039975 A1 | 2/2018 | Hefetz |
| 2018/0041498 A1 | 2/2018 | Kikuchi |
| 2018/0046753 A1 | 2/2018 | Shelton |
| 2018/0046939 A1 | 2/2018 | Meron et al. |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0131574 A1 | 5/2018 | Jacobs et al. |
| 2018/0131658 A1 | 5/2018 | Bhagwan et al. |
| 2018/0165637 A1 | 6/2018 | Romero et al. |
| 2018/0182009 A1 | 6/2018 | Barday et al. |
| 2018/0198614 A1 | 7/2018 | Neumann |
| 2018/0204281 A1 | 7/2018 | Painter et al. |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0301222 A1 | 10/2018 | Dew, Sr. et al. |
| 2018/0307859 A1 | 10/2018 | Lafever et al. |
| 2018/0336509 A1 | 11/2018 | Guttmann |
| 2018/0349583 A1 | 12/2018 | Turgeman et al. |
| 2018/0351888 A1 | 12/2018 | Howard |
| 2018/0352003 A1 | 12/2018 | Winn et al. |
| 2018/0357243 A1 | 12/2018 | Yoon |
| 2018/0365720 A1 | 12/2018 | Goldman et al. |
| 2018/0374030 A1 | 12/2018 | Barday et al. |
| 2018/0375814 A1 | 12/2018 | Hart |
| 2019/0005210 A1 | 1/2019 | Wiederspohn et al. |
| 2019/0012211 A1* | 1/2019 | Selvaraj .............. G06F 11/1464 |
| 2019/0012672 A1 | 1/2019 | Francesco |
| 2019/0019184 A1 | 1/2019 | Lacey et al. |
| 2019/0050547 A1 | 2/2019 | Welsh et al. |
| 2019/0087570 A1 | 3/2019 | Sloane |
| 2019/0096020 A1 | 3/2019 | Barday et al. |
| 2019/0108353 A1 | 4/2019 | Sadeh et al. |
| 2019/0130132 A1 | 5/2019 | Barbas et al. |
| 2019/0132350 A1 | 5/2019 | Smith et al. |
| 2019/0138496 A1 | 5/2019 | Yamaguchi |
| 2019/0139087 A1 | 5/2019 | Dabbs et al. |
| 2019/0148003 A1 | 5/2019 | Van Hoe |
| 2019/0156053 A1 | 5/2019 | Vogel et al. |
| 2019/0156058 A1 | 5/2019 | Van Dyne et al. |
| 2019/0171801 A1 | 6/2019 | Barday et al. |
| 2019/0179652 A1 | 6/2019 | Hesener et al. |
| 2019/0180051 A1 | 6/2019 | Barday et al. |
| 2019/0182294 A1 | 6/2019 | Rieke et al. |
| 2019/0188402 A1 | 6/2019 | Wang et al. |
| 2019/0266200 A1 | 8/2019 | Francolla |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0272492 A1 | 9/2019 | Elledge et al. |
| 2019/0294818 A1 | 9/2019 | Barday et al. |
| 2019/0303509 A1 | 10/2019 | Greene |
| 2019/0332802 A1 | 10/2019 | Barday et al. |
| 2019/0332807 A1 | 10/2019 | Lafever et al. |
| 2019/0333118 A1 | 10/2019 | Crimmins et al. |
| 2019/0354709 A1 | 11/2019 | Brinskelle |
| 2019/0356684 A1 | 11/2019 | Sinha et al. |
| 2019/0362169 A1 | 11/2019 | Lin et al. |
| 2019/0362268 A1 | 11/2019 | Fogarty et al. |
| 2019/0377901 A1 | 12/2019 | Balzer et al. |
| 2019/0378073 A1 | 12/2019 | Lopez et al. |
| 2019/0384934 A1 | 12/2019 | Kim |
| 2019/0392162 A1 | 12/2019 | Stern et al. |
| 2019/0392170 A1 | 12/2019 | Barday et al. |
| 2019/0392171 A1 | 12/2019 | Barday et al. |
| 2020/0004938 A1 | 1/2020 | Brannon et al. |
| 2020/0020454 A1 | 1/2020 | McGarvey et al. |
| 2020/0050966 A1 | 2/2020 | Enuka et al. |
| 2020/0051117 A1 | 2/2020 | Mitchell |
| 2020/0057781 A1 | 2/2020 | McCormick |
| 2020/0074471 A1 | 3/2020 | Adjaoute |
| 2020/0081865 A1 | 3/2020 | Farrar et al. |
| 2020/0082270 A1 | 3/2020 | Gu et al. |
| 2020/0090197 A1 | 3/2020 | Rodriguez et al. |
| 2020/0092179 A1 | 3/2020 | Chieu et al. |
| 2020/0110589 A1 | 4/2020 | Bequet et al. |
| 2020/0110904 A1 | 4/2020 | Shinde et al. |
| 2020/0117737 A1 | 4/2020 | Gopalakrishnan et al. |
| 2020/0137097 A1 | 4/2020 | Zimmermann et al. |
| 2020/0143301 A1 | 5/2020 | Bowers |
| 2020/0143797 A1 | 5/2020 | Manoharan et al. |
| 2020/0159952 A1 | 5/2020 | Dain et al. |
| 2020/0159955 A1 | 5/2020 | Barlik et al. |
| 2020/0167653 A1 | 5/2020 | Manjunath et al. |
| 2020/0175424 A1 | 6/2020 | Kursun |
| 2020/0183655 A1 | 6/2020 | Barday et al. |
| 2020/0186355 A1 | 6/2020 | Davies |
| 2020/0193018 A1 | 6/2020 | Van Dyke |
| 2020/0193022 A1 | 6/2020 | Lunsford et al. |
| 2020/0210558 A1 | 7/2020 | Barday et al. |
| 2020/0210620 A1 | 7/2020 | Haletky |
| 2020/0211002 A1 | 7/2020 | Steinberg |
| 2020/0220901 A1 | 7/2020 | Barday et al. |
| 2020/0226156 A1 | 7/2020 | Borra et al. |
| 2020/0226196 A1 | 7/2020 | Brannon et al. |
| 2020/0242259 A1 | 7/2020 | Chirravuri et al. |
| 2020/0242719 A1 | 7/2020 | Lee |
| 2020/0250342 A1 | 8/2020 | Miller et al. |
| 2020/0252413 A1 | 8/2020 | Buzbee et al. |
| 2020/0252817 A1 | 8/2020 | Brouillette et al. |
| 2020/0272764 A1 | 8/2020 | Brannon et al. |
| 2020/0285755 A1 | 9/2020 | Kassoumeh et al. |
| 2020/0293679 A1 | 9/2020 | Handy Bosma et al. |
| 2020/0296171 A1 | 9/2020 | Mocanu et al. |
| 2020/0302089 A1 | 9/2020 | Barday et al. |
| 2020/0310917 A1 | 10/2020 | Tkachev et al. |
| 2020/0311310 A1 | 10/2020 | Barday et al. |
| 2020/0344243 A1 | 10/2020 | Brannon et al. |
| 2020/0356695 A1 | 11/2020 | Brannon et al. |
| 2020/0364369 A1 | 11/2020 | Brannon et al. |
| 2020/0372178 A1 | 11/2020 | Barday et al. |
| 2020/0394327 A1 | 12/2020 | Childress et al. |
| 2020/0401380 A1 | 12/2020 | Jacobs et al. |
| 2020/0401962 A1 | 12/2020 | Gottemukkala et al. |
| 2020/0410117 A1 | 12/2020 | Barday et al. |
| 2020/0410131 A1 | 12/2020 | Barday et al. |
| 2020/0410132 A1 | 12/2020 | Brannon et al. |
| 2021/0012341 A1 | 1/2021 | Garg et al. |
| 2021/0056569 A1 | 2/2021 | Silberman et al. |
| 2021/0081567 A1 | 3/2021 | Park et al. |
| 2021/0099449 A1 | 4/2021 | Frederick et al. |
| 2021/0110047 A1 | 4/2021 | Victor |
| 2021/0125089 A1 | 4/2021 | Nickl et al. |

(56) References Cited

U.S. PATENT DOCUMENTS

| | | | |
|---|---|---|---|
| 2021/0136065 | A1 | 5/2021 | Liokumovich et al. |
| 2021/0152496 | A1 | 5/2021 | Kim et al. |
| 2021/0233157 | A1 | 7/2021 | Crutchfield, Jr. |
| 2021/0243595 | A1 | 8/2021 | Buck et al. |
| 2021/0248247 | A1 | 8/2021 | Poothokaran et al. |
| 2021/0256163 | A1 | 8/2021 | Fleming et al. |
| 2021/0279360 | A1 | 9/2021 | Gimenez Palop et al. |
| 2021/0297441 | A1 | 9/2021 | Olalere |
| 2021/0303828 | A1 | 9/2021 | Lafreniere et al. |
| 2021/0312061 | A1 | 10/2021 | Schroeder et al. |
| 2021/0326786 | A1 | 10/2021 | Sun et al. |
| 2021/0328969 | A1 | 10/2021 | Gaddam et al. |
| 2021/0382949 | A1 | 12/2021 | Yastrebenetsky et al. |
| 2021/0397735 | A1 | 12/2021 | Samatov et al. |
| 2021/0400018 | A1 | 12/2021 | Vettaikaran et al. |
| 2021/0406712 | A1 | 12/2021 | Bhide et al. |
| 2022/0217045 | A1* | 7/2022 | Blau .................... G06F 9/5077 |

FOREIGN PATENT DOCUMENTS

| | | |
|---|---|---|
| EP | 1394698 | 3/2004 |
| EP | 2031540 | 3/2009 |
| KR | 20130062500 | 6/2013 |
| WO | 2001033430 | 5/2001 |
| WO | 20020067158 | 8/2002 |
| WO | 20030050773 | 6/2003 |
| WO | 2005008411 | 1/2005 |
| WO | 2007002412 | 1/2007 |
| WO | 2008/134203 | 11/2008 |
| WO | 2012174659 | 12/2012 |
| WO | 2015116905 | 8/2015 |
| WO | 2020/146028 | 7/2020 |
| WO | 2022006421 | 1/2022 |

OTHER PUBLICATIONS

Preuveneers et al, "Access Control with Delegated Authorized Policy Evaluation for Data-Driven Microservice Workflows", Future Internet 2017, MDPI, pp. 1-21 (Year: 2017).*

Czeskis et al., "Lightweight Server Support for Browser-based CSRF Protection," Proceedings of the 22nd International Conference on World Wide Web, 2013, pp. 273-284 (Year: 2013).

Final Office Action, dated Feb. 25, 2022, from corresponding U.S. Appl. No. 17/346,586.

Final Office Action, dated Mar. 21, 2022, from corresponding U.S. Appl. No. 17/373,444.

Final Office Action, dated Mar. 22, 2022, from corresponding U.S. Appl. No. 17/380,485.

Matte et al, "Do Cookie Banners Respect my Choice?: Measuring Legal Compliance of Banners from IAB Europe's Transparency and Consent Framework," 2020 IEEE Symposium on Security and Privacy (SP), 2020, pp. 791-809 (Year: 2020).

Notice of Allowance, dated Feb. 24, 2022, from corresponding U.S. Appl. No. 17/234,205.

Notice of Allowance, dated Feb. 24, 2022, from corresponding U.S. Appl. No. 17/549,170.

Notice of Allowance, dated Mar. 16, 2022, from corresponding U.S. Appl. No. 17/486,350.

Notice of Allowance, dated Mar. 2, 2022, from corresponding U.S. Appl. No. 16/872,130.

Notice of Allowance, dated Mar. 2, 2022, from corresponding U.S. Appl. No. 17/535,098.

Notice of Allowance, dated Mar. 21, 2022, from corresponding U.S. Appl. No. 17/366,754.

Notice of Allowance, dated Mar. 22, 2022, from corresponding U.S. Appl. No. 17/475,244.

Notice of Allowance, dated Mar. 22, 2022, from corresponding U.S. Appl. No. 17/504,102.

Notice of Allowance, dated Mar. 28, 2022, from corresponding U.S. Appl. No. 17/499,609.

Notice of Allowance, dated Mar. 4, 2022, from corresponding U.S. Appl. No. 17/409,999.

Office Action, dated Mar. 1, 2022, from corresponding U.S. Appl. No. 17/119,080.

Office Action, dated Mar. 2, 2022, from corresponding U.S. Appl. No. 17/020,275.

Office Action, dated Mar. 2, 2022, from corresponding U.S. Appl. No. 17/161,159.

Office Action, dated Mar. 2, 2022, from corresponding U.S. Appl. No. 17/200,698.

Office Action, dated Mar. 21, 2022, from corresponding U.S. Appl. No. 17/571,871.

Office Action, dated Mar. 22, 2022, from corresponding U.S. Appl. No. 17/187,329.

Sanchez-Rola et al, "Can I Opt Out Yet?: GDPR and the Global Illusion of Cookie Control," Proceedings of the 2019 ACM Asia Conference on Computer and Communications Security, 2019, pp. 340-351 (Year: 2019).

Final Office Action, dated Apr. 1, 2022, from corresponding U.S. Appl. No. 17/370,650.

Final Office Action, dated Apr. 5, 2022, from corresponding U.S. Appl. No. 17/013,756.

International Search Report, dated Apr. 12, 2022, from corresponding International Application No. PCT/US2022/016735.

International Search Report, dated Feb. 14, 2022, from corresponding International Application No. PCT/US2021/058274.

International Search Report, dated Mar. 18, 2022, from corresponding International Application No. PCT/US2022/013733.

Lewis, James et al, "Microservices," Mar. 25, 2014 (Mar. 25, 2014),XP055907494, Retrieved from the Internet: https://martinfowler.com/articles/micr oservices.html. [retrieved on Mar. 31, 2022].

Notice of Allowance, dated Apr. 4, 2022, from corresponding U.S. Appl. No. 17/493,332.

Notice of Allowance, dated Apr. 4, 2022, from corresponding U.S. Appl. No. 17/572,298.

Notice of Allowance, dated Mar. 31, 2022, from corresponding U.S. Appl. No. 17/476,209.

Office Action, dated Apr. 8, 2022, from corresponding U.S. Appl. No. 16/938,509.

Restriction Requirement, dated Apr. 12, 2022, from corresponding U.S. Appl. No. 17/584,187.

Written Opinion of the International Searching Authority, dated Apr. 12, 2022, from corresponding International Application No. PCT/US2022/016735.

Written Opinion of the International Searching Authority, dated Feb. 14, 2022, from corresponding International Application No. PCT/US2021/058274.

Written Opinion of the International Searching Authority, dated Mar. 18, 2022, from corresponding International Application No. PCT/US2022/013733.

Ali et al., "Age Estimation from Facial Images Using Biometric Ratios and Wrinkle Analysis," IEEE, 2015, pp. 1-5 (Year: 2015).

Chang et al., "A Ranking Approach for Human Age Estimation Based on Face Images," IEEE, 2010, pp. 3396-3399 (Year: 2010).

Edinger et al, "Age and Gender Estimation of Unfiltered Faces," IEEE, 2014, pp. 2170-2179 (Year: 2014).

Final Office Action, dated Apr. 25, 2022, from corresponding U.S. Appl. No. 17/149,421.

Han et al, "Demographic Estimation from Face Images: Human vs. Machine Performance," IEEE, 2015, pp. 1148-1161 (Year: 2015).

Huettner, "Digital Risk Management: Protecting Your Privacy, Improving Security, and Preparing for Emergencies," IEEE, pp. 136-138 (Year: 2006).

Jayasinghe et al, "Matching Facial Images Using Age Related Morphing Changes," ISSRI, 2009, pp. 2901-2907 (Year: 2009).

Khan et al, "Wrinkles Energy Based Age Estimation Using Discrete Cosine Transform," IEEE, 2015, pp. 1-4 (Year 2015).

Kristian et al, "Human Facial Age Classification Using Active Shape Module, Geometrical Feature, and Support Vendor Machine on Early Growth Stage," ISICO, 2015, pp. 1-8 (Year: 2015).

Liu et al, "Overview on Ontology Mapping and Approach," IEEE, pp. 592-595 (Year: 2011).

(56) References Cited

OTHER PUBLICATIONS

Milic et al, "Comparative Analysis of Metadata Models on e-Government Open Data Platforms," IEEE, pp. 119-130 (Year: 2021).
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 20, 2022, from corresponding U.S. Appl. No. 17/573,808.
Notice of Allowance, dated Apr. 27, 2022, from corresponding U.S. Appl. No. 17/573,999.
Notice of Allowance, dated Apr. 28, 2022, from corresponding U.S. Appl. No. 17/670,352.
Office Action, dated Apr. 12, 2022, from corresponding U.S. Appl. No. 17/670,341.
Office Action, dated Apr. 18, 2022, from corresponding U.S. Appl. No. 17/670,349.
Office Action, dated Apr. 25, 2022, from corresponding U.S. Appl. No. 17/588,645.
Office Action, dated Apr. 26, 2022, from corresponding U.S. Appl. No. 17/151,334.
Qu et al, "Metadata Type System: Integrate Presentation, Data Models and Extraction to Enable Exploratory Browsing Interfaces," ACM, pp. 107-116 (Year: 2014).
Shulz et al, "Generative Data Models for Validation and Evaluation of Visualization Techniques," ACM, pp. 1-13 (Year: 2016).
Final Office Action, dated Apr. 28, 2022, from corresponding U.S. Appl. No. 16/925,550.
Notice of Allowance, dated Apr. 28, 2022, from corresponding U.S. Appl. No. 17/592,922.
Notice of Allowance, dated Apr. 29, 2022, from corresponding U.S. Appl. No. 17/387,421.
Bansal et al, "Integrating Big Data: A Semantic Extract-Transform-Load Framework," IEEE, pp. 42-50 (Year: 2015).
Bindschaedler et al, "Privacy Through Fake Yet Semantically Real Traces," arxiv.org, Cornell University Library, 201 OLIN Library Cornell University Ithaca, NY 14853, May 27, 2015 (Year: 2015).
Castro et al, "Creating Lightweight Ontologies for Dataset Description," IEEE, pp. 1-4 (Year: 2014).
Ex Parte Quayle Action, dated May 10, 2022, from corresponding U.S. Appl. No. 17/668,714.
Final Office Action, dated May 12, 2022, from corresponding U.S. Appl. No. 17/499,624.
Final Office Action, dated May 16, 2022, from corresponding U.S. Appl. No. 17/480,377.
Final Office Action, dated May 2, 2022, from corresponding U.S. Appl. No. 17/499,595.
Final Office Action, dated May 24, 2022, from corresponding U.S. Appl. No. 17/499,582.
International Search Report, dated May 12, 2022, from corresponding International Application No. PCT/US2022/015929.
International Search Report, dated May 17, 2022, from corresponding International Application No. PCT/US2022/015241.
International Search Report, dated May 19, 2022, from corresponding International Application No. PCT/US2022/015637.
Lasierra et al, "Data Management in Home Scenarios Using an Autonomic Ontology-Based Approach," IEEE, pp. 94-99 (Year: 2012).
Lenzerini et al, "Ontology-based Data Management," ACM, pp. 5-6 (Year: 2011).
Niu, et al, "Achieving Data Truthfulness and Privacy Preservation in Data Markets", IEEE Transactions On Knowledge and Data Engineering, IEEE Service Centre, Los Alamitos, CA, US, vol. 31, No. 1, Jan. 1, 2019, pp. 105-119 (Year 2019).
Notice of Allowance, dated May 11, 2022, from corresponding U.S. Appl. No. 17/395,759.
Notice of Allowance, dated May 18, 2022, from corresponding U.S. Appl. No. 17/670,354.
Notice of Allowance, dated May 25, 2022, from corresponding U.S. Appl. No. 16/872,031.
Notice of Allowance, dated May 6, 2022, from corresponding U.S. Appl. No. 17/666,886.
Office Action, dated May 12, 2022, from corresponding U.S. Appl. No. 17/509,974.
Office Action, dated May 16, 2022, from corresponding U.S. Appl. No. 17/679,750.
Office Action, dated May 9, 2022, from corresponding U.S. Appl. No. 16/840,943.
Thomas et al, "MooM—A Prototype Framework for Management of Ontology Mappings," IEEE, pp. 548-555 (Year 2011).
Written Opinion of the International Searching Authority, dated May 12, 2022, from corresponding International Application No. PCT/US2022/015929.
Written Opinion of the International Searching Authority, dated May 17, 2022, from corresponding International Application No. PCT/US2022/015241.
Written Opinion of the International Searching Authority, dated May 19, 2022, from corresponding International Application No. PCT/US2022/015637.
Choi et al, "A Survey on Ontology Mapping," ACM, pp. 34-41 (Year: 2006).
Cui et al, "Domain Ontology Management Environment," IEEE, pp. 1-9 (Year: 2000).
Falbo et al., "An Ontological Approach to Domain Engineering," ACM, pp. 351-358 (Year: 2002).
Final Office Action, dated Jun. 10, 2022, from corresponding U.S. Appl. No. 17/161,159.
Final Office Action, dated Jun. 9, 2022, from corresponding U.S. Appl. No. 17/494,220.
International Search Report, dated Jun. 1, 2022, from corresponding International Application No. PCT/US2022/016930.
International Search Report, dated Jun. 22, 2022, from corresponding International Application No. PCT/US2022/019358.
International Search Report, dated Jun. 24, 2022, from corresponding International Application No. PCT/US2022/019882.
Nemec et al., "Assessment of Query Execution Performance Using Selected Business Intelligence Tools and Experimental Agile Oriented Data Modeling Approach," Sep. 16, 2015, IEEE, pp. 1327-1333. (Year: 2015).
Notice of Allowance, dated Jun. 14, 2022, from corresponding U.S. Appl. No. 17/679,734.
Notice of Allowance, dated Jun. 16, 2022, from corresponding U.S. Appl. No. 17/119,080.
Notice of Allowance, dated Jun. 2, 2022, from corresponding U.S. Appl. No. 17/493,290.
Notice of Allowance, dated Jun. 23, 2022, from corresponding U.S. Appl. No. 17/588,645.
Notice of Allowance, dated Jun. 8, 2022, from corresponding U.S. Appl. No. 17/722,551.
Notice of Allowance, dated May 27, 2022, from corresponding U.S. Appl. No. 17/543,546.
Notice of Allowance, dated May 31, 2022, from corresponding U.S. Appl. No. 17/679,715.
Office Action, dated Jun. 1, 2022, from corresponding U.S. Appl. No. 17/306,496.
Office Action, dated Jun. 14, 2022, from corresponding U.S. Appl. No. 17/346,586.
Office Action, dated Jun. 16, 2022, from corresponding U.S. Appl. No. 17/689,683.
Ozdikis et al, "Tool Support for Transformation from an OWL Ontology to an HLA Object Model," ACM, pp. 1-6 (Year 2010).
Vukovic et al, "Managing Enterprise IT Systems Using Online Communities," Jul. 9, 2011, IEEE, pp. 552-559. (Year 2011).
Wong et al, "Ontology Mapping for the Interoperability Problem in Network Management," IEEE, pp. 2058-2068 (Year: 2005).
Written Opinion of the International Searching Authority, dated Jun. 1, 2022, from corresponding International Application No. PCT/US2022/016930.
Written Opinion of the International Searching Authority, dated Jun. 22, 2022, from corresponding International Application No. PCT/US2022/019358.

(56) References Cited

OTHER PUBLICATIONS

Written Opinion of the International Searching Authority, dated Jun. 24, 2022, from corresponding International Application No. PCT/US2022/019882.
Notice of Allowance, dated Oct. 18, 2022, from corresponding U.S. Appl. No. 16/840,943.
Office Action, dated Sep. 16, 2022, from corresponding U.S. Appl. No. 17/306,438.
Final Office Action, dated Apr. 23, 2020, from corresponding U.S. Appl. No. 16/572,347.
Final Office Action, dated Apr. 27, 2021, from corresponding U.S. Appl. No. 17/068,454.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 27, 2021, from corresponding U.S. Appl. No. 17/161,159.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Aug. 9, 2021, from corresponding U.S. Appl. No. 17/119,080.
Final Office Action, dated Dec. 10, 2021, from corresponding U.S. Appl. No. 17/187,329.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Jul. 21, 2021, from corresponding U.S. Appl. No. 17/151,334.
Final Office Action, dated Jul. 7, 2021, from corresponding U.S. Appl. No. 17/149,421.
Final Office Action, dated Mar. 26, 2021, from corresponding U.S. Appl. No. 17/020,275.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated May 14, 2021, from corresponding U.S. Appl. No. 17/013,756.
Final Office Action, dated Nov. 29, 2017, from corresponding U.S. Appl. No. 15/619,237.
Final Office Action, dated Oct. 26, 2021, from corresponding U.S. Appl. No. 17/306,496.
Final Office Action, dated Oct. 28, 2021, from corresponding U.S. Appl. No. 17/234,205.
Final Office Action, dated Oct. 29, 2021, from corresponding U.S. Appl. No. 17/020,275.
Final Office Action, dated Sep. 17, 2021, from corresponding U.S. Appl. No. 17/200,698.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Office Action, dated Apr. 1, 2021, from corresponding U.S. Appl. No. 17/119,080.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 2, 2021, from corresponding U.S. Appl. No. 17/151,334.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.

(56) References Cited

OTHER PUBLICATIONS

Office Action, dated Aug. 30, 2021, from corresponding U.S. Appl. No. 16/938,520.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Dec. 11, 2019, from corresponding U.S. Appl. No. 16/578,712.
Office Action, dated Dec. 13, 2021, from corresponding U.S. Appl. No. 17/476,209.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 2, 2021, from corresponding U.S. Appl. No. 17/504,102.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 27, 2021, from corresponding U.S. Appl. No. 17/493,332.
Office Action, dated Dec. 29, 2021, from corresponding U.S. Appl. No. 17/479,807.
Office Action, dated Dec. 3, 2018, from corresponding U.S. Appl. No. 16/055,998.
Office Action, dated Dec. 30, 2021, from corresponding U.S. Appl. No. 17/149,421.
Office Action, dated Dec. 31, 2018, from corresponding U.S. Appl. No. 16/160,577.
Office Action, dated Dec. 7, 2021, from corresponding U.S. Appl. No. 17/499,609.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 16, 2022, from corresponding U.S. Appl. No. 16/872,031.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 26, 2019, from corresponding U.S. Appl. No. 16/228,250.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Feb. 9, 2022, from corresponding U.S. Appl. No. 17/543,546.
Office Action, dated Jan. 14, 2022, from corresponding U.S. Appl. No. 17/499,595.
Office Action, dated Jan. 18, 2019, from corresponding U.S. Appl. No. 16/055,984.
Office Action, dated Jan. 21, 2022, from corresponding U.S. Appl. No. 17/499,624.
Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 25, 2022, from corresponding U.S. Appl. No. 17/494,220.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 29, 2021, from corresponding U.S. Appl. No. 17/101,106.
Office Action, dated Jan. 31, 2022, from corresponding U.S. Appl. No. 17/493,290.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 4, 2022, from corresponding U.S. Appl. No. 17/480,377.
Office Action, dated Jan. 7, 2020, from corresponding U.S. Appl. No. 16/572,182.
Office Action, dated Jan. 7, 2022, from corresponding U.S. Appl. No. 17/387,421.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jun. 1, 2020, from corresponding U.S. Appl. No. 16/862,952.
Office Action, dated Jun. 24, 2019, from corresponding U.S. Appl. No. 16/410,336.
Office Action, dated Jun. 24, 2021, from corresponding U.S. Appl. No. 17/234,205.
Office Action, dated Jun. 27, 2019, from corresponding U.S. Appl. No. 16/404,405.

(56) References Cited

OTHER PUBLICATIONS

Office Action, dated Jun. 7, 2021, from corresponding U.S. Appl. No. 17/200,698.
Office Action, dated Jun. 9, 2021, from corresponding U.S. Appl. No. 17/222,523.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Office Action, dated Mar. 20, 2020, from corresponding U.S. Appl. No. 16/778,709.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 30, 2021, from corresponding U.S. Appl. No. 17/151,399.
Office Action, dated Mar. 4, 2019, from corresponding U.S. Appl. No. 16/237,083.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated Nov. 1, 2017, from corresponding U.S. Appl. No. 15/169,658.
Office Action, dated Nov. 10, 2021, from corresponding U.S. Appl. No. 17/380,485.
Office Action, dated Nov. 10, 2021, from corresponding U.S. Appl. No. 17/409,999.
Office Action, dated Nov. 12, 2020, from corresponding U.S. Appl. No. 17/034,355.
Office Action, dated Nov. 12, 2020, from corresponding U.S. Appl. No. 17/034,772.
Office Action, dated Nov. 12, 2021, from corresponding U.S. Appl. No. 17/346,586.
Office Action, dated Nov. 12, 2021, from corresponding U.S. Appl. No. 17/373,444.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 16, 2021, from corresponding U.S. Appl. No. 17/370,650.
Office Action, dated Nov. 16, 2021, from corresponding U.S. Appl. No. 17/486,350.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 23, 2021, from corresponding U.S. Appl. No. 17/013,756.
Office Action, dated Nov. 24, 2020, from corresponding U.S. Appl. No. 16/925,628.
Office Action, dated Nov. 26, 2021, from corresponding U.S. Appl. No. 16/925,550.
Office Action, dated Nov. 4, 2021, from corresponding U.S. Appl. No. 17/491,906.
Office Action, dated Nov. 8, 2021, from corresponding U.S. Appl. No. 16/872,130.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 12, 2021, from corresponding U.S. Appl. No. 17/346,509.
Office Action, dated Oct. 14, 2020, from corresponding U.S. Appl. No. 16/927,658.
Office Action, dated Oct. 15, 2018, from corresponding U.S. Appl. No. 16/054,780.
Office Action, dated Oct. 15, 2021, from corresponding U.S. Appl. No. 16/908,081.
Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 15, 2021, from corresponding U.S. Appl. No. 16/623,157.
Office Action, dated Sep. 16, 2019, from corresponding U.S. Appl. No. 16/277,715.
Office Action, dated Sep. 19, 2017, from corresponding U.S. Appl. No. 15/671,073.

(56) References Cited

OTHER PUBLICATIONS

Office Action, dated Sep. 22, 2017, from corresponding U.S. Appl. No. 15/619,278.
Office Action, dated Sep. 24, 2021, from corresponding U.S. Appl. No. 17/342,153.
Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Notice of Allowance, dated Apr. 12, 2017, from corresponding U.S. Appl. No. 15/256,419.
Notice of Allowance, dated Apr. 17, 2020, from corresponding U.S. Appl. No. 16/593,639.
Notice of Allowance, dated Apr. 19, 2021, from corresponding U.S. Appl. No. 17/164,029.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 28, 2021, from corresponding U.S. Appl. No. 17/135,445.
Notice of Allowance, dated Apr. 28, 2021, from corresponding U.S. Appl. No. 17/181,828.
Notice of Allowance, dated Apr. 29, 2020, from corresponding U.S. Appl. No. 16/700,049.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Aug. 9, 2021, from corresponding U.S. Appl. No. 16/881,699.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 13, 2021, from corresponding U.S. Appl. No. 16/908,081.
Notice of Allowance, dated Dec. 13, 2021, from corresponding U.S. Appl. No. 17/347,853.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 2, 2021, from corresponding U.S. Appl. No. 16/901,654.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.
Notice of Allowance, dated Dec. 3, 2019, from corresponding U.S. Appl. No. 16/563,749.
Notice of Allowance, dated Dec. 30, 2021, from corresponding U.S. Appl. No. 16/938,520.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 8, 2021, from corresponding U.S. Appl. No. 17/397,472.
Notice of Allowance, dated Dec. 9, 2019, from corresponding U.S. Appl. No. 16/565,261.
Notice of Allowance, dated Dec. 9, 2020, from corresponding U.S. Appl. No. 16/404,491.
Notice of Allowance, dated Feb. 1, 2022, from corresponding U.S. Appl. No. 17/346,509.
Notice of Allowance, dated Feb. 10, 2020, from corresponding U.S. Appl. No. 16/552,765.

(56) References Cited

OTHER PUBLICATIONS

Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 14, 2022, from corresponding U.S. Appl. No. 16/623,157.
Notice of Allowance, dated Feb. 19, 2019, from corresponding U.S. Appl. No. 16/159,632.
Notice of Allowance, dated Feb. 19, 2021, from corresponding U.S. Appl. No. 16/832,451.
Notice of Allowance, dated Feb. 22, 2022, from corresponding U.S. Appl. No. 17/535,065.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Feb. 4, 2022, from corresponding U.S. Appl. No. 17/520,272.
Notice of Allowance, dated Feb. 8, 2022, from corresponding U.S. Appl. No. 17/342,153.
Notice of Allowance, dated Jan. 1, 2021, from corresponding U.S. Appl. No. 17/026,727.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 24, 2022, from corresponding U.S. Appl. No. 17/340,699.
Notice of Allowance, dated Jan. 25, 2021, from corresponding U.S. Appl. No. 16/410,336.
Notice of Allowance, dated Jan. 26, 2018, from corresponding U.S. Appl. No. 15/619,469.
Notice of Allowance, dated Jan. 26, 2022, from corresponding U.S. Appl. No. 17/491,906.
Notice of Allowance, dated Jan. 29, 2020, from corresponding U.S. Appl. No. 16/278,119.
Notice of Allowance, dated Jan. 31, 2022, from corresponding U.S. Appl. No. 17/472,948.
Notice of Allowance, dated Jan. 5, 2022, from corresponding U.S. Appl. No. 17/475,241.
Notice of Allowance, dated Jan. 6, 2021, from corresponding U.S. Appl. No. 16/595,327.
Notice of Allowance, dated Jan. 6, 2022, from corresponding U.S. Appl. No. 17/407,765.
Notice of Allowance, dated Jan. 7, 2022, from corresponding U.S. Appl. No. 17/222,725.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 19, 2021, from corresponding U.S. Appl. No. 17/306,252.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Jul. 31, 2019, from corresponding U.S. Appl. No. 16/221,153.
Notice of Allowance, dated Jul. 8, 2021, from corresponding U.S. Appl. No. 17/201,040.
Notice of Allowance, dated Jun. 1, 2020, from corresponding U.S. Appl. No. 16/813,321.
Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 16, 2020, from corresponding U.S. Appl. No. 16/798,818.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.

(56) References Cited

OTHER PUBLICATIONS

Notice of Allowance, dated Jun. 2, 2021, from corresponding U.S. Appl. No. 17/198,581.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.
Notice of Allowance, dated Jun. 27, 2018, from corresponding U.S. Appl. No. 15/882,989.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated May 1, 2020, from corresponding U.S. Appl. No. 16/586,202.
Notice of Allowance, dated May 11, 2020, from corresponding U.S. Appl. No. 16/786,196.
Notice of Allowance, dated May 13, 2021, from corresponding U.S. Appl. No. 17/101,915.
Notice of Allowance, dated May 19, 2020, from corresponding U.S. Appl. No. 16/505,430.
Notice of Allowance, dated May 19, 2020, from corresponding U.S. Appl. No. 16/808,496.
Notice of Allowance, dated May 20, 2020, from corresponding U.S. Appl. No. 16/707,762.
Notice of Allowance, dated May 21, 2018, from corresponding U.S. Appl. No. 15/896,790.
Notice of Allowance, dated May 26, 2021, from corresponding U.S. Appl. No. 16/808,493.
Notice of Allowance, dated May 26, 2021, from corresponding U.S. Appl. No. 16/865,874.
Notice of Allowance, dated May 26, 2021, from corresponding U.S. Appl. No. 17/199,514.
Notice of Allowance, dated May 27, 2020, from corresponding U.S. Appl. No. 16/820,208.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 28, 2019, from corresponding U.S. Appl. No. 16/277,568.
Notice of Allowance, dated May 28, 2020, from corresponding U.S. Appl. No. 16/799,279.
Notice of Allowance, dated May 28, 2021, from corresponding U.S. Appl. No. 16/862,944.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 7, 2020, from corresponding U.S. Appl. No. 16/505,426.
Notice of Allowance, dated May 7, 2021, from corresponding U.S. Appl. No. 17/194,662.
Notice of Allowance, dated Nov. 14, 2019, from corresponding U.S. Appl. No. 16/436,616.
Notice of Allowance, dated Nov. 16, 2021, from corresponding U.S. Appl. No. 17/491,871.
Notice of Allowance, dated Nov. 2, 2018, from corresponding U.S. Appl. No. 16/054,762.
Notice of Allowance, dated Nov. 22, 2021, from corresponding U.S. Appl. No. 17/383,889.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 3, 2020, from corresponding U.S. Appl. No. 16/719,071.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Nov. 9, 2020, from corresponding U.S. Appl. No. 16/595,342.
Notice of Allowance, dated Oct. 1, 2021, from corresponding U.S. Appl. No. 17/340,395.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.

(56) References Cited

OTHER PUBLICATIONS

Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 22, 2021, from corresponding U.S. Appl. No. 17/346,847.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 15/,894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 29, 2021, from corresponding U.S. Appl. No. 17/316,179.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Restriction Requirement, dated Apr. 10, 2019, from corresponding U.S. Appl. No. 16/277,715.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 17, 2021, from corresponding U.S. Appl. No. 17/475,244.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.
Restriction Requirement, dated Nov. 10, 2021, from corresponding U.S. Appl. No. 17/366,754.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.

(56) References Cited

OTHER PUBLICATIONS

Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Dec. 22, 2021, from corresponding International Application No. PCT/US2021/051217.
Written Opinion of the International Searching Authority, dated Feb. 11, 2022, from corresponding International Application No. PCT/US2021/053518.
Written Opinion of the International Searching Authority, dated Jan. 14, 2019, from corresponding International Application No. PCT/US2018/046949.
Written Opinion of the International Searching Authority, dated Jan. 5, 2022, from corresponding International Application No. PCT/US2021/050497.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated Nov. 12, 2021, from corresponding International Application No. PCT/US2021/043481.
Written Opinion of the International Searching Authority, dated Nov. 19, 2018, from corresponding International Application No. PCT/US2018/046939.
Written Opinion of the International Searching Authority, dated Nov. 3, 2021, from corresponding International Application No. PCT/US2021/040893.
Written Opinion of the International Searching Authority, dated Nov. 3, 2021, from corresponding International Application No. PCT/US2021/044910.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
Written Opinion of the International Searching Authority, dated Sep. 15, 2021, from corresponding International Application No. PCT/US2021/033631.
International Search Report, dated Aug. 15, 2017, from corresponding International Application No. PCT/ US2017/036919.
International Search Report, dated Aug. 21, 2017, from corresponding International Application No. PCT/ US2017/036914.
International Search Report, dated Aug. 29, 2017, from corresponding International Application No. PCT/ US2017/036898.
International Search Report, dated Aug. 8, 2017, from corresponding International Application No. PCT/ US2017/036889.
International Search Report, dated Aug. 8, 2017, from corresponding International Application No. PCT/ US2017/036890.
International Search Report, dated Aug. 8, 2017, from corresponding International Application No. PCT/ US2017/036893.
International Search Report, dated Aug. 8, 2017, from corresponding International Application No. PCT/ US2017/036901.
International Search Report, dated Aug. 8, 2017, from corresponding International Application No. PCT/ US2017/036913.
International Search Report, dated Aug. 8, 2017, from corresponding International Application No. PCT/ US2017/036920.
International Search Report, dated Dec. 14, 2018, from corresponding International Application No. PCT/ US2018/045296.
International Search Report, dated Dec. 22, 2021, from corresponding International Application No. PCT/ US2021/051217.
International Search Report, dated Feb. 11, 2022, from corresponding International Application No. PCT/ US2021/053518.
International Search Report, dated Jan. 14, 2019, from corresponding International Application No. PCT/ US2018/046949.
International Search Report, dated Jan. 5, 2022, from corresponding International Application No. PCT/ US2021/050497.
International Search Report, dated Jan. 7, 2019, from corresponding International Application No. PCT/ US2018/055772.
International Search Report, dated Jun. 21, 2017, from corresponding International Application No. PCT/ US2017/025600.
International Search Report, dated Jun. 6, 2017, from corresponding International Application No. PCT/ US2017/025605.
International Search Report, dated Jun. 6, 2017, from corresponding International Application No. PCT/ US2017/025611.
International Search Report, dated Mar. 14, 2019, from corresponding International Application No. PCT/ US2018/055736.
International Search Report, dated Mar. 4, 2019, from corresponding International Application No. PCT/ US2018/055773.
International Search Report, dated Mar. 4, 2019, from corresponding International Application No. PCT/ US2018/055774.
International Search Report, dated Nov. 12, 2021, from corresponding International Application No. PCT/ US2021/043481.
International Search Report, dated Nov. 19, 2018, from corresponding International Application No. PCT/ US2018/046939.

(56) References Cited

OTHER PUBLICATIONS

International Search Report, dated Nov. 3, 2021, from corresponding International Application No. PCT/ US2021/040893.
International Search Report, dated Nov. 3, 2021, from corresponding International Application No. PCT/ US2021/044910.
International Search Report, dated Oct. 11, 2018, from corresponding International Application No. PCT/ US2018/043975.
International Search Report, dated Oct. 11, 2018, from corresponding International Application No. PCT/ US2018/043976.
International Search Report, dated Oct. 11, 2018, from corresponding International Application No. PCT/ US2018/043977.
International Search Report, dated Oct. 11, 2018, from corresponding International Application No. PCT/ US2018/044026.
International Search Report, dated Oct. 11, 2018, from corresponding International Application No. PCT/ US2018/045240.
International Search Report, dated Oct. 12, 2017, from corresponding International Application No. PCT/ US2017/036888.
International Search Report, dated Oct. 12, 2018, from corresponding International Application No. PCT/ US2018/044046.
International Search Report, dated Oct. 16, 2018, from corresponding International Application No. PCT/ US2018/045243.
International Search Report, dated Oct. 18, 2018, from corresponding International Application No. PCT/ US2018/045249.
International Search Report, dated Oct. 20, 2017, from corresponding International Application No. PCT/ US2017/036917.
International Search Report, dated Oct. 3, 2017, from corresponding International Application No. PCT/ US2017/036912.
International Search Report, dated Sep. 1, 2017, from corresponding International Application No. PCT/ US2017/036896.
International Search Report, dated Sep. 12, 2018, from corresponding International Application No. PCT/ US2018/037504.
International Search Report, dated Sep. 15, 2021, from corresponding International Application No. PCT/ US2021/033631.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Abdullah et al., "The Mapping Process of Unstructured Data to the Structured Data", ACM, pp. 151-155 (Year: 2013).
Acar, Gunes, et al, The Web Never Forgets, Computer and Communications Security, ACM, Nov. 3, 2014, pp. 674-689.
Aghasian, Erfan, et al, Scoring Users' Privacy Disclosure Across Multiple Online Social Networks,IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework", IEEE, pp. 659-662 (Year: 2009).
Agrawal et al, "Securing Electronic Health Records Without Impeding the Flow of Information," International Journal of Medical Informatics 76, 2007, pp. 471-479 (Year: 2007).
Ahmad et al, "Task-Oriented Access Model for Secure Data Sharing Over Cloud," ACM, pp. 1-7 (Year: 2015).
Ahmad, et al, "Performance of Resource Management Algorithms for Processable Bulk Data Transfer Tasks in Grid Environments," ACM, pp. 177-188 (Year: 2008).
Alaa et al, "Personalized Risk Scoring for Critical Care Prognosis Using Mixtures of Gaussian Processes," Apr. 27, 2017, IEEE, vol. 65, issue 1, pp. 207-217 (Year: 2017).
Aman et al, "Detecting Data Tampering Attacks in Synchrophasor Networks using Time Hopping," IEEE, pp. 1-6 (Year: 2016).
Amar et al, "Privacy-Aware Infrastructure for Managing Personal Data," ACM, pp. 571-572, Aug. 22-26, 2016 (Year: 2016).
Antunes et al, "Preserving Digital Data in Heterogeneous Environments", ACM, pp. 345-348, 2009 (Year: 2009).
Ardagna, et al, "A Privacy-Aware Access Control System," Journal of Computer Security, 16:4, pp. 369-397 (Year: 2008).
Avepoint, Automating Privacy Impact Assessments, AvePoint, Inc.
Avepoint, AvePoint Privacy Impact Assessment 1: User Guide, Cumulative Update 2, Revision E, Feb. 2015, AvePoint, Inc.
Avepoint, Installing and Configuring the APIA System, International Association of Privacy Professionals, AvePoint, Inc.
Ball, et al, "Aspects of the Computer-Based Patient Record," Computers in Healthcare, Springer-Verlag New York Inc., pp. 1-23 (Year: 1992).
Banerjee et al, "Link Before You Share: Managing Privacy Policies through Blockchain," IEEE, pp. 4438-4447 (Year: 2017).
Bang et al, "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Barker, "Personalizing Access Control by Generalizing Access Control," ACM, pp. 149-158 (Year: 2010).
Barr, "Amazon Rekognition Update—Estimated Age Range for Faces," AWS News Blog, Feb. 10, 2017, pp. 1-5 (Year: 2017).
Bayardo et al, "Technological Solutions for Protecting Privacy," Computer 36.9 (2003), pp. 115-118, (Year: 2003).
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bertino et al, "Towards Mechanisms for Detection and Prevention of Data Exfiltration by Insiders," Mar. 22, 2011, ACM, pp. 10-19 (Year: 2011).
Bhargav-Spantzel et al., Receipt Management- Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Bieker, et al, "Privacy-Preserving Authentication Solutions—Best Practices for Implementation and EU Regulatory Perspectives," Oct. 29, 2014, IEEE, pp. 1-10 (Year: 2014).
Bin, et al, "Research on Data Mining Models for the Internet of Things," IEEE, pp. 1-6 (Year: 2010).
Binns, et al, "Data Havens, or Privacy Sans Frontières? A Study of International Personal Data Transfers," ACM, pp. 273-274 (Year: 2002).
Bjorn Greif, "Cookie Pop-up Blocker: Cliqz Automatically Denies Consent Requests," Cliqz.com, pp. 1-9, Aug. 11, 2019 (Year: 2019).
Borgida, "Description Logics in Data Management," IEEE Transactions on Knowledge and Data Engineering, vol. 7, No. 5, Oct. 1995, pp. 671-682 (Year: 1995).
Brandt et al, "Efficient Metadata Management in Large Distributed Storage Systems," IEEE, pp. 1-9 (Year: 2003).
Bujlow et al, "Web Tracking: Mechanisms, Implications, and Defenses," Proceedings of the IEEE, Aug. 1, 2017, vol. 5, No. 8, pp. 1476-1510 (Year: 2017).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al, "Enforcing Access Control Over Data Streams," ACM, pp. 21-30 (Year: 2007).
Carpineto et al, "Automatic Assessment of Website Compliance to the European Cookie Law with CoolCheck," Proceedings of the 2016 ACM on Workshop on Privacy in the Electronic Society, 2016, pp. 135-138 (Year: 2016).
Cerpzone, "How to Access Data on Data Archival Storage and Recovery System", https://www.saj.usace.army.mil/Portals/44/docs/Environmental/Lake%200%20Watershed/15February2017/How%20To%20Access%20Model%20Data%20on%20DASR.pdf?ver=2017-02-16-095535-633, Feb. 16, 2017.
Cha et al, "A Data-Driven Security Risk Assessment Scheme for Personal Data Protection," IEEE, pp. 50510-50517 (Year: 2018).

(56) References Cited

OTHER PUBLICATIONS

Cha, et al, "Process-Oriented Approach for Validating Asset Value for Evaluating Information Security Risk," IEEE, Aug. 31, 2009, pp. 379-385 (Year: 2009).

Chapados et al, "Scoring Models for Insurance Risk Sharing Pool Optimization," 2008, IEEE, pp. 97-105 (Year: 2008).

Cheng, Raymond, et al, "Radiatus: A Shared-Nothing Server-Side Web Architecture," Proceedings of the Seventh ACM Symposium on Cloud Computing, Oct. 5, 2016, pp. 237-250 (Year: 2016).

Choi et al, "Retrieval Effectiveness of Table of Contents and Subject Headings," ACM, pp. 103-104 (Year: 2007).

Chowdhury et al, "A System Architecture for Subject-Centric Data Sharing", ACM, pp. 1-10 (Year: 2018).

Chowdhury et al, "Managing Data Transfers in Computer Clusters with Orchestra," ACM, pp. 98-109 (Year: 2011).

Civili et al, "Mastro Studio: Managing Ontology-Based Data Access Applications," ACM, pp. 1314-1317, Aug. 26-30, 2013 (Year: 2013).

Decision Regarding Institution of Post-Grant Review in Case PGR2018-00056 for U.S. Pat. No. 9,691,090 B1, Oct. 11, 2018.

Degeling et al, "We Value Your Privacy . . . Now Take Some Cookies: Measuring the GDPRs Impact on Web Privacy," arxiv.org, Cornell University Library, 201 Olin Library Cornell University, Ithaca, NY 14853, Aug. 15, 2018, pp. 1-15 (Year: 2019).

Dimou et al, "Machine-Interpretable Dataset and Service Descriptions for Heterogeneous Data Access and Retrieval", ACM, pp. 145-152 (Year: 2015).

Dokholyan et al, "Regulatory and Ethical Considerations for Linking Clinical and Administrative Databases," American Heart Journal 157.6 (2009), pp. 971-982 (Year: 2009).

Dunkel et al, "Data Organization and Access for Efficient Data Mining", IEEE, pp. 522-529 (Year: 1999).

Dwork, Cynthia, Differential Privacy, Microsoft Research, p. 1-12.

Emerson, et al, "A Data Mining Driven Risk Profiling Method for Road Asset Management," ACM, pp. 1267-1275 (Year: 2013).

Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.

Everypixel Team, "A New Age Recognition API Detects the Age of People on Photos," May 20, 2019, pp. 1-5 (Year: 2019).

Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.

Fan et al, "Intrusion Investigations with Data-hiding for Computer Log-file Forensics," IEEE, pp. 1-6 (Year: 2010).

Final Written Decision Regarding Post-Grant Review in Case PGR2018-00056 for U.S. Pat. No. 9,691,090 B1, Oct. 10, 2019.

Francis, Andre, Business Mathematics and Statistics, South-Western Cengage Learning, 2008, Sixth Edition.

Friedman et al, "Data Mining with Differential Privacy," ACM, Jul. 2010, pp. 493-502 (Year: 2010).

Friedman et al, "Informed Consent in the Mozilla Browser: Implementing Value-Sensitive Design," Proceedings of the 35th Annual Hawaii International Conference on System Sciences, 2002, IEEE, pp. 1-10 (Year: 2002).

Frikken, Keith B., et al, Yet Another Privacy Metric for Publishing Micro-data, Miami University, Oct. 27, 2008, p. 117-121.

Fung et al, "Discover Information and Knowledge from Websites using an Integrated Summarization and Visualization Framework", IEEE, pp. 232-235 (Year: 2010).

Gajare et al, "Improved Automatic Feature Selection Approach for Health Risk Prediction," Feb. 16, 2018, IEEE, pp. 816-819 (Year: 2018).

Geko et al, "An Ontology Capturing the Interdependence of the General Data Protection Regulation (GDPR) and Information Security," ACM, pp. 1-6, Nov. 15-16, 2018 (Year: 2018).

Ghiglieri, Marco et al.; Personal DLP for Facebook, 2014 IEEE International Conference on Pervasive Computing and Communication Workshops (Percom Workshops); IEEE; Mar. 24, 2014; pp. 629-634.

Gilda, et al, "Blockchain for Student Data Privacy and Consent," 2018 International Conference on Computer Communication and Informatics, Jan. 4 - 6, 2018, IEEE, pp. 1-5 (Year: 2018).

Golab, et al, "Issues in Data Stream Management," ACM, SIGMOD Record, vol. 32, No. 2, Jun. 2003, pp. 5-14 (Year: 2003).

Golfarelli et al, "Beyond Data Warehousing: What's Next in Business Intelligence?," ACM, pp. 1-6 (Year: 2004).

Gonçalves et al, "The XML Log Standard for Digital Libraries: Analysis, Evolution, and Deployment," IEEE, pp. 312-314 (Year: 2003).

Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.

Gowadia et al, "RDF Metadata for XML Access Control," ACM, pp. 31-48 (Year: 2003).

Grolinger, et al, "Data Management in Cloud Environments: NoSQL and NewSQL Data Stores," Journal of Cloud Computing: Advances, Systems and Applications, pp. 1-24 (Year: 2013).

Guo, et al, "Opal: A Passe-partout for Web Forms," ACM, pp. 353-356 (Year: 2012).

Gustarini, et al, "Evaluation of Challenges in Human Subject Studies "In-the-Wild" Using Subjects' Personal Smartphones," ACM, pp. 1447-1456 (Year: 2013).

Hacigümüs, Hakan, et al, Executing SQL over Encrypted Data in the Database-Service-Provider Model, ACM, Jun. 4, 2002, pp. 216-227.

Halevy, et al, "Schema Mediation in Peer Data Management Systems," IEEE, Proceedings of the 19th International Conference on Data Engineering, 2003, pp. 505-516 (Year: 2003).

Hauch, et al, "Information Intelligence: Metadata for Information Discovery, Access, and Integration," ACM, pp. 793-798 (Year: 2005).

He et al, "A Crowdsourcing Framework for Detecting of Cross-Browser Issues in Web Application," ACM, pp. 1-4, Nov. 6, 2015 (Year: 2015).

Hernandez, et al, "Data Exchange with Data-Metadata Translations," ACM, pp. 260-273 (Year: 2008).

Hinde, "A Model to Assess Organisational Information Privacy Maturity Against the Protection of Personal Information Act" Dissertation University of Cape Town 2014, pp. 1-121 (Year: 2014).

Hodge, et al, "Managing Virtual Data Marts with Metapointer Tables," pp. 1-7 (Year: 2002).

Horrall et al, "Evaluating Risk: IBM's Country Financial Risk and Treasury Risk Scorecards," Jul. 21, 2014, IBM, vol. 58, issue 4, pp. 2:1-2:9 (Year: 2014).

Hu, et al, "Attribute Considerations for Access Control Systems," NIST Special Publication 800-205, Jun. 2019, pp. 1-42 (Year: 2019).

Hu, et al, "Guide to Attribute Based Access Control (ABAC) Definition and Considerations (Draft)," NIST Special Publication 800-162, pp. 1-54 (Year: 2013).

Huang, et al, "A Study on Information Security Management with Personal Data Protection," IEEE, Dec. 9, 2011, pp. 624-630 (Year: 2011).

Huner et al, "Towards a Maturity Model for Corporate Data Quality Management", ACM, pp. 231-238, 2009 (Year: 2009).

Hunton & Williams LLP, The Role of Risk Management in Data Protection, Privacy Risk Framework and the Risk—based Approach to Privacy, Centre for Information Policy Leadership, Workshop II, Nov. 23, 2014.

Huo et al, "A Cloud Storage Architecture Model for Data-Intensive Applications," IEEE, pp. 1-4 (Year: 2011).

Iapp, Daily Dashboard, PIA Tool Stocked With New Templates for DPI, Infosec, International Association of Privacy Professionals, Apr. 22, 2014.

(56) References Cited

OTHER PUBLICATIONS

Iapp, ISO/IEC 27001 Information Security Management Template, Resource Center, International Association of Privacy Professionals.

Imran et al, "Searching in Cloud Object Storage by Using a Metadata Model", IEEE, 2014, retrieved online on Apr. 1, 2020, pp. 121-128. Retrieved from the Internet: URL: https://ieeeexplore.ieee.org/stamp/stamp.jsp? (Year: 2014).

Iordanou et al, "Tracing Cross Border Web Tracking," Oct. 31, 2018, pp. 329-342, ACM (Year: 2018).

Islam, et al, "Mixture Model Based Label Association Techniques for Web Accessibility," ACM, pp. 67-76 (Year: 2010).

Jensen, et al, "Temporal Data Management," IEEE Transactions on Knowledge and Data Engineering, vol. 11, No. 1, Jan./Feb. 1999, pp. 36-44 (Year: 1999).

Jiahao Chen et al. "Fairness Under Unawareness: Assessing Disparity when Protected Class is Unobserved," arxiv.org, Cornell University Library, 201 Olin Library Cornell University, Ithaca, NY 14853, Nov. 27, 2018 (Nov. 27, 2018), Section 2, Figure 2. (Year 2018).

Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).

Jones et al, "AI and the Ethics of Automating Consent," IEEE, pp. 64-72, May 2018 (Year: 2018).

Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf? (Year: 2018).

Jun et al, "Scalable Multi-Access Flash Store for Big Data Analytics," ACM, pp. 55-64 (Year: 2014).

Kirkham, et al, "A Personal Data Store for an Internet of Subjects," IEEE, pp. 92-97 (Year: 2011).

Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.

Krol, Kat, et al, Control versus Effort in Privacy Warnings for Webforms, ACM, Oct. 24, 2016, pp. 13-23.

Lamb et al, "Role-Based Access Control for Data Service Integration", ACM, pp. 3-11 (Year: 2006).

Leadbetter, et al, "Where Big Data Meets Linked Data: Applying Standard Data Models to Environmental Data Streams," IEEE, pp. 2929-2937 (Year: 2016).

Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).

Li, Ninghui, et al, t-Closeness: Privacy Beyond k-Anonymity and l-Diversity, IEEE, 2014, p. 106-115.

Liu et al, "A Novel Approach for Detecting Browser-based Silent Miner," IEEE, pp. 490-497 (Year: 2018).

Liu et al, "Cross-Geography Scientific Data Transferring Trends and Behavior," ACM, pp. 267-278 (Year: 2018).

Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.

Liu, Yandong, et al, "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).

Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).

Lu et al, "An HTTP Flooding Detection Method Based on Browser Behavior," IEEE, pp. 1151-1154 (Year: 2006).

Lu, "How Machine Learning Mitigates Racial Bias in the US Housing Market," Available as SSRN 3489519, pp. 1-73, Nov. 2019 (Year: 2019).

Luu, et al, "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).

Ma Ziang, et al, "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http://dx.doi.org/10.1145/2889160.2889178, p. 653, r.col, par. 1-3; figure 3 (Year: 2016).

Mandal, et al, "Automated Age Prediction Using Wrinkles Features of Facial Images and Neural Network," International Journal of Emerging Engineering Research and Technology, vol. 5, Issue 2, Feb. 2017, pp. 12-20 (Year: 2017).

Maret et al, "Multimedia Information Interchange: Web Forms Meet Data Servers", IEEE, pp. 499-505 (Year: 1999).

Martin, et al, "Hidden Surveillance by Web Sites: Web Bugs in Contemporary Use," Communications of the ACM, vol. 46, No. 12, Dec. 2003, pp. 258-264. Internet source https://doi.org/10.1145/953460.953509. (Year: 2003).

McGarth et al, "Digital Library Technology for Locating and Accessing Scientific Data", ACM, pp. 188-194 (Year: 1999).

Mesbah et al, "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).

Moiso et al, "Towards a User-Centric Personal Data Ecosystem The Role of the Bank of Individual's Data," 2012 16th International Conference on Intelligence in Next Generation Networks, Berlin, 2012, pp. 202-209 (Year: 2012).

Moscoso-Zea et al, "Datawarehouse Design for Educational Data Mining," IEEE, pp. 1-6 (Year: 2016).

Mudepalli et al, "An efficient data retrieval approach using blowfish encryption on cloud CipherText Retrieval in Cloud Computing" IEEE, pp. 267-271 (Year: 2017).

Mundada et al, "Half-Baked Cookies: Hardening Cookie-Based Authentication for the Modern Web," Proceedings of the 11th ACM on Asia Conference on Computer and Communications Security, 2016, pp. 675-685 (Year: 2016).

Newman et al, "High Speed Scientific Data Transfers using Software Defined Networking," ACM, pp. 1-9 (Year: 2015).

Newman, "Email Archive Overviews using Subject Indexes", ACM, pp. 652-653, 2002 (Year: 2002).

Nishikawa, Taiji, English Translation of JP 2019154505, Aug. 27, 2019 (Year: 2019).

Notice of Filing Date for Petition for Post-Grant Review of related U.S. Pat. No. 9,691,090 dated Apr. 12, 2018.

Nouwens et al, "Dark Patterns after the GDPR: Scraping Consent Pop-ups and Demonstrating their Influence," ACM, pp. 1-13, Apr. 25, 2020 (Year: 2020).

O'Keefe et al, "Privacy-Preserving Data Linkage Protocols," Proceedings of the 2004 ACM Workshop on Privacy in the Electronic Society, 2004, pp. 94-102 (Year: 2004).

Olenski, Steve, For Consumers, Data Is A Matter Of Trust, CMO Network, Apr. 18, 2016, https://www.forbes.com/sites/steveolenski/2016/04/18/for-consumers-data-is-a-matter-of-trust/#2e48496278b3.

Paes, "Student Research Abstract: Automatic Detection of Cross-Browser Incompatibilities using Machine Learning and Screenshot Similarity," ACM, pp. 697-698, Apr. 3, 2017 (Year: 2017).

Pearson, et al, "A Model-Based Privacy Compliance Checker," IJEBR, vol. 5, No. 2, pp. 63-83, 2009, Nov. 21, 2008. [Online]. Available: http://dx.doi.org/10.4018/jebr.2009040104 (Year: 2008).

Pechenizkiy et al, "Process Mining Online Assessment Data," Educational Data Mining, pp. 279-288 (Year: 2009).

Petition for Post-Grant Review of related U.S. Pat. No. 9,691,090 dated Mar. 27, 2018.

Petrie et al, "The Relationship between Accessibility and Usability of Websites", ACM, pp. 397-406 (Year: 2007).

(56) References Cited

OTHER PUBLICATIONS

Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Ping et al, "Wide Area Placement of Data Replicas for Fast and Highly Available Data Access," ACM, pp. 1-8 (Year: 2011).
Popescu-Zeletin, "The Data Access and Transfer Support in a Local Heterogeneous Network (HMINET)", IEEE, pp. 147-152 (Year: 1979).
Porter, "De-Identified Data and Third Party Data Mining: The Risk of Re-Identification of Personal Information," Shidler JL Com. & Tech. 5, 2008, pp. 1-9 (Year: 2008).
Pretorius, et al, "Attributing Users Based on Web Browser History," 2017 IEEE Conference on Application, Information and Network Security (AINS), 2017, pp. 69-74 (Year: 2017).
Qing-Jiang et al, "The (P, a, K) Anonymity Model for Privacy Protection of Personal Information in the Social Networks, " 2011 6th IEEE Joint International Information Technology and Artificial Intelligence Conference, vol. 2 IEEE, 2011, pp. 420-423 (Year: 2011).
Qiu, et al, "Design and Application of Data Integration Platform Based on Web Services and XML," IEEE, pp. 253-256 (Year: 2016).
Radu, et al, "Analyzing Risk Evaluation Frameworks and Risk Assessment Methods," IEEE, Dec. 12, 2020, pp. 1-6 (Year: 2020).
Rakers, "Managing Professional and Personal Sensitive Information," ACM, pp. 9-13, Oct. 24-27, 2010 (Year: 2010).
Reardon et al, User-Level Secure Deletion on Log-Structured File Systems, ACM, 2012, retrieved online on Apr. 22, 2021, pp. 1-11. Retrieved from the Internet: URL: http://citeseerx.ist.psu.edu/viewdoc/download;jsessionid=450713515DC7F19F8ED09AE961D4B60E. (Year: 2012).
Regulation (EU) 2016/679, "On the protection of natural persons with regard to the processing of personal data and on the free movement of such data, and repealing Directive 95/46/EC (General Data Protection Regulation)," Official Journal of the European Union, May 4, 2016, pp. L 119/1-L 119/88 (Year: 2016).
Roesner et al, "Detecting and Defending Against Third-Party Tracking on the Web," 9th USENIX Symposium on Networked Systems Design and Implementation, Apr. 11, 2013, pp. 1-14, ACM (Year: 2013).
Rozepz, "What is Google Privacy Checkup? Everything You Need to Know," Tom's Guide web post, Apr. 26, 2018, pp. 1-11 (Year: 2018).
Sachinopoulou et al, "Ontology-Based Approach for Managing Personal Health and Wellness Information," IEEE, pp. 1802-1805 (Year: 2007).
Salim et al, "Data Retrieval and Security using Lightweight Directory Access Protocol", IEEE, pp. 685-688 (Year: 2009).
Santhisree, et al, "Web Usage Data Clustering Using Dbscan Algorithm and Set Similarities," IEEE, pp. 220-224 (Year: 2010).
Sanzo et al, "Analytical Modeling of Lock-Based Concurrency Control with Arbitrary Transaction Data Access Patterns," ACM, pp. 69-78 (Year: 2010).
Sarkar et al, "Towards Enforcement of the EU GDPR: Enabling Data Erasure," 2018 IEEE Confs on Internet of Things, Green Computing and Communications, Cyber, Physical and Social Computing, Smart Data, Blockchain, Computer and Information Technology, Congress on Cybermatics, 2018, pp. 222-229, IEEE (Year: 2018).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Sedinic et al, "Security Risk Management in Complex Organization," May 29, 2015, IEEE, pp. 1331-1337 (Year: 2015).
Shahriar et al, "A Model-Based Detection of Vulnerable and Malicious Browser Extensions," IEEE, pp. 198-207 (Year: 2013).
Shankar et al, "Doppleganger: Better Browser Privacy Without the Bother," Proceedings of the 13th ACM Conference on Computer and Communications Security; [ACM Conference on Computer and Communications Security], New York, NY : ACM, US, Oct. 30, 2006, pp. 154-167 (Year: 2006).
Singh, et al, "A Metadata Catalog Service for Data Intensive Applications," ACM, pp. 1-17 (Year: 2003).
Sjosten et al, "Discovering Browser Extensions via Web Accessible Resources," ACM, pp. 329-336, Mar. 22, 2017 (Year: 2017).
Slezak, et al, "Brighthouse: An Analytic Data Warehouse for Ad-hoc Queries," ACM, pp. 1337-1345 (Year: 2008).
Soceanu, et al, "Managing the Privacy and Security of eHealth Data," May 29, 2015, IEEE, pp. 1-8 (Year: 2015).
Srinivasan et al, "Descriptive Data Analysis of File Transfer Data," ACM, pp. 1-8 (Year: 2014).
Srivastava, Agrima, et al, Measuring Privacy Leaks in Online Social Networks, International Conference on Advances in Computing, Communications and Informatics (ICACCI), 2013.
Stack Overflow, "Is there a way to force a user to scroll to the bottom of a div?," Stack Overflow, pp. 1-11, Nov. 2013. [Online]. Available: https://stackoverflow.com/questions/2745935/is-there-a-way-to-force-a-user-to-scroll-to-the-bottom-of-a-div (Year: 2013).
Stern, Joanna, "iPhone Privacy Is Broken . . . and Apps Are to Blame", The Wall Street Journal, wsj.com, May 31, 2019.
Strodl, et al, "Personal & SOHO Archiving," Vienna University of Technology, Vienna, Austria, JCDL '08, Jun. 16-20, 2008, Pittsburgh, Pennsylvania, USA, pp. 115-123 (Year: 2008).
Sukumar et al, "Review on Modern Data Preprocessing Techniques in Web Usage Mining (WUM)," IEEE, 2016, pp. 64-69 (Year: 2016).
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Tanasa et al, "Advanced Data Preprocessing for Intersites Web Usage Mining," IEEE, Mar. 2004, pp. 59-65 (Year: 2004).
Tanwar, et al, "Live Forensics Analysis: Violations of Business Security Policy," 2014 International Conference on Contemporary Computing and Informatics (IC31), 2014, pp. 971-976 (Year: 2014).
The Cookie Collective, Optanon Cookie Policy Generator, The Cookie Collective, Year 2016, http://web.archive.org/web/20160324062743/https:/optanon.com/.
Thuraisingham, "Security Issues for the Semantic Web," Proceedings 27th Annual International Computer Software and Applications Conference, COMPSAC 2003, Dallas, TX, USA, 2003, pp. 633-638 (Year: 2003).
TRUSTe Announces General Availability of Assessment Manager for Enterprises to Streamline Data Privacy Management with Automation, PRNewswire, 20150304.
Tsai et al, "Determinants of Intangible Assets Value: The Data Mining Approach," Knowledge Based System, pp. 67-77 http://www.elsevier.com/locate/knosys (Year: 2012).
Tuomas Aura et al, Scanning Electronic Documents for Personally Identifiable Information, ACM, 2006-10-30, retrieved online on Jun. 13, 2019, pp. 41-49. Retrieved from the Internet: URL: http://delivery.acm.org/10.1145/1180000/1179608/p41-aura.pdf? (Year: 2006).
Van Eijk et al, "The Impact of User Location on Cookie Notices (Inside and Outside of the European Union)," IEEE Security & Privacy Workshop on Technology and Consumer Protection (CONPRO '19), Jan. 1, 2019 (Year: 2019).
Wang et al, "Revealing Key Non-Financial Factors for Online Credit-Scoring in E-Financing," 2013, IEEE, pp. 1-6 (Year: 2013).
Wang et al, "Secure and Efficient Access to Outsourced Data," ACM, pp. 55-65 (Year: 2009).
Weaver et al, "Understanding Information Preview in Mobile Email Processing", ACM, pp. 303-312, 2011 (Year: 2011).
Wu et al, "Data Mining with Big Data," IEEE, Jan. 2014, pp. 97-107, vol. 26, No. 1, (Year: 2014).

(56) References Cited

OTHER PUBLICATIONS www.truste.com (1), 200150207, Internet Archive Wayback Machine, www.archive.org,2_7_2015.

Xu, et al, "GatorShare: A File System Framework for High-Throughput Data Management," ACM, pp. 776-786 (Year: 2010).

Yang et al, "DAC-MACS: Effective Data Access Control for Multiauthority Cloud Storage Systems," IEEE, pp. 1790-1801 (Year: 2013).

Yang et al, "Mining Web Access Sequence with Improved Apriori Algorithm," IEEE, 2017, pp. 780-784 (Year: 2017).

Ye et al, "An Evolution-Based Cache Scheme for Scalable Mobile Data Access," ACM, pp. 1-7 (Year: 2007).

Yin et al, "Multibank Memory Optimization for Parallel Data Access in Multiple Data Arrays", ACM, pp. 1-8 (Year: 2016).

Yin et al, "Outsourced Similarity Search on Metric Data Assets", IEEE, pp. 338-352 (Year: 2012).

Yu, "Using Data from Social Media Websites to Inspire the Design of Assistive Technology", ACM, pp. 1-2 (Year: 2016).

Yu, et al, "Performance and Fairness Issues in Big Data Transfers," ACM, pp. 9-11 (Year: 2014).

Yue et al, "An Automatic HTTP Cookie Management System," Computer Networks, Elsevier, Amsterdam, NL, vol. 54, No. 13, Sep. 15, 2010, pp. 2182-2198 (Year: 2010).

Zannone, et al, "Maintaining Privacy on Derived Objects," ACM, pp. 10-19 (Year: 2005).

Zeldovich, Nickolai, et al, Making Information Flow Explicit in HiStar, OSDI '06: 7th USENIX Symposium on Operating Systems Design and Implementation, USENIX Association, p. 263-278.

Zhang et al, "Data Transfer Performance Issues for a Web Services Interface to Synchrotron Experiments", ACM, pp. 59-65 (Year: 2007).

Zhang et al, "Dynamic Topic Modeling for Monitoring Market Competition from Online Text and Image Data", ACM, pp. 1425-1434 (Year: 2015).

Zheng, et al, "Methodologies for Cross-Domain Data Fusion: An Overview," IEEE, pp. 16-34 (Year: 2015).

Zheng, et al, "Toward Assured Data Deletion in Cloud Storage," IEEE, vol. 34, No. 3, pp. 101-107 May/Jun. 2020 (Year: 2020).

Zhu, et al, "Dynamic Data Integration Using Web Services," IEEE, pp. 1-8 (Year: 2004).

Final Office Action, dated Sep. 19, 2022, from corresponding U.S. Appl. No. 17/306,496.

Notice of Allowance, dated Aug. 22, 2022, from corresponding U.S. Appl. No. 17/499,595.

Notice of Allowance, dated Sep. 2, 2022, from corresponding U.S. Appl. No. 17/380,485.

Office Action, dated Jul. 28, 2022, from corresponding U.S. Appl. No. 16/925,550.

Office Action, dated Jul. 7, 2022, from corresponding U.S. Appl. No. 17/370,650.

Office Action, dated Sep. 2, 2022, from corresponding U.S. Appl. No. 17/499,624.

Dowling, "Auditing Global HR Compliance", published May 23, 2014, retrieved from https://www.shrm.org/resourcesandtools/hr-topics/global-hr/pages/auditing-global-hr-compliance.aspx Jul. 2, 2022.

ESWC 2008 Ph.D. Symposium, Tenerife, Spain retrieved from https://ceur-ws.org/vol-358/ on Jun. 7, 23.

Heil et al., "Downsizing and Righsizing", archived May 23, 2013, retreived from https://web.archive.org/web/20130523153311/https://www.referenceforbusiness.com/management/De-Ele/Downsizing-and-Rightsizing.html Jun. 7, 2023.

Kamiran, et al. "Classifying without Discriminating," 2009 2nd International Conference on Computer, Control and Communication, IEEE, Abstract (Year: 2009).

Zemel, et al. "Learning Fair Representations," Proceedings of the 30th International Conference on Machine Learning, JMLR vol. 28, pp. 4-5 (Year: 2013).

Final Office Action, dated Apr. 13, 2023, from corresponding U.S. Appl. No. 16/925,550.

Final Office Action, dated Mar. 3, 2023, from corresponding U.S. Appl. No. 17/306,438.

Office Action, dated Mar. 9, 2023, from corresponding U.S. Appl. No. 17/306,496.

Office Action, dated Apr. 4, 2023, from corresponding U.S. Appl. No. 17/346,586.

Office Action, dated Mar. 16, 2023, from corresponding U.S. Appl. No. 17/494,220.

Office Action, dated Feb. 15, 2023, from corresponding U.S. Appl. No. 17/499,582.

Notice of Allowance, dated Jan. 31, 2023, from corresponding U.S. Appl. No. 17/499,624.

Notice of Allowance, dated Mar. 8, 2023, from corresponding U.S. Appl. No. 17/530,201.

Office Action, dated Nov. 11, 2022, from corresponding U.S. Appl. No. 17/670,341.

Final Office Action, dated Mar. 16, 2023, from corresponding U.S. Appl. No. 17/670,341.

Office Action, dated Aug. 2, 2022, from corresponding U.S. Appl. No. 17/670,354.

Final Office Action, dated Mar. 3, 2023, from corresponding U.S. Appl. No. 17/670,354.

Office Action, dated Aug. 12, 2022, from corresponding U.S. Appl. No. 17/679,734.

Final Office Action, dated Mar. 9, 2023, from corresponding U.S. Appl. No. 17/679,734.

Notice of Allowance, dated Feb. 8, 2023, from corresponding U.S. Appl. No. 17/831,700.

\* cited by examiner

Schema Table — 310

| Core_Component | Component_Attribute | Mapping |
|---|---|---|
| Workflow | Workflow Identifier | Workflows.Workflow_Id |
| Workflow | Version | Workflows.Version |
| Workflow | Name | Workflows.Name |
| ... | | |
| Stage | Stage Identifier | Stages.Stage_ID |
| Stage | Workflow Identifier | Stages.Workflow_ID |
| Stage | Name | Stages.Name |
| ... | | |
| Subtask | Subtask Identifier | Subtasks.Subtask_ID |
| Subtask | Stage Identifier | Subtasks.Stage_ID |
| Subtask | Name | Subtasks.Name |
| ... | | |
| Rule | Rule Identifier | Rules.Rule_ID |
| Rule | Workflow Identifier | Rules.Workflow_ID |
| Rule | Hook Identifier | Rules.Hook_ID |
| ... | | |

Workflows Table — 320

| Workflow_ID | Version | Name | Description | Status | Type | UseAsDefault |
|---|---|---|---|---|---|---|
| W1 | 1 | RiskWorkflow | Default Risk Workflow | Published | Risk | TRUE |

FIG. 3

Workflows

Workflows > Vendor Workflows

| Name ↑ | Default | Status | Last Updated | Date Modified | Created By | Date Created |
|---|---|---|---|---|---|---|
| Default Onboarding | ... | Published | Vendor Rules | 09/24/2020 | ... | 11/20/2019 |
| Default Rejecting | ... | Archived | Vendor Rules | 09/23/2020 | ... | 11/22/2019 |
| Draft | ... | Draft | Vendor Rules | 02/06/2020 | Vendor Rules | 02/06/2020 |
| Financial Vendor | ✓ | Published | Vendor Rules | 09/23/2020 | Vendor Rules | 11/22/2019 |
| Vendor Sample Workflows | ... | Archived | Vendor Rules | 03/13/2020 | Vendor Rules | 11/18/2019 |

Create New

FIG. 10

MANAGING CUSTOM WORKFLOWS FOR DOMAIN OBJECTS DEFINED WITHIN MICROSERVICES

CROSS-REFERENCE TO RELATED APPLICATIONS

This application claims priority from U.S. Provisional Patent Application Ser. No. 63/150,299, filed Feb. 17, 2021, the entire disclosure of which is hereby incorporated herein by reference in its entirety.

TECHNICAL FIELD

The present disclosure is generally related to systems and methods for controlling data processing operations pertaining to the development, maintenance, and installation of custom workflow programs defined within microservices.

BACKGROUND

Many enterprise software applications, services, and/or the like are provided in a software as a service (SaaS) framework. SaaS has become a common delivery model for such applications and services in which SaaS is typically supported by a cloud-based environment and accessed by users using a thin client such as a Web browser. Accordingly, microservice-based architectures are often preferable in cloud-based environments involving large, complex applications, services, and/or the like that require flexible development, deployment, and scaling.

A microservice-based architecture is implemented using multiple separate and self-contained applications, or microservices, that each provide a particular service and collectively form one or more fully functional applications within a SaaS framework, with the goal being the services can be brought to life independent of others. For various services provided through the microservices of an enterprise software application, service, and/or the like, it is often the case that these services may involve workflows through which a sequence of processes are performed for particular aspects of the services.

For example, an incidence of a particular event occurring for a particular service provided through a microservice may require a workflow to be performed for the event to evaluate and address the outcome of the event. Often such workflows are integrated into the different microservices using independent (custom) logic and/or user interfaces, which can lead to inefficiencies in maintaining workflow capabilities through the various microservices that make up the enterprise software application, service, and/or the like. Therefore, a need exists in the art for reusable, standardized configurations for implementing and managing custom workflows within different microservices used for an enterprise software application, service, and/or the like that can be associated with various domain objects of the microservices.

SUMMARY

In general, various aspects of the present invention provide methods, apparatuses, systems, computing devices, computing entities, and/or the like for generating and managing custom workflows for domain objects defined within microservices. In accordance with various aspects, a method is provided. Accordingly, the method comprises: receiving, via a graphical user interface, a first plurality of attribute values for a custom workflow to include in a microservice, wherein each attribute value of the first plurality of attribute values corresponds to an attribute of a first plurality of attributes defined for a workflow component; accessing, by computing hardware and from a schema table defined in a repository for the microservice, mapping data for an attribute of the first plurality of attributes; identifying, by the computing hardware and based on the mapping data for the attribute of the first plurality of attributes, a corresponding field of a workflows table mapped to the attribute of the first plurality of attributes, wherein the workflows table is defined in the repository; storing, by the computing hardware, a first record in the workflows table for the custom workflow, wherein an attribute value of the first plurality of attribute values for the attribute of the first plurality of attributes is stored for the first record in the corresponding field mapped to the attribute of the first plurality of attributes; receiving, via the graphical user interface, a second plurality of attribute values for a first stage to include in the custom workflow, wherein each attribute value of the second plurality of attribute values corresponds to an attribute of a second plurality of attributes defined for a stage component; accessing, by the computing hardware and from the schema table, mapping data for an attribute of the second plurality of attributes; identifying, by the computing hardware and based on the mapping data for the attribute of the second plurality of attributes, a corresponding field of a stages table mapped to the attribute of the second plurality of attributes, wherein the stages table is defined in the repository; and storing, by the computing hardware, a first record in the stages table for the first stage to include in the custom workflow, wherein an attribute value of the second plurality of attribute values is stored for the first record in the corresponding field mapped to the attribute of the second plurality of attributes.

In some aspects, the method further comprises: receiving, via the graphical user interface, a third plurality of attribute values for a second stage to include in the custom workflow, wherein each attribute value of the third plurality of attribute values corresponds to an attribute of the second plurality of attributes; identifying, by the computing hardware and based on the mapping data for the attribute of the second plurality of attributes, the corresponding field of the stages table mapped to the attribute of the second plurality of attributes; and storing, by the computing hardware, a second record in the stages table for the second stage to include in the custom workflow, wherein an attribute value of the third plurality of attribute values is stored for the second record in the corresponding field mapped to the attribute of the second plurality of attributes.

In some aspects, the method further comprises: receiving, via the graphical user interface, a third plurality of attribute values for a first subtask to include in the first stage of the custom workflow, wherein each attribute value of the third plurality of attribute values corresponds to an attribute of a third plurality of attributes defined for a subtask component; accessing, by the computing hardware and from the schema table, mapping data for an attribute of the third plurality of attributes; identifying, by the computing hardware and based on the mapping data for the attribute of the third plurality of attributes, a corresponding field of a subtasks table mapped to the attribute of the third plurality of attributes, wherein the subtasks table is defined in the repository; and storing, by the computing hardware, a first record in the subtasks table for the first subtask to include in the first stage of the custom workflow, wherein an attribute value of the third plurality of attribute values is stored for the first record in the corresponding field mapped to the attribute of the third plurality of attributes.

In some aspects, the method further comprises: receiving, via the graphical user interface, a fourth plurality of attribute values for a second subtask to include in the first stage of the custom workflow, wherein each attribute value of the fourth plurality of attribute values corresponds to an attribute of the third plurality of attributes; accessing, by the computing hardware and from the schema table, the mapping data for the attribute of the third plurality of attributes; identifying, by the computing hardware and based on the mapping data for the attribute of the third plurality of attributes, the corresponding field of the subtasks table mapped to the attribute of the third plurality of attributes; and storing, by the computing hardware, a second record in the subtasks table for the second subtask to include in the first stage of the custom workflow, wherein an attribute value of the fourth plurality of attribute values is stored for the second record in the corresponding field mapped to the attribute of the third plurality of attributes.

In some aspects, the method further comprises: receiving, via the graphical user interface, a condition and an action for a first rule to include in the first stage of the custom workflow, wherein the condition corresponds to a first attribute defined for a rule component and the action corresponds to a second attribute defined for the rule component; for the condition: identifying, by the computing hardware and based on an identifier for the first attribute, a third record stored in the schema table for the first attribute; and identifying, by the computing hardware and based on mapping data stored in the third record of the schema table, a first field of a rules table mapped to the first attribute, wherein the rules table is defined in the repository; for the action: identifying, by the computing hardware and based on an identifier for the second attribute, a fourth record stored in the schema table for the second attribute; and identifying, by the computing hardware and based on mapping data stored in the third record of the schema table, a second field of the rules table mapped to the second attribute; and storing, by the computing hardware, a first record in the rules table for the first rule to include in the first stage of the custom workflow, wherein the condition and the action are stored for the first record in the first field and the second field, respectively.

In some aspects, the method further comprises: receiving, via the graphical user interface, an identifier for a domain object defined within the microservice and an identifier for the custom workflow; and storing, by the computing hardware, a record in a workflow assignment table defined in the repository for the microservice, the record comprising mapping data that maps the domain object to the custom workflow, wherein storing the record in the workflow assignment table results in the custom workflow being made available for use with an instance generated of the domain object. Accordingly, in some aspects, the custom workflow being made available to the instance comprises allowing a user, through a second graphical user interface, to define properties for the first stage of the custom workflow that are applicable to the instance of the domain object.

In accordance with various aspects, a system is provided comprising a non-transitory computer-readable medium storing instructions and a processing device communicatively coupled to the non-transitory computer-readable medium. Accordingly, the processing device is configured to execute the instructions and thereby perform operations that comprise: receiving, via a graphical user interface, a first plurality of attribute values defined for a custom workflow to include in a microservice, wherein each attribute value of the first plurality of attribute values corresponds to an attribute of a first plurality of attributes defined for a workflow component; for each attribute value of the first plurality of attribute values: identifying, based on an identifier for the corresponding attribute of the first plurality of attributes, a first record stored in a schema table for the corresponding attribute of the first plurality of attributes, wherein the schema table is defined in a repository for the microservice; and identifying, based on mapping data stored in the first record of the schema table, a corresponding field of a workflows table mapped to the corresponding attribute of the first plurality of attributes, wherein the workflows table is defined in the repository; storing a first record in the workflows table for the custom workflow, wherein each of the first plurality of attribute values is stored for the first record in the corresponding field mapped to the corresponding attribute of the first plurality of attributes; receiving, via the graphical user interface, a second plurality of attribute values for a first stage to include in the custom workflow, wherein each attribute value of the second plurality of attribute values corresponds to an attribute of a second plurality of attributes; for each attribute value of the second plurality of attribute values: identifying, based on an identifier for the corresponding attribute of the second plurality of attributes, a second record stored in the schema table for the corresponding attribute of the second plurality of attributes; and identifying, based on mapping data stored in the second record of the schema table, a corresponding field of a stages table mapped to the corresponding attribute of the second plurality of attributes, wherein the stages table is defined in the repository; and storing a first record in the stages table for the first stage to include in the custom workflow, wherein each of the second plurality of attribute values is stored for the first record in the corresponding field mapped to the corresponding attribute of the second plurality of attributes, and storing the first plurality of attribute values and the second plurality of attribute values persists the custom workflow in the microservice.

In some aspects, the operations further comprise: receiving, via the graphical user interface, a third plurality of attribute values for a second stage to include in the custom workflow, wherein each attribute value of the third plurality of attribute values corresponds to an attribute of the second plurality of attributes; for each attribute value of the third plurality of attribute values: identifying, based on the identifier for the corresponding attribute of the second plurality of attributes, the second record stored in the schema table for the corresponding attribute of the second plurality of attributes; and identifying, based on the mapping data stored in the second record of the schema table, the corresponding field of the stages table mapped to the corresponding attribute of the second plurality of attributes; and storing a second record in the stages table for the second stage to include in the custom workflow, wherein each of the third plurality of attribute values is stored for the second record in the corresponding field mapped to the corresponding attribute of the second plurality of attributes and a particular attribute value of the third plurality of attribute values identifies a position in a sequence of the second stage to include in the custom workflow with respect to the first stage to include in the custom workflow.

In some aspects, the operations further comprise: receiving, via the graphical user interface, a third plurality of attribute values for a first subtask to include in the first stage of the custom workflow, wherein each attribute value of the third plurality of attribute values corresponds to an attribute of a third plurality of attributes defined for a subtask component; for each attribute value of the third plurality of attribute values: identifying, based on an identifier for the corresponding attribute of the third plurality of attributes, a third record stored in the schema table for the corresponding attribute of the third plurality of attributes; and identifying, based on mapping data stored in the third record of the schema table, a corresponding field of a subtasks table mapped to the corresponding attribute of the third plurality of attributes, wherein the subtasks table is defined in the repository; and storing a first record in the subtasks table for the first subtask to include in the first stage of the custom workflow, wherein each of the third plurality of attribute values is stored for the first record in the corresponding field mapped to the corresponding attribute of the third plurality of attributes.

In some aspects, the operations further comprise: receiving, via the graphical user interface, a fourth plurality of attribute values for a second subtask to include in the first stage of the custom workflow, wherein each attribute value of the fourth plurality of attribute values corresponds to an attribute of the third plurality of attributes; for each attribute value of the fourth plurality of attribute values: identifying, based on the identifier for the corresponding attribute of the third plurality of attributes, the third record stored in the schema table for the corresponding attribute of the third plurality of attributes; and identifying, based on the mapping data stored in the third record of the schema table, the corresponding field of the subtasks table mapped to the corresponding attribute of the third plurality of attributes; and storing a second record in the subtasks table for the second subtask to include in the first stage of the custom workflow, wherein each of the fourth plurality of attribute values is stored for the second record in the corresponding field mapped to the corresponding attribute of the third plurality of attributes.

In some aspects, the operations further comprise: receiving, via the graphical user interface, a condition and an action for a first rule to include in the first stage of the custom workflow, wherein the condition corresponds to a first attribute defined for a rule component and the action corresponds to a second attribute defined for the rule component; for the condition: identifying, based on an identifier for the first attribute, a third record stored in the schema table for the first attribute; and identifying, based on mapping data stored in the third record of the schema table, a first field of a rules table mapped to the first attribute, wherein the rules table is defined in the repository; for the action: identifying, based on an identifier for the second attribute, a fourth record stored in the schema table for the second attribute; and identifying, based on mapping data stored in the third record of the schema table, a second field of the rules table mapped to the second attribute; and storing a first record in the rules table for the first rule to include in the first stage of the custom workflow, wherein the condition and the action are stored for the first record in the first field and the second field, respectively.

In some aspects, the operations further comprise: receiving, via the graphical user interface, an identifier for a domain object defined within the microservice and an identifier for the custom workflow; and storing a record in a workflow assignment table defined in the repository for the microservice, the record comprising mapping data that maps the domain object to the custom workflow, wherein storing the record in the workflow assignment table results in the custom workflow being made available for use with an instance generated of the domain object. Accordingly, in some aspects, the custom workflow being made available to the instance comprises allowing a user, through a second graphical user interface, to define properties for the first stage of the custom workflow that are applicable to the instance of the domain object.

In addition in accordance with various aspects, a non-transitory computer-readable medium having program code that is stored thereon. In particular aspects, the program code executable by one or more processing devices performs operations that comprise: receiving, via a graphical user interface, a first attribute value for a custom workflow to include in a microservice, wherein the first attribute value corresponds to a first attribute defined for a workflow component; identifying, based on an identifier for the first attribute defined for the workflow component, a first record stored in a schema table for the first attribute, wherein the schema table is defined in a repository for the microservice; identifying, based on mapping data stored in the first record of the schema table, a corresponding field of a workflows table mapped to the first attribute defined for the workflow component, wherein the workflows table is defined in the repository; storing a first record in the workflows table for the custom workflow, wherein the first attribute value is stored for the first record in the corresponding field mapped to the first attribute defined for the workflow component; receiving, via the graphical user interface, a second attribute value for a first stage to include in the custom workflow, wherein the second attribute value corresponds to a first attribute defined for a stage component; identifying, based on an identifier for the first attribute defined for the stage component, a second record stored in the schema table for the first attribute defined for the stage component; identifying, based on mapping data stored in the second record of the schema table, a corresponding field of a stages table mapped to the first attribute defined for the stage component, wherein the stages table is defined in the repository; and storing a first record in the stages table for the first stage to include in the custom workflow, wherein the second attribute value is stored for the first record in the corresponding field mapped to the first attribute defined for the stage component, and storing the first attribute value and the second attribute value persists the custom workflow in the microservice.

In some aspects, the operations further comprise: receiving, via the graphical user interface, a third attribute value for a second stage to include in the custom workflow, wherein the third attribute value corresponds to the first attribute defined for the stage component; identifying, based on the identifier for the first attribute defined for the stage component, the second record stored in the schema table for the first attribute defined for the stage component; identifying, based on the mapping data stored in the second record of the schema table, the corresponding field of the stages table mapped to the first attribute defined for the stage component; and storing a second record in the stages table for the second stage to include in the custom workflow, wherein the third attribute value is stored for the second record in the corresponding field mapped to the first attribute defined for the stage component.

In some aspects, the operations further comprise: receiving, via the graphical user interface, a third attribute value for a first subtask to include in the first stage of the custom workflow, wherein the third attribute value corresponds to a first attribute defined for a subtask component; identifying, based on an identifier for the first attribute defined for the subtask component, a third record stored in the schema table for the first attribute defined for the subtask component;

identifying, based on mapping data stored in the third record of the schema table, a corresponding field of a subtasks table mapped to the first attribute defined for the subtask component, wherein the subtasks table is defined in the repository; and storing a first record in the subtasks table for the first subtask to include in the first stage of the custom workflow, wherein the third attribute value is stored for the first record in the corresponding field mapped to the first attribute defined for the subtask component.

In some aspects, the operations further comprise: receiving, via the graphical user interface, a condition and an action for a first rule to include in the first stage of the custom workflow, wherein the condition corresponds to a first attribute defined for a rule component and the action corresponds to a second attribute defined for the rule component; for the condition: identifying, based on an identifier for the first attribute defined for the rule component, a third record stored in the schema table for the first attribute defined for the rule component; and identifying, based on mapping data stored in the third record of the schema table, a first field of a rules table mapped to the first attribute defined for the rule component, wherein the rules table is defined in the repository; for the action: identifying, based on an identifier for the second attribute defined for the rule component, a fourth record stored in the schema table for the second attribute defined for the rule component; and identifying, based on mapping data stored in the third record of the schema table, a second field of the rules table mapped to the second attribute defined for the rule component; and storing a first record in the rules table for the first rule to include in the first stage of the custom workflow, wherein the condition and the action are stored for the first record in the first field and the second field, respectively.

In some aspects, the operations further comprise: receiving, via the graphical user interface, an identifier for a domain object defined within the microservice and an identifier for the custom workflow; and storing a record in a workflow assignment table defined in the repository, the record comprising mapping data that maps the domain object to the custom workflow, wherein storing the record in the workflow assignment table results in the custom workflow being made available for use with an instance generated of the domain object. Accordingly, in some aspects, the custom workflow being made available to the instance comprises allowing a user, through a second graphical user interface, to define properties for the first stage of the custom workflow that are applicable to the instance of the domain object.

BRIEF DESCRIPTION OF THE DRAWINGS

In the course of this description, reference will be made to the accompanying drawings, which are not necessarily drawn to scale, and wherein:

FIG. 3 depicts an example of a repository architecture in accordance with various aspects of the present disclosure;

FIG. 10 depicts an example of a graphical user interface that may be used in accordance with various aspects of the present disclosure;

DETAILED DESCRIPTION

Figure 1:
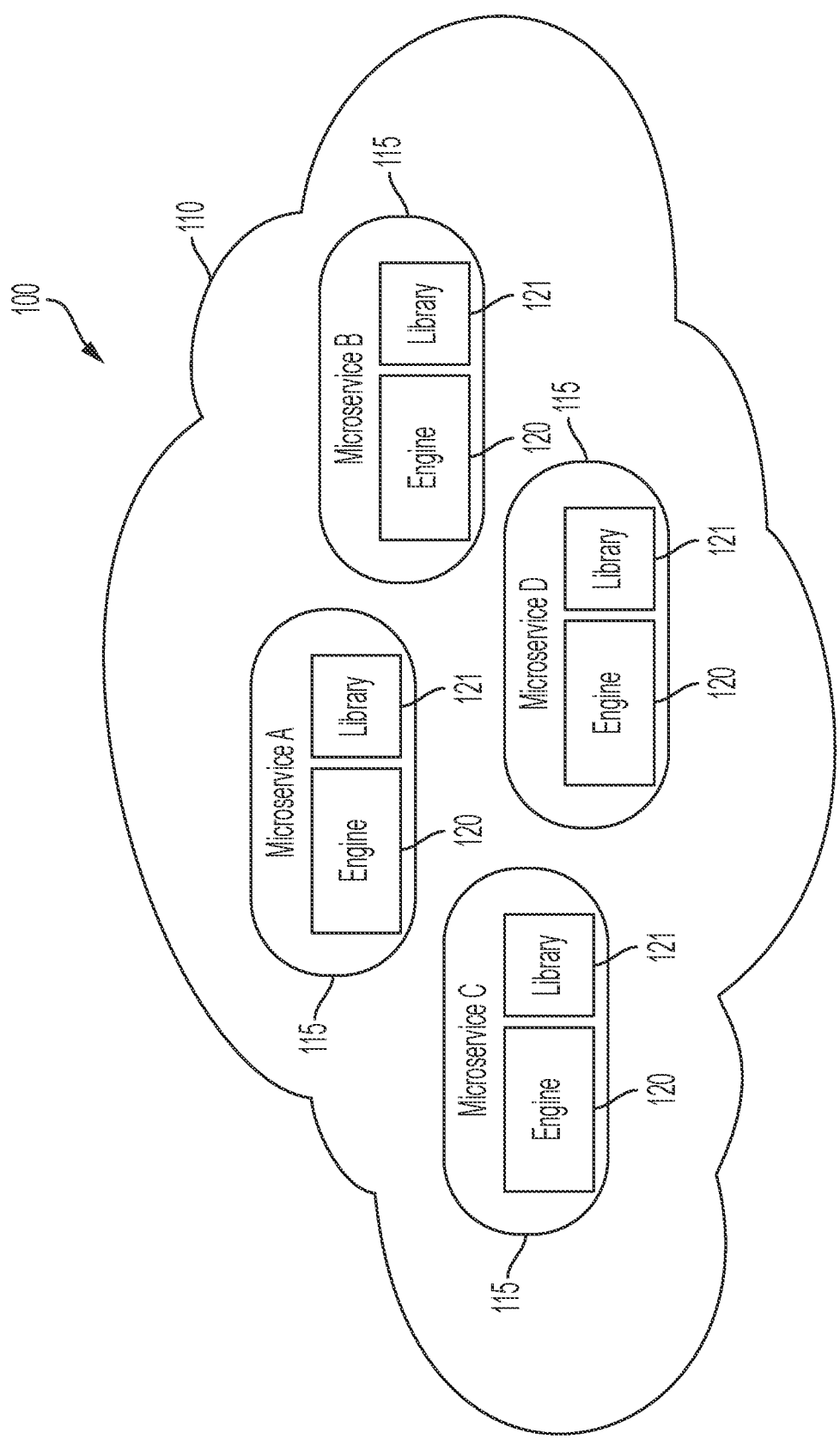
FIG. 1 depicts an example of a microservice-based enterprise software application that may involve various aspects of the present disclosure.

Overview and Technical Contributions of Various Aspects

As noted, many enterprise software applications, services, and/or the like are provided in a software as a service (SaaS) framework supported by a cloud-based environment. Accordingly, microservice-based architectures are often preferable in cloud-based environments involving large, complex applications, services, and/or the like that require flexible development, deployment, and scaling. A microservices application, for example, may be implemented using multiple separate and self-contained applications, or microservices, that each provide a particular service and collectively form one or more fully functional applications within a SaaS framework.

A microservice is often viewed as focused on producing a particular task. For example, an enterprise software application may be offered that provides a platform for various entities (e.g., organizations) to operationalize privacy, security, and data governance. The enterprise software application may provide a number of different services to these entities that can be used in operationalizing privacy, security, and data governance. For example, many entities that handle certain types of data, such as personal data of individuals, may be required to ensure the data is handled in a secure manner to minimize the risk of experiencing a data-related incident involving the data such as a breach, theft, and/or the like of the data. Therefore, the enterprise software application may provide a service, implemented through a microservice, in evaluating various data assets of an entity that are used in handling the data to identify and address vulnerabilities of the data assets that can expose the data to a significant risk of experiencing some type of data incident involving the data, such as a data breach leading to the unauthorized access of the data, a data loss event, etc.

As a specific example, a data asset for an entity may be a database, data repository, server, router, and/or the like that handles certain data for the entity (e.g., stores, processes, transfers, collects, and/or the like the certain data for the entity). The entity may be interested in identifying any vulnerabilities of the data asset that may expose the entity to a data-related incident involving the certain data. Therefore, the entity may load information on the data asset into the service provided through the enterprise software application and utilize the service in evaluating the data asset and its handling of the certain data. In conducting the evaluation, the service may identify a risk posed by the data asset handling the certain data. For instance, the service may identify that the certain data is transferred through the data asset in manner that can allow for the data to be intercepted by an unauthorized third party. Accordingly, the service may provide a risk management process for evaluating the identified risk and based on the evaluation, implement a plan to address (e.g., mitigate) the risk. Here, the service may implement a risk management process within the microservice via a workflow that can be executed to perform the risk management process.

The microservice may be configured according to an object model that defines domain objects that represent various meaningful elements to a domain applicable to the service. For example, a domain object that the microservice can define within the microservice associated with the risk evaluation service is "risk," itself. The microservice may define the domain object "risk" within the microservice through a class. For example, the domain object "risk" can be implemented as a Plain Old Java Object (POCO).

Accordingly, the microservice can use the class defined for the domain object "risk" in implementing both behavior and data attributes for the domain object. A behavior that can be defined for the domain object "risk" is the workflow executed to perform the risk management process. Once assigned, when the class for the domain object "risk" is instantiated to generate a specific instance of the domain object "risk," the instance of the domain object includes the behavior defining the workflow so that the service can then execute the workflow to perform the risk management process for the instance of the domain object "risk." For example, when the domain object "risk" is instantiated to generate an instance representing the risk imposed by the data asset transferring the certain data in a manner that can allow for the data to be intercepted by an unauthorized third party, the instance representing this specific risk includes the behavior defining the workflow so that the workflow can be executed to conduct the risk management process for the risk.

A workflow may comprise various components that are involved in performing the process associated with the workflow. For example, a workflow may involve various steps, stages, operations, and/or the like that are encountered in performing the workflow. In addition, different tasks may be involved in the various steps, stages, operations, and/or the like. Further, the microservice may define various attributes for the various components (e.g., for the different tasks and/or the various steps, stages, operations, and/or the like) that can make up a workflow. Furthermore, different (custom) workflows can be defined within a microservice (and/or across different microservices) that use different combinations of these components and/or attributes thereof. Therefore, personnel (e.g., teams) who are responsible for constructing and/or maintaining a microservice are also typically responsible for defining (implementing) the custom workflows that are to be utilized within the microservice.

For the team to define these custom workflows, the various components, and attributes thereof that can be used within the custom workflows need to persist in the microservice so that the components and attributes are available for use in building out a particular custom workflow. The team responsible for the microservice generally accomplishes this task through the use of a repository defined for the microservice. For example, the repository may be a relational database in which tables and/or fields of tables found within the database are mapped to the various components and/or attributes that can be used within the custom workflows. The team is then able to build a specific custom workflow for the microservice by utilizing the tables and/or fields in storing values for various components and/or attributes used in constructing the custom workflow. Once a custom workflow is built, the team can then associate the workflow with a particular domain object to define the workflow as a behavior for the domain object.

However, a technical challenge that is often encountered by a team in constructing custom workflows for a microservice is designing and implementing the various components and attributes thereof necessary for constructing the custom workflows. Here, different teams for different microservices may design and implement different "core" components that are used in constructing a custom workflow. For example, a first team responsible for a first microservice may design the core components to simply include a workflow component and a task component where the workflow component is used to represent a custom workflow and the task component is used to represent various tasks that can be defined for performing for the custom workflow. In another example, a second team for a second microservice may design the core components to include a workflow component, a step component, and a subtask component where the workflow component is used to represent a custom workflow, the step component is used to represent sequential steps involved in the custom workflow, and the subtask component is used to represent various tasks that can be performed at the various steps of the custom workflow. The different teams may also design and implement different attributes for these core components.

Accordingly, clients of the first and second microservices who want to make use of these custom workflows are then required to recognize and understand the different configurations of the components and attributes that make up the custom workflows in the two (e.g., or more) microservices. That is to say, clients who want to use custom workflows in the first microservice must understand that the custom workflows for the first microservice have a configuration that includes workflow components and task components. In addition, these same clients who also want to use custom workflows in the second microservice must understand that the custom workflows for the second microservice have a configuration that includes workflow components, step components, and subtasks components. These differences (inconsistencies) in configurations of custom workflows between the first microservice and the second microservice can become quite frustrating for these clients who are utilizing the custom workflows in the first and second microservices. Such frustration can become even more significant when differences (inconsistencies) in configurations of components and attributes thereof that make up custom workflows is encountered by clients across a multitude of microservices (services). That is to say, clients may become frustrated with the different "look and feel" of custom workflows available across the different services provided through the different microservices.

Another technical challenge that is often encountered by a team in constructing custom workflows for a microservice is designing and implementing the tables and fields necessary for persisting the various components and attributes thereof used in constructing the custom workflows for the microservice. Again, a team responsible for a particular microservice may implement any number of different configurations to persist the components and attributes. However, these different configurations may not always deliver equal performance for operations involving the components and attributes such as storing, fetching, deleting, updating, and/or the like values defined for the different components and/or attributes for a custom workflow. As a result, clients of different microservices, using different configurations for persisting custom workflows, may experience inconsistent performance with respect to executing custom workflows for various instances of data objects defined within the different microservices.

Yet, another technical challenge that is often encountered by a team in constructing custom workflows for a microservice is the team is often required to design and implement endpoints (e.g., points of entry) within the microservice that are used in communicating with the repository to perform operations involving the components and/or attributes thereof defined for a custom workflow. For example, the team may need to design and implement endpoints that allow communication with the repository to persist (store) certain components and/or attributes thereof selected for defining a particular custom workflow for the microservice. Such design and implementation may involve generating a mapping between the various components and attributes available to include in a custom workflow to their corresponding tables and fields found in the repository. In addition, the team may also be required to design and implement custom user interfaces for using these endpoints in defining, implementing, and managing custom workflows for the microservice. All of which can require significant resources and time with respect to developing program code for implementing the various endpoints, as well as the user interfaces for using the endpoints.

Various aspects of the present disclosure overcome many of the technical challenges associated with generating, defining, and managing custom workflows for a microservice, as detailed above. In particular, various aspects of the disclosure involve the use of a novel approach for providing a set of core components used in generating custom workflows through the inclusion of a library within a microservice. The library includes an object for each of the core components. For example, each of the objects may be a Java Persistence Application Programming Interface (JPA) entity. Once the library has been included in a microservice, the library includes code that builds out the necessary tables and mapping data to persist the core components in the repository of the microservice. The mapping data includes a mapping of the core components (e.g., the objects thereof) to their corresponding tables found in the repository. Once persisted, these core components, via the objects, mapping data, and tables, can be used in constructing custom workflows for the microservice. In addition, the library includes code that builds out the necessary fields of the tables and mapping data to persist attributes for the core components in the repository of the microservice. The mapping data includes a mapping of the attributes defined for each of the core components (e.g., attributes defined for the objects thereof) to their corresponding fields found in the appropriate table for the core component. The attributes of the different core components can be used in defining properties of custom workflows constructed for the microservice. In some aspects, these core components can include a workflow component, a stage component, a subtask component, and a rule component. Further, the library includes standardized endpoints to facilitate communication with the core components. Therefore, inclusion of the library in the microservice exposes these endpoints to the microservice and provides communication channels with the core components that can be used in implementing custom workflows.

The workflow component can represent a custom workflow designed and installed for the microservice. The stage component can be used in representing a stage to include in a custom workflow. The subtask component may be used in representing a subtask that can be performed within a particular stage of a custom workflow. The rule component may be used in representing a rule that controls one or more actions that are performed within the custom workflow based on one or more conditions.

As a specific example, a custom workflow may need to be implemented into a microservice for a risk management process. The risk management process may be used for evaluating an identified risk and based on the evaluation, implementing a plan to address (e.g., mitigate) the risk. Therefore, the core components can be used in representing various features of the risk management process to generating a custom workflow within the microservice for the risk management process. Accordingly, the workflow component is used to represent the custom workflow, itself, within the microservice. In the specific example, an instance of the workflow component (object thereof) is generated to represent the risk management process that involves storing values for attributes defined for the workflow component in the appropriate table found in the repository for the microservice. For instance, a value providing a name for the custom workflow (e.g., "risk management process") can be stored in a corresponding field (e.g., "Name" field) of the appropriate table.

The stage component is used to represent a stage that can be defined within a workflow to organize a group of features for the custom workflow. For example, a stage can be used in organizing a group of related tasks to perform for the custom workflow. Often, the stages of a custom workflow are performed in a sequence. Looking at the specific example, the stage component can be used to represent a particular stage performed for the risk management process that comprises an evaluation stage conducted for the risk management process that involves conducting an evaluation for the identified risk to assess the risk's severity. An instance of the stage component (object thereof) is generated to represent the evaluation stage that involves storing values for attributes defined for the stage component in the appropriate table found in the repository for the microservice. For instance, a value providing a position of the evaluation stage in a sequence of stages to be performed for the risk management process (e.g., "1") can be stored in a corresponding field (e.g., "Sequence" field) of the appropriate table.

The subtask component is used to represent a subtask that can be performed during a stage of the custom workflow. A subtask may be performed during a stage to accomplish some type of work, activity, process, exercise, and/or the like. A subtask may be performed manually or through an automated process. Looking at the specific example, the subtask component can be used to represent a particular subtask that can be performed during the evaluation stage of the risk management process that comprises a scoring subtask that involves scoring and quantifying a level of risk for the identified risk to measure the risk's severity. An instance of the subtask component (object thereof) is generated to represent the scoring subtask that involves storing values for attributes defined for the subtask component in the appropriate table found in the repository for the microservice. For instance, a value identifying whether the scoring subtask is required to be performed during the evaluation stage (e.g., "TRUE") can be stored in a corresponding field (e.g., "Required" field) of the appropriate table.

The rule component is used to represent a rule that controls one or more actions that are performed within the custom workflow based on one or more conditions. The microservice, in executing an instance of the custom workflow, can carry out the one or more actions in an automated manner. Looking at the specific example, the rule component can be used to represent a notification rule that involves automatically sending an electronic notification to risk management personnel if the risk score satisfies a threshold value. Accordingly, a hook point can be defined for the rule that identifies where during the custom workflow that the microservice evaluates the one or more conditions defined for the rule. For instance, the hook point for notification rule may be defined as the completion of the scoring subtask. An instance of the rule component (object thereof) is generated to represent the notification rule that involves storing values for hook point, condition(s), and action(s) defined for the rule component in the appropriate table found in the repository for the microservice. For instance, a value identifying the hook point for the notification rule (e.g., "H1") can be stored in a corresponding field (e.g., "Hook_ID" field) of the appropriate table.

In addition, various aspects of the disclosure involve the use of a novel workflow management engine that executes functions for generating, implementing, and managing custom workflows for the microservice. For instance, a create workflow module accessible via the workflow management engine can create a new custom workflow for the microservice and persist the new custom workflow within the microservice. The create workflow module uses one or more standardized endpoints in communicating with the repository of the microservice and storing the custom workflow within the repository. Here, the create workflow module can use the standardized endpoint(s) to access the workflow component (object thereof) and identify, using mapping data defined for the workflow component, a workflows table installed within the repository, as well as the fields of the workflows table that are used to store values for various attributes of the custom workflow.

In addition, the workflow management engine can provide access to other modules creating other core components (e.g., stages, subtasks, rules, etc.) for a custom workflow defined for the microservice and persisting these other core components for the custom workflow within the microservice. For instance, a create stage module accessible via the workflow management engine can create a stage to include in a custom workflow defined for the microservice and persist the stage for the custom workflow within the microservice. Similar to the create workflow module, the create stage module can use one or more standardized endpoints in communicating with the repository of the microservice and storing the stage for the custom workflow within the repository.

Finally, a publish workflow module accessible via the workflow management engine can publish a custom workflow defined for the microservice. Publishing the custom workflow makes the custom workflow available to define as behavior for a particular domain object of the microservice. The publish workflow module can use one or more standardized endpoints communicating with the repository of the microservice in publishing the custom workflow by changing a status value for the custom workflow (e.g., changing a value stored in a status attribute for the custom workflow).

Accordingly, the novel library and/or workflow management engine can be included in multiple microservices that are implemented for an enterprise software application to provide capabilities within the microservices to generate and persist custom workflows within the microservices. Once generated and persisted, these custom workflows can be published and associated with domain objects defined within the microservices. As a result, the custom workflows become available for execution with respect to instances generated for their respective domain objects.

According to various aspects, the inclusion of the novel library and/or workflow management engine within the different microservices for the enterprise software application establishes a set of core components and attributes thereof to be used in generating custom workflows within the microservices that is common across all the different microservices. As a result, teams who are responsible for the different microservices are no longer required to design and implement their own versions of custom workflows within the different microservices. Therefore, these teams do not have to expend resources in developing the core components and attributes needed to implement custom workflows within their microservices. In addition, the common set of core components and attributes across the different microservices provides clients of the microservices (the services implemented by the microservices) with the experience a similar "look and feel" of workflows across the different microservices.

Further, the inclusion of the novel library and/or workflow management engine within the different microservices for the enterprise software application provides a set of standardized endpoints that communicate with the core components (objects thereof) to gain access to mapping data used in generating, implementing, and managing custom workflows within the microservices. Therefore, the teams who are responsible for the different microservices are also no longer required to design and implement their own versions of endpoints within the different microservices. These standardized endpoints can facilitate quicker development of user interfaces used for generating, implementing, and managing custom workflows within the microservices. Furthermore, the standardized endpoints can allow for development and implementation of standardized user interfaces across the different microservices for such tasks. As a result, the various teams for the different microservices are no longer required to expend as many resources, or expend any resources at all, in developing user interfaces for these tasks.

The disclosure is provided herein in the context of using a microservice-based architecture for an enterprise software application. However, various aspects described in this disclosure can be used for a microservice-based architecture that involves a variety of other applications besides an enterprise software application. For example, various aspects of the disclosure are applicable to a microservice-based architecture used for mobile applications such as a mobile banking application, a media content application, an Internet of things (IoT) application, and/or the like. In another example, various aspects of the disclosure are applicable to a microservice-based architecture used for web applications such as an e-commerce website, corporate website, media website, and/or the like. Therefore, the disclosure provided herein involving the use of a microservice-based architecture for an enterprise software application should not be viewed as limiting the scope of various aspects of the disclosure.

Example Computing Environment

FIG. 1 depicts an example of a microservice-based enterprise software application 100. In the depicted example, a cloud environment 110 hosts the application that is composed of a plurality of microservices 115 utilized by various services provided through the enterprise software application 100. Here, each of the microservices 115 need to implement custom workflows for various domain objects defined within the microservices 115. Therefore, the novel workflow management engine 120 and library 121 may be installed within each of the microservices 115.

The inclusion of the library 121 in a particular microservice 115 results in the library 121 exposing the core components and attributes thereof to the microservice 115 by building out the tables and fields required for persisting the core components and attributes thereof in a repository of the microservice 115. For example, the library may provide these core components as Java Persistence Application Programming Interfaces (JPAs) entities. In addition, the inclusion of the library 121 exposes mapping data for the core components and attributes thereof. The mapping data maps each of the core components to their corresponding table in the repository and the each of the attributes for a core component to the attribute's corresponding field of the table. Further, the inclusion of the library 121 exposes standardized endpoints needed to communicate with the core components, and thus the tables and fields of the core components, in generating, implementing, and managing custom workflows for the microservice 115. For example, these standardized endpoints may be representational state transfer (REST) application programming interfaces (APIs).

The inclusion of the workflow management engine 120 in a particular microservice 115 provides access to various modules that can use the standardized endpoints for generating, implementing, and managing custom workflows for the microservice 115. In addition, the workflow management engine 120 according to particular aspects may provide one or more user interfaces (e.g., graphical user interfaces) for the various modules that can be used by teams in executing the modules.

Accordingly, the workflow management engine 120 and library 121, each of which can be installed in each microservice 115 implemented for various services provided through the enterprise software application, can provide a reusable mechanism for implementing custom workflow capabilities into the various services. In addition, the workflow management engine 120 and library 121 can standardize how such custom workflows are implemented within each of the services. This standardization can reduce the resources expended on separately designing and developing core components and architecture necessary for implementing custom workflows specific to a microservice 115. Instead, the workflow management engine 120 and library 121, which can be included in any of the microservices 115, provides these custom workflow capabilities within each microservice 115. Furthermore, this standardization provides, to a given client (e.g., within a particular tenant of a SaaS system), a similar "look and feel" with respect to custom workflows across the various services provided through the microservices 115. Such standardization in the "look and feel" of different custom workflows can make these workflows more intuitive, since a user can infer how to operate controls and functions in a custom workflow that the user has not yet encountered based on the similar look and feel of controls and functions in a different custom workflow with which the user is familiar. This standardization in the end user experience can increase the utility of these custom workflows within a software environment (e.g., a tenant of a SaaS system).

Figure 2:
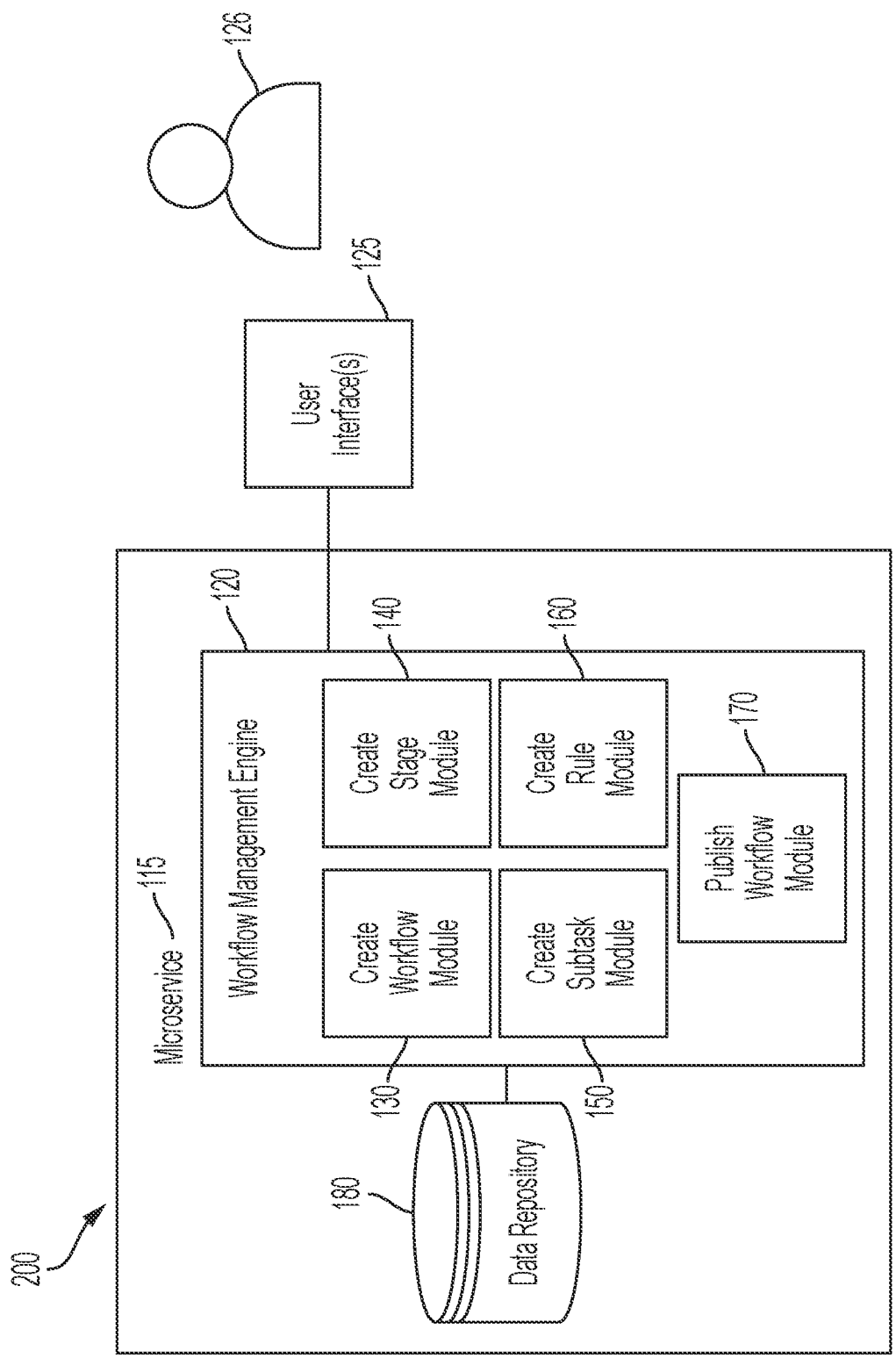
FIG. 2 depicts an example of a computing environment that can be used for generating and managing custom workflows for use within a microservice in accordance with various aspects of the present disclosure.

Turning now to FIG. 2, this figure depicts an example of a computing environment 200 that can be used for generating, implementing, and managing custom workflows within a microservice 115 implemented as part of an enterprise software application according to various aspects. In this example, the microservice 115 can provide a particular service, or task thereof, that is available through the enterprise software application 100.

The microservice 115 includes a data repository 180 used in storing data for the microservice 115. For example, the repository 180 may be a relational database that stores data for domain objects utilized by the microservice 115. Inclusion of the library 121 (not pictured in FIG. 2) in the microservice 115 results in tables and fields being built out in the repository 180 to support custom workflow capabilities for the microservice. One or more of the tables may be used in the repository 180 for storing mapping data for the custom workflows. As further discussed herein, the mapping data provides a mapping of core components (and attributes thereof) of custom workflows to tables and the fields defined therein that are used for storing values for the attributes of these core components. Specifically, these fields can be used in storing values for attributes associated with specific configurations of custom workflows designed for the microservice 115.

In addition, the microservice 115 includes a workflow management engine 120 that provides access to various modules that can be used in generating, implementing, and managing custom workflows within the microservice 115. In this example, the workflow management engine 120 includes a create workflow module 130, a create stage module 140, a create subtask module 150, a create rule module 160, and publish workflow module 170. Two or more of these modules can be executed in collaboration to create a new custom workflow within the microservice 115

The create workflow module 130 can be executed to generate a new custom workflow within the microservice 115. The create workflow module 130 can store values for various attributes of the new custom workflow as defined by a user. The create workflow module 130 accomplishes this task by utilizing one or more standardized endpoints to communicate with the workflow component (object thereof) to access the mapping of the selected attributes for the new custom workflow to various fields of a workflows table defined in the repository 180.

The create stage module 140 can be executed to add a stage into a particular custom workflow. The create stage module 140 can stores values for various attributes of the stage selected for inclusion in the stage of a custom workflow. The create stage module 140 accomplishes this task by utilizing one or more standardized endpoints to communicate with the stage component (object thereof) to access the mapping of the selected attributes for the stage to various fields of a stages table found in the repository 180.

The create subtask module 150 can be executed to add a subtask into a stage of a particular custom workflow. A subtask is a task performed during the stage of a custom workflow to accomplish some type of work, activity, process, exercise, and/or the like involved in executing the custom workflow. In one example, a subtask may be an activity such as "performing an evaluation of particular risk identified for a data asset." In another example, a subtask may be an activity such as "identifying an access control to be applied to a data asset in order to mitigate or otherwise address a risk identified for the data asset." Similar to the create stage module 140 and create workflow module 130, the create subtask module 150 according to particular aspects stores values for various attributes of the subtask selected for inclusion in the subtask of the new custom workflow. The create subtask module 150 accomplishes this task by utilizing one or more standardized endpoints to communicate with the subtask component (object thereof) to access the mapping of the selected attributes for the subtask to various fields of a subtasks table found in the repository 180.

The create rule module 160 can be executed to add a rule related to a component (e.g., a stage) of a particular custom workflow. An example of a rule is a set of code that executes one or more actions in response to one or more conditions being met. A rule for a component of a custom workflow can impose one or more controls on that component. For instance, a rule can be included in a stage of a custom workflow that involves sending a notification (e.g., an email) to specific personnel when a risk identified for a data asset is evaluated as high.

As discussed further herein, multiple "hook" points (e.g., the beginning or end of a custom workflow, a stage, a subtask, etc.) are defined throughout a custom workflow that can be used in implementing a rule. A computing system executing an instance of a custom workflow implements the rule at a certain hook point of the custom workflow by, for example, evaluating the condition(s) for the rule in response to encountering the hook point in the execution of the custom workflow instance. An example of an "instance" of a custom workflow being executed is an execution of the custom workflow for a particular instance of a domain object associated with the custom workflow. For example, if a rule is inserted into to a custom workflow at the beginning of a stage, then the condition(s) for the rule are evaluated when the stage begins during execution of an instance of the custom workflow.

The create rule module 160 can store values for the condition(s) and action(s) of the rule selected for inclusion at the hook point for the new custom workflow. The create rule module 160 accomplishes this task by utilizing one or more standardized endpoints to communicate with the rule component (object thereof) to access the mapping of the condition(s) and action(s) for the rule to various fields of a rules table found in the repository 180.

The publish workflow module 170 can be executed to publish a particular custom workflow to make the workflow available within the microservice 115. In addition, the publish workflow module 170 can link or otherwise associate a custom workflow with a particular domain object defined for the microservice 115. As a result, the custom workflow (e.g., an instance of the custom workflow) is then available for execution for an instance generated of the particular domain object. The publish workflow module 170 can store the association between the custom workflow and the domain object in the microservice 115 by utilizing one or more standardized endpoints to store a record that maps the association in a workflow assignment table found in the repository 180 of the microservice 115.

According to various aspects, the workflow management engine 120 provides personnel 126 (e.g., team members) with access to one or more of these modules 130, 140, 150, 160, 170 available through via one or more user interfaces 125. For example, the one or more user interfaces 125 may comprise one or more webpages provided through a website that is in communication with the microservice 115. The user interfaces 125 may be standardized user interfaces that have been provided along with the library 121 and/or workflow management engine 120 that can be used by the personnel 126 in generating, implementing, and/or managing custom workflows for the microservice 115. However, in other instances, the personnel 126 may build custom user interfaces 125 that communicate with the various modules 130, 140, 150, 160, 170 available through the workflow management engine 120.

Repository Architecture

Figure 4:
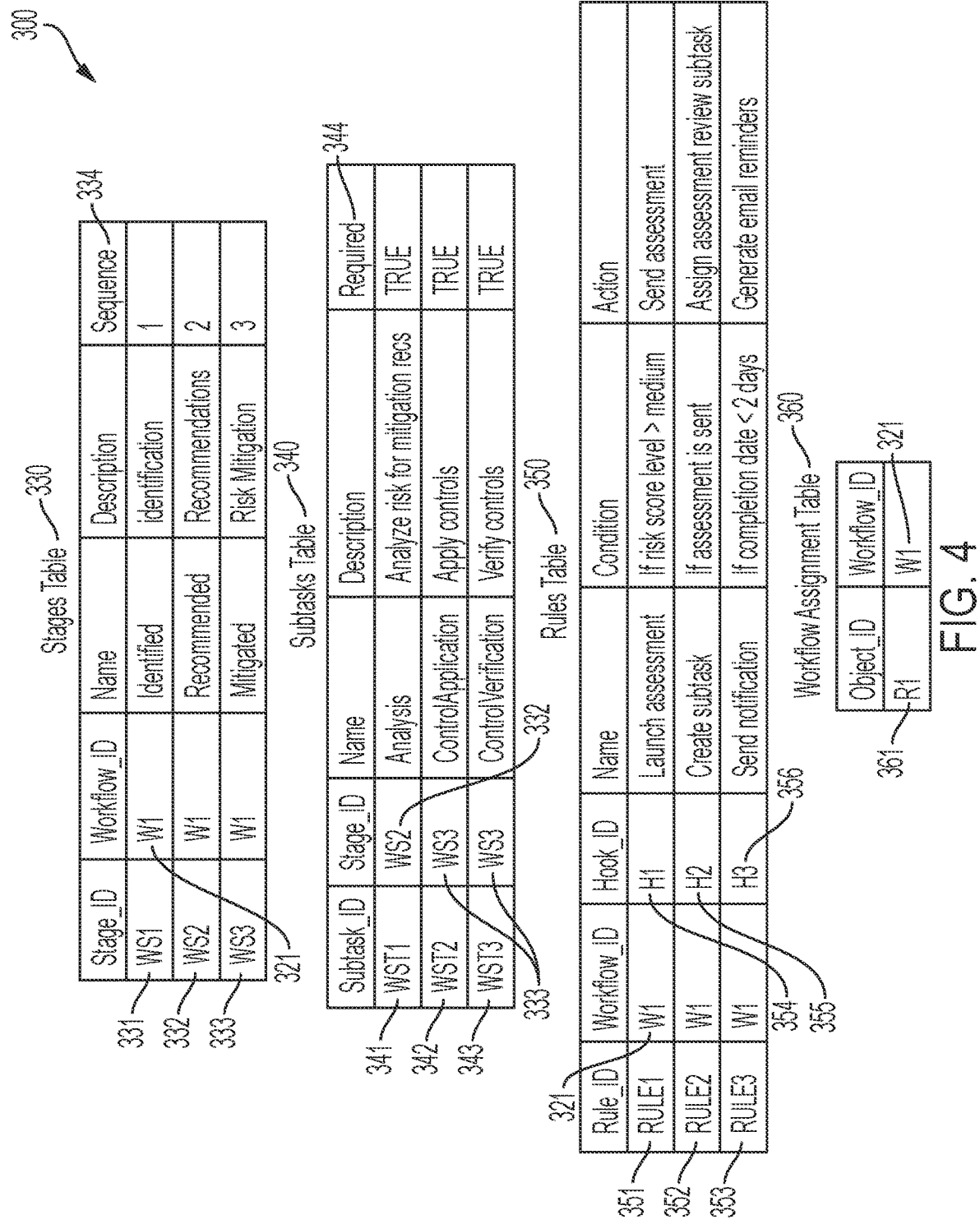
FIG. 4 depicts additional features of an example of the repository architecture in accordance with various aspects of the present disclosure.

FIGS. 3 and 4 depict an example of a repository architecture 300 that can be used in accordance with various aspects of the present disclosure. Specifically, the data repository 180 (e.g., the data repository 180 shown in FIG. 2), when based on the architecture 300 shown in FIGS. 3 and 4, can be used according to various aspects in persisting custom workflows (e.g., core components and attributes thereof) for use within a microservice 115. Accordingly, such an architecture 300 can be included in multiple microservices 115 that compose an enterprise software application to persist custom workflows over the microservices 115 so that the custom workflows are available within various services provided by the enterprise software application.

The enterprise software application may provide several different services. These services may utilize custom workflows associated with different domain objects for representing various entity and/or value objects used within the services. For example, the enterprise software application may provide a risk evaluation service through the enterprise software application that allows an entity (e.g., organization) to evaluate different data assets found within computing systems of the entity that are used in handling certain types of data such as personal data of individuals, referred to as data subjects. Here, the enterprise software application may receive, via one or more user inputs, information on a particular data asset so that a risk evaluation can be conducted on the data asset to identify any risks that may exist in having the data asset handle the certain type of data. Therefore, a domain object that may be defined and used within the risk evaluation service is "data asset." In addition, another domain object that may be defined and used within the risk evaluation service is "risk."

For a risk that has been identified for the data asset, the risk evaluation service (or some other service) may provide a risk management process for evaluating a particular risk identified for the data asset, and based on the evaluation, implement a plan for managing the risk by implementing actions to address/mitigate the risk and/or to monitor the risk. Therefore, the risk management process may need to be implemented within a microservice 115 so that it is available within the risk evaluation service. To do so, the team responsible for the microservice 115 may need to implement a custom workflow within the microservice 115 that the microservice can execute to perform the risk management process.

The repository architecture 300 may include one or more data structures (e.g., tables) used for implementing such a custom workflow. The data structures can store mapping data that maps attributes of core components, which can be used in constructing custom workflows, to data elements (e.g., fields for tables) that store values for the attributes with respect to particular custom workflows that are generated for the microservice 115. The remainder of the disclosure refers to tables and fields as the data structures and data elements used within the repository 180 for persisting custom workflows. In other aspects, a data structure and/or data element may encompass data structures and/or data elements, in addition to, or other than tables and fields. For example, other data structures may include files, spreadsheets, matrices, and/or the like. Other fields may include delimited text, cells, and/or the like.

As previously noted, a library 121 is included in the microservice 115 that builds out the tables within the microservice's 115 repository 180 to support custom workflow capabilities. According to various aspects, the library 121 builds out the tables to support several core components that can be used in constructing a custom workflow. These core components include a workflow component, a stage component, a subtask component, and a rule component.

As previously discussed, the microservice can use a workflow component to represent and define a custom workflow designed and installed for the microservice 115. The microservice can use a stage component to represent and define a stage to include in a custom workflow. The microservice can use a subtask component to represent and define a subtask that can be performed within a particular stage of a custom workflow. The microservice can use a rule component to represent and define a rule that controls one or more actions that are performed within the custom workflow based on one or more conditions.

Looking first at FIG. 3, the repository architecture 300 can include one or more schema tables for storing the mapping of various attributes for core components of a custom workflow to various fields of tables defined in the repository 180 for the core components. The various fields can store values for the attributes to persist specific configurations of custom workflows. For instance, the repository architecture 300 can include a Schema table 310 for storing mapping data representing the mapping of the various attributes for the core components to the various fields of tables defined in the repository 180 for the core components.

Here, the Schema table 310 includes records that map attributes, as shown in the Component_Attribute column 315, for the various core components 311, 312, 313, 314 to fields of tables defined in the repository 180 for the various core components 311, 312, 313, 314, as shown in the Mapping column 316. One or more of the create workflow module 130, create stage module 140, create subtask module 150, create rule module 160, and/or publish workflow module 170 can reference the Schema table 310 in storing a particular custom workflow that has been defined for the microservice 115. In some aspects, the create workflow module 130 can query the Schema table 310 for mapping data for attributes of a particular custom workflow. The create workflow module 130 uses the mapping data returned in response to the query to identify fields in the repository 180 to which to store the values for the attributes. The create workflow module 130 stores values for these attributes in the identified fields.

For example, the create workflow module 130 may need to store a name as an attribute for a newly configured custom workflow for the microservice 115. To do so, the create workflow module 130 may query the Schema table 310 to identify a record 317 found in the table 310 for the "Name" attribute 318 of a custom workflow. The create workflow module 130 may then reference the mapping data 319 found in the record 317 and determine that the name (i.e., attribute value) provided for the newly configured custom workflow is to be stored in the "Name" field of the Workflows table 320. Similarly, the create stage module 140, create subtask module 150, and create rule module 160 may also reference the Schema table 310 in storing values for various attributes defined for stages, subtasks, and rules, respectfully, that are defined for a particular custom workflow in the same manner.

According to particular aspects, the library 121 maps the attributes of the various core components 311, 312, 313, 314 by storing the records for the different attributes in the Schema table 310 at a time when the library 121 is initially installed in the microservice 115 and builds out the Schema table 310. In addition, the library 121 builds out the tables and fields for the various core components as reflected by the mapping data stored in the records of the Schema table 310. Therefore, the repository architecture 300 includes a table for each core component that is configured for storing values for the various attributes that may be defined for any particular custom workflow implemented into the microservice 115.

In some aspects, a single table (e.g., a Schema table 310) can be used for storing the mapping data for the attributes of the various core components. But in other aspects, configurations of the repository architecture 300 can use more than a single table for such a purpose. For example, in particular configurations of the architecture 300, a schema table may be implemented for each core component. As a specific example, the repository architecture 300 can include a workflow schema table, a stage schema table, a subtask schema table, and a rule schema table. Such a configuration may be beneficial in some instances since fewer records may need to be queried to reference the mapping data for an attribute for any particular core component. For example, to determine where to store a value for the name attribute of a stage, the create stage module 140 would only need to query the records providing mapping data for the various attributes that can be defined for a stage found in a stage schema table as opposed to having to query the records providing mapping data for the various attributes that can be defined for all the core components in a single schema table.

Accordingly, the particular repository architecture 300 shown in FIGS. 3 and 4 includes a plurality of tables that are used in storing values for the various attributes of core components for specific custom workflows defined for the microservice 115. Specifically, the repository architecture 300 includes a Workflows table 320, shown in FIG. 3, that can be used for storing values of attributes that can be defined for a specific custom workflow. In addition, looking at FIG. 4, the repository architecture 300 can include a Stages table 330 that can be used for storing values of attributes that can be defined for one or more stages included a specific custom workflow. In addition, the repository architecture 300 can include a Subtasks table 340 that can be used for storing values of attributes that can be defined for one or more subtasks included in the stages of a specific custom workflow. Further, the repository architecture 300 can include a Rules table 350 that can be used for storing values of hook points, conditions, and actions that can be defined for one or more rules included in a specific custom workflow.

In an illustrative example, a team uses the workflow management engine 120 to build a custom workflow that performs a risk management process for evaluating a particular risk identified for a data asset, and based on the evaluation, implementing a plan for managing the risk. One or more members of the team responsible for the microservice 115 may use one or more user interfaces 125 that allow the member(s) to define the configuration of the custom workflow by defining what core components make up the custom workflow, as well as define values for various attributes of the core components. In turn, the create workflow module 130, create stage module 140, create subtask module 150, and/or create rule module 160 may then be executed in persisting the custom workflow (the configuration thereof) within the microservice 115 by storing values for various attributes of the core components that have been identified by the member(s) as making up the custom workflow.

Therefore, the one or more members, through the one or more user interfaces 125, may select the core components that make up the custom workflow and provide values for various attributes of the core components. For example, a member may provide input (e.g., via a user interface) indicating that he or she wishes to create a new custom workflow for the microservice 115 and navigates to a user interface 125 that request values for various attributes to define for the custom workflow. Such attributes may include a name of the custom workflow, a description of the custom workflow, a type for the custom workflow, whether the custom workflow is to be used as a default with respect to domain objects the custom workflow may be associated with, and/or the like. Once the member has entered the values for the various attributes, the member may indicate (e.g., may select a button on the screen) to have the new custom workflow created for the microservice 115. In turn, the create workflow module 130 may be executed to store the values for the attributes in the repository 180.

According to various aspects, the create workflow module 130 creates the custom workflow in the microservice 115 by querying the records stored in the Schema table 310 and referencing the mapping data found in the records for the various attributes defined for the workflow core component in determining the fields of the Workflows table 320 to use in storing the values received from the member. Once the create workflow module 130 has determined the fields to use in storing the values for the attributes, the create workflow module 130 stores a record having a "W1" workflow identifier 321 in the Workflows table 320 with the values for the attributes stored in their corresponding fields as shown in FIG. 3.

The create workflow module 130 may continue to configure the custom workflow by defining stages to include in the custom workflow based on user input from the member. Here, the member may navigate to another user interface 125 that allows the member to define a stage to include in the custom workflow, as well as define values for various attributes of the stage. For example, the attributes may include a name for the stage, a description of the stage, and/or the like. In addition, the stages of a custom workflow are typically performed in a sequence. Therefore, an attributed defined for the stage may include its position within the sequence of stages.

In addition to the attributes, the create workflow module 130 may also define one or more subtasks that can be performed during the stage based on definitions for the one or more subtasks provided by the member via a user interface. According to various aspects, these subtasks may then be selected during the execution of an instance of the custom workflow to be performed during the stage of the custom workflow. For example, the member may define seven different subtasks that can be performed during the stage. As a result, the seven subtasks will be available to a client during the execution of an instance of the custom workflow for the client to select to include in the instance of the custom workflow to be performed during the stage. In some instances, a subtask may be required to be performed and is automatically added to the instance of the custom workflow.

Similar to the workflow and stages, the member may define values for various attributes of a subtask. For example, attributes for a subtask may include a name of the subtask, a description of the subtask, and/or the like. In addition, the attributes may include an indicator as to whether the subtask is required to be performed for the stage of the custom workflow. If the indicator is set to "TRUE," then the subtask may automatically be added to the stage for an instance generated of the custom workflow.

According to various aspects, the create workflow module 130, through the user interface 125, may receive and create the stage for the custom workflow, as well as the subtasks to make available for the stage. In turn, the create stage module 140 and the create subtask module 150 may be executed to store the values for the attributes of the stage and the values for the attributes of the subtasks, respectfully, in the repository 180.

Therefore, in similar fashion to the create workflow module 130, the create stage module 140 according to various aspects queries the records stored in the Schema table 310 and references the mapping data found in the records for the various attributes defined for the stage core component in determining the fields of the Stages table 330 to use in storing the values received from the member for the stage. Once the create stage module 140 has determined the fields to use in storing the values for the attributes, the create stage module 140 stores a record in the Stages table 330 with the values for the attributes of the stage stored in their corresponding fields.

Likewise, the create subtask module 150 queries the records stored in the Schema table 310 and references mapping data found in the records for the various attributes defined for the subtask core component in determining the fields of the Subtasks table 340 to use in storing the values received from the member for each of the subtasks. Once the create subtask module 150 has determined the fields to use in storing the values for the attributes for each of the subtasks, the create subtask module 150 stores a record for each subtask in the Subtasks table 340 with the values for the attributes of the subtask stored in their corresponding fields of the record for the subtask.

Therefore, turning to FIG. 4, the member has defined three stages to include in the custom workflow that is to be executed to perform a risk management process. Here, the stages include "Identified," "Recommended," and "Mitigated." The "identified" stage may involve the beginning of the workflow once a risk has been identified for the data asset being evaluated. The "Recommended" stage may involve developing a treatment plan for addressing and/or mitigating the risk. In addition, the "Recommended" stage may involve in addition to, or instead of, the treatment plan, developing a monitoring plan for monitoring the risk for any change in severity. The "Mitigated" stage may involve executing the treatment plan to address and/or mitigate the risk.

According to particular aspects, a client that is executing an instance of the custom workflow may decide to include all or only certain stages of the custom workflow. For example, a client may identify a risk for a particular asset that is only considered minimal and therefore, may decide that a treatment plan is not needed for addressing and/or mitigating the risk. Therefore, the client may decide to skip (not include) the "Mitigated" stage in the instance of the custom workflow.

In addition, the custom workflow may define a single subtask for the "Recommended" stage that is named "Analysis." This particular subtask involves conducting a thorough analysis of the risk identified for the data asset so that appropriate recommendations can be identified for addressing and/or mitigating the risk. Further, the custom workflow defines two subtasks (e.g., based on input from the member) for the "Mitigated" stage that are named "ControlApplication" and "Control Verification." The "ControlApplication" subtask involves applying various controls that are identified to address and/or mitigate the risk. For example, the risk may involve a risk of unauthorized parties gaining access to the data asset. Therefore, the "ControlApplication" subtask may involve implementing an access control such as two-factor authentication for the data asset to control access to the asset. The "Control Verification" subtask involves performing one or more verification processes to ensure (verify) that the proper controls have been implemented to address and/or mitigate the risk.

Looking at FIG. 4, three records having "WS1," "WS2," "WS3" identifiers 331, 332, 333 have been added to the Stages table 330 to persist the three stages "Identified," "Recommended," and "Mitigated" defined by the member. The Stages table 330 includes various fields that can be used in storing attribute values for each of the stages. In addition, the Stages table 330 includes a "Workflow_ID" field that is used in storing an identifier 321 for the custom workflow to associate the three stages with the custom workflow added to the microservices 115 for the risk management process. Furthermore, the Stages table 330 includes a "Sequence" field 334 that is used in identifying the position of a stage in the sequence of stages defined for the custom workflow.

Three records having "WST1," "WST2," "WST3" identifiers 341, 342, 343 have also been added to the Subtasks table 340 to persist the three subtasks "Analysis," "ControlApplication," and "Control Verification" defined by the member for the "Recommended" and "Mitigated" stages. Similar to the Stages table 330, the Subtasks table 340 includes various fields that can be used in storing attribute values for each of the subtasks. In addition, the Subtasks table 340 includes a "Stage_ID" field that is stores an identifier 331, 332, 333 for the stage corresponding to each of the subtasks. Furthermore, the Subtasks table 340 includes a "Required" field 344 that identifies whether the subtask is required to be performed for its corresponding stage. In this example, the "Required" field 344 for each of the three subtasks has been set to "TRUE," indicating a required performance of each of the subtasks during their respective stages.

According to particular aspects, the "Required" field 344 can be set to "FALSE" for a subtask defined for a stage of a custom workflow to indicate that the subtask is option for the stage. In these instances, the subtask can be made available for selection by a client for an instance generated of the custom workflow. Therefore, if the client wishes to have the subtask performed during the stage of the instance of the custom workflow, the client can select the subtask to indicate so, and the custom workflow can add the subtask to the stage for the instance of the custom workflow.

As previously noted, the member may also define rules for the custom workflow that involve performing one or more actions in response to one or more conditions being met, or in some instances, not being met. For example, a rule may cause a remainder email must be sent to the individual who has been assigned to complete a particular subtask if the subtask is not completed in a specified amount of time.

According to various aspects, the microservice may provide various hook points that trigger a rule during different moments of the custom workflow. For example, a hook point may be provided at the beginning of a stage that allows for a rule to be defined that is triggered when the stage begins for an instance of the custom workflow. Here, "triggering" involves evaluating the condition(s) of the rule and if the condition(s) are met, or not met depending on the rule, then executing the action(s) defined by the rule.

Therefore, the member may identify the applicable hook point in defining a rule for the custom workflow. In addition, the member may identify one or more conditions for the rule, along with one or more actions to perform. According to various aspects, the member, through a user interface 125, may create the one or more rules for the custom workflow. In turn, the create rule module 160 may be executed to persist in the rules in the repository 180. The create rule module 160 queries the records stored in the Schema table 310 and references mapping data found in the records for the hook point, conditions, and actions defined for the rule component in determining the fields of the Rules table 350 to use in storing the hook point, condition(s), and action(s) received by the member for each of the rules. Once the create subtask module 150 has determined the fields to use in storing the hook point, condition(s), and action(s) for each of the rules, the create rule module 160 stores a record for each rule in the Rules table 350 with the hook point, condition(s), and action(s) stored in their corresponding fields of the record for the rule.

For example, the member may have defined three rules for the custom workflow developed for the risk management process. The first rule may involve sending an assessment to perform for the identified risk if the risk is determined to have a score level greater than "medium." The second rule may involve assigning a subtask to have an individual review the assessment if the assessment were sent based on the first rule. The third rule may involve generating and sending an email remainder for a subtask if the completion date set for the subtask is less than two days.

Therefore, looking at FIG. 4, three records having "RULE1," "RULE2," "RULE3" identifiers 351, 352, 353 have been stored in the Rules table 350 for each of these rules in which each of the rules is associated with the identifier "W1" 321 for the custom workflow. Here, the first rule associated with (e.g., is implemented responsive to encountering) a hook point with the identifier "H1" 354. This particular identifier 354 may be for a hook point implemented for the beginning of the first stage of the custom workflow. Therefore, the rule is triggered at the beginning of the "Identified" stage. The second rule associated with (e.g., is implemented responsive to encountering) a hook point with the identifier "H2" 355. This particular identifier 355 may be for a hook point implemented for the beginning of the second stage of the custom workflow. Therefore, the second rule is triggered at the beginning of the "Recommended" stage. Finally, the third rule associated with (e.g., is implemented responsive to encountering) a hook point with the identifier "H3" 356. This particular identifier 356 may be for a hook point implemented for when the second stage is placed in a status of "ongoing." Therefore, the third rule is triggered when the "Recommended" stage is place in the status of "ongoing."

The publish workflow module 170, responsive to user input via a user interface 125 from a member indicating that the custom workflow's development is complete, can publish the custom workflow and associate the custom workflow with a particular domain object for the microservice 115. For example, a custom workflow published for the risk management process can be associated with the "risk" domain object defined for the microservice 115. The publish workflow module 170 stores a record in a Workflow Assignment table 360 provided in the repository that associates (maps) the domain object to the customer workflow. For example, as shown in FIG. 4, the publish workflow module 170 stores a record in the Workflow Assignment table 360 with an identifier 361 for the "risk" domain object and the identifier 321 for the custom workflow.

As a result of publishing the custom workflow and associating it with the "risk" domain object, the custom workflow becomes available for execution for each instance generated of the "risk" domain object in the microservice 115. For instance, a client, using the risk assessment service to assess a data asset using in handling a certain type of data, may identify a particular risk associated with the data asset handling the certain type of data. In response to user input identifying this risk, the microservice 115 implementing the service may generate an instance of the "risk" domain object to represent the identified risk that is comprised of an instance of the custom workflow developed for performing the risk management process. The enterprise software application can subsequently execute custom workflow within the service for the identified risk to perform the risk management process on the risk.

According to various aspects, the repository architecture 300 may also include other tables that are used in storing data (e.g., attributes) for instances of custom workflows. For example, an attribute that may defined for a subtask to perform during a stage of an instance generated for a particular custom workflow may be an individual who has been assigned to complete the subtask. Additional attributes may be defined for the subtask such as, for example, a completion date for the subtask, an individual who is to approve completion of the subtask, and/or the like. Therefore, one or more tables may be included in the repository architecture 300 that can be used in persisting the values defined for these attributes.

According to some aspects, the library 121 that is included in the microservice 115 and builds out the tables and fields as previously described, may also build out the tables and fields needed in persisting data for instances generated of custom workflows. In other instances, the data may be stored in tables used in persisting domain objects for the microservice 115. Yet, in other instances, members responsible for the microservice 115 may design and implement their own tables that are used in persisting data for instances of custom workflows. Further detail is provided below regarding the configuration and functionality of the create workflow module 130, create stage module 140, create subtask module 150, create rule module 160, and publish workflow module 170 according to various aspects of the disclosure.

Create Workflow Module

Figure 5:
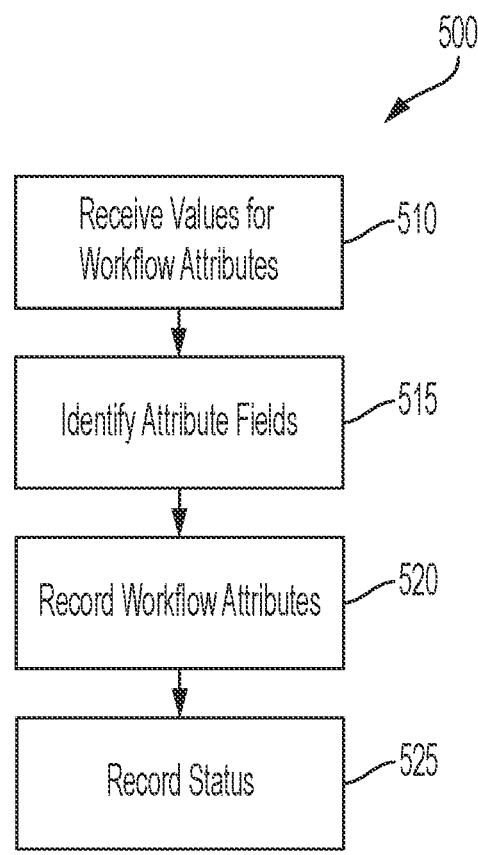
FIG. 5 depicts an example of a process for creating a custom workflow for a microservice in accordance with various aspects of the present disclosure.

Turning now to FIG. 5, additional details are provided regarding a create workflow module 130 used for creating a custom workflow for a microservice 115 in accordance with various aspects of the disclosure. As previously noted, the create workflow module 130 according to various aspects is provided as part of a workflow management engine 120. The create workflow module 130 utilizes one or more standardized endpoints to communicate with the workflow component defined within the microservice 115 to store values for various attributes of the custom workflow in the repository 180 of the microservice 115. Therefore, the flow diagram shown in FIG. 5 may correspond to operations carried out, for example, by computing hardware as described herein, as the computing hardware executes the create workflow module 130.

The process 500 involves the create workflow module 130 receiving one or more values for one or more attributes of the custom workflow in Operation 510. For example, the received values may include a name of the custom workflow, a description of the custom workflow, a type for the custom workflow, whether the custom workflow is to be used as a default with respect to domain objects the custom workflow may be associated with, and/or the like. In addition, the values may include an identifier for the custom workflow. According to some aspects, the create workflow module 130 may generate the identifier for the custom workflow.

The create workflow module 130 identifies the fields provided in the Workflows table 320 that are used in storing the values of the attributes provided by member in Operation 515. For instance, the create workflow module 130 performs this particular operation by referencing mapping data provided in the repository 180. Here, the create workflow module 130 can gain access to the mapping data through using the one or more standardized endpoints to communicate with the workflow component. The mapping data may be in the form of a Schema table 310 provided in the repository 180 that includes records identifying the various attributes that may be defined for the workflow component and the attributes' corresponding fields in the Workflows table 320 used in storing values for the attributes. The create workflow module 130 queries the Schema table 310 in identifying the fields used in storing the values for the attributes provided by the member.

Here, the create workflow module 130 may identify a specific record stored in the Schema table 310 for each attribute that a value has been provided for by the member. For example, an attribute identifier (e.g., name of the attribute) may be provided for a particular attribute along with the value for the attribute that can be used by the create workflow module 130 in identifying the record stored in the Schema table 310 for the attribute. In addition, the create workflow module 130 may provide a core component identifier that represents the core component "Workflow" that can also be used by the create workflow module 130 in identifying the record. Once the create workflow module 130 has identified the record in the Schema table 310 that corresponds to the attribute, the create workflow module 130 can then reference the mapping data provided by the record in identifying the field found in the Workflows table 320 that is used for storing the value for the attribute.

For example, the create workflow module 130 may provide the core component identifier "Workflow" and attribute identifier "Name" along with a value for a particular attribute. The create workflow module 130 may use these two identifiers in querying the record associated with the particular attribute from the Schema table 310. The create workflow module 130 can then reference the mapping data for the record in determining that the "Name" field of the Workflows table 320 is used in storing the value received along with these two identifiers.

The process 500 continues with the create workflow module 130 storing a record in the Workflows table 320 to record the values of the attributes provided by the member for the custom workflow in Operation 520. Again, the create workflow module 130 may do so by utilizing the one or more standardized endpoints to communicate with the workflow component to store the record in the Workflows table 320. The create workflow module 130 records the value for each of the attributes in the attribute's corresponding field of the record stored in the Workflows table 320. As a result, the custom workflow persists in the microservice 115 and defined based on the values provided for the various attributes. In addition, the create workflow module 130 may also store a value in a "Status" field in Operation 525 for the custom workflow representing a current status of the custom workflow.

According to various aspects, the create workflow module 130 may set the status of the custom workflow to "DRAFT." This status may indicate that the custom workflow is still in development and that further core components and corresponding attributes need to be defined for the custom workflow. For example, one or more stages may need to be defined for the custom workflow.

Although the create workflow module 130 shown in FIG. 5 is configured for creating a custom workflow within a microservice 115, the create workflow module 130 may be configured (or other modules may be included) according to various aspects for performing other functionality with respect to a custom workflow such as editing the attributes (values thereof) defined for the custom workflow, adding additional attributes (values thereof) to the custom workflow, deleting attributes (values thereof) for the custom workflow, and/or the like. Accordingly, the create workflow module 130 (or other modules) may perform such functionality in a similar fashion as recording values for various attributes to persist a custom workflow in the microservice 115. For example, the create workflow module 130 (or other modules) may edit, add, delete, and/or the like attributes (values thereof) for the custom workflow by referencing the Schema table 310 to identify those fields of the Workflows table 320 used in storing values for the attributes that need to be edited, added, deleted, and/or the like.

Create Stage Module

Figure 6:
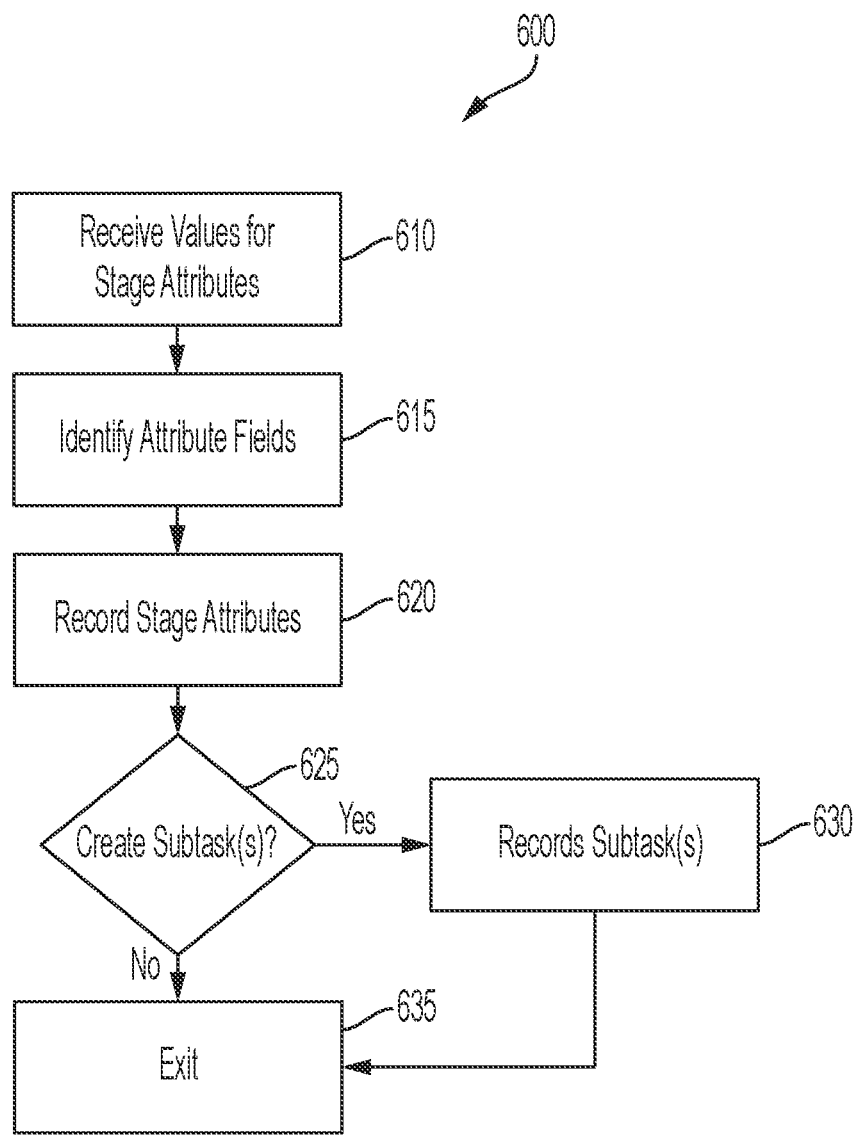
FIG. 6 depicts an example of a process for creating a stage of a custom workflow in accordance with various aspects of the present disclosure.

Turning now to FIG. 6, additional details are provided regarding a create stage module 140 used for creating a stage for a custom workflow in accordance with various aspects of the disclosure. As previously noted, the create stage module 140 according to various aspects is provided as part of a workflow management engine 120. The create stage module 140 can utilize one or more standardized endpoints to communicate with the stage component defined within the microservice 115 to store values for various attributes of the stage in the repository 180 of the microservice 115. Therefore, the flow diagram shown in FIG. 6 may correspond to operations carried out, for example, by computing hardware as described herein, as the computing hardware executes the create stage module 140.

The process 600 involves the create stage module 140 receiving one or more values for one or more attributes of the stage in Operation 610. For example, the values that may be received may include a name for the stage, a description of the stage, a position of the stage in a sequence of the stages defined for the custom workflow, and/or the like. In addition, the create stage module 140 may receive an identifier for the custom workflow, as well as an identifier for the stage. According to some aspects, the create stage module 140 may generate the identifier for the stage.

The create stage module 140 identifies the fields provided in the Stages table 330 that are used in storing the values of the attributes provided by member in Operation 615. Similar to the create workflow module 130, the create stage module 140 performs this particular operation according to various aspects by referencing mapping data provided in the form of a Schema table 310 that includes records identifying the various attributes that may be defined for a stage component of a custom workflow and the attributes' corresponding fields in the Stages table 330 used in storing values for the attributes. The create stage module 140 can gain access to the mapping data through using the one or more standardized endpoints to communicate with the stage component.

The create stage module 140 queries the Schema table 310 to identify a specific record stored in the Schema table 310 for each attribute for the stage that a value has been provided for by the member. For example, an attribute identifier (e.g., name of the attribute) and a core component identifier (e.g., "Stage") may be provided for a particular attribute along with the value for the attribute that the create stage module 140 uses in identifying the record stored in the Schema table 310 for the attribute. Once the create stage module 140 has identified the record in the Schema table 310 that corresponds to the attribute, the create stage module 140 can then reference the mapping data provided by the record in identifying the field found in the Stages table 330 that is used for storing the value for the attribute.

The process 600 continues with the create stage module 140 storing a record in the Stages table 330 to record the values of the attributes provided by the member for the stage in Operation 620. Again, the create stage module 140 may do so by utilizing the one or more standardized endpoints to communicate with the stage component to store the record in the Stages table 330. Accordingly, the create stage module 140 records the value for each of the attributes in the attribute's corresponding field of the record stored in the Stages table 330. In addition, the create stage module 140 records the identifier for the stage and the identifier for the workflow in the corresponding fields of the record to associate the stage with the custom workflow. As a result, the stage is then persisted in the custom workflow and defined based on the values provided for the various attributes.

As previously discussed, the member may also define one or more subtasks for the stage. Therefore, the create stage module 140 may determine whether values for attributes have also been received for one or more subtasks that have been defined to include in the stage in Operation 625. For example, the values may include subtask identifiers and/or subtask names that the create stage module 140 determines are associated with one or more subtasks. If the create stage module 140 determines attribute values have been received for one or more subtasks to include in the stage, then the create stage module 140 records the one or more subtasks for the stage in Operation 630.

According to various aspects, the create stage module 140 performs this particular operation by invoking (executing) a create subtask module 150. For example, the create stage module 140 may provide the values of attributes for the subtask(s) that are to be added to the stage to the create subtask module 150. In addition, the create stage module 140 may provide the create subtask module 150 with an identifier for the stage. As further discussed herein, the create subtask module 150 records the values provided for various attributes for the one or more subtasks in the Subtasks table 340 to persist the subtask(s) for the stage. Once the subtask(s) have been recorded for the stage, the create stage module exits in Operation 635. Accordingly, the create stage module 140 can create additional stages for the custom workflow by storing the values defined for various attributes of the additional stages, as well as the subtask(s) defined for the additional stages.

Although the create stage module 140 shown in FIG. 6 is configured for creating a stage for a custom workflow, the create stage module 140 may be configured (or other modules may be included) according to various aspects for performing other functionality with respect to a stage such as editing the attributes (values thereof) defined for the stage, adding additional attributes (values thereof) to the stage, deleting attributes (values thereof) for the stage, adding additional subtasks to the stage, and/or the like. Accordingly, the create stage module 140 (or other modules) may perform such functionality in a similar fashion as recording values for various attributes to persist a stage in a custom workflow. For example, the create stage module 140 (or other modules) may edit, add, delete, and/or the like attributes (values thereof) for the stage by referencing the Schema table 310 to identify those fields of the Stages table 330 used in storing values for the attributes that need to be edited, added, deleted, and/or the like.

Create Subtask Module

Figure 7:
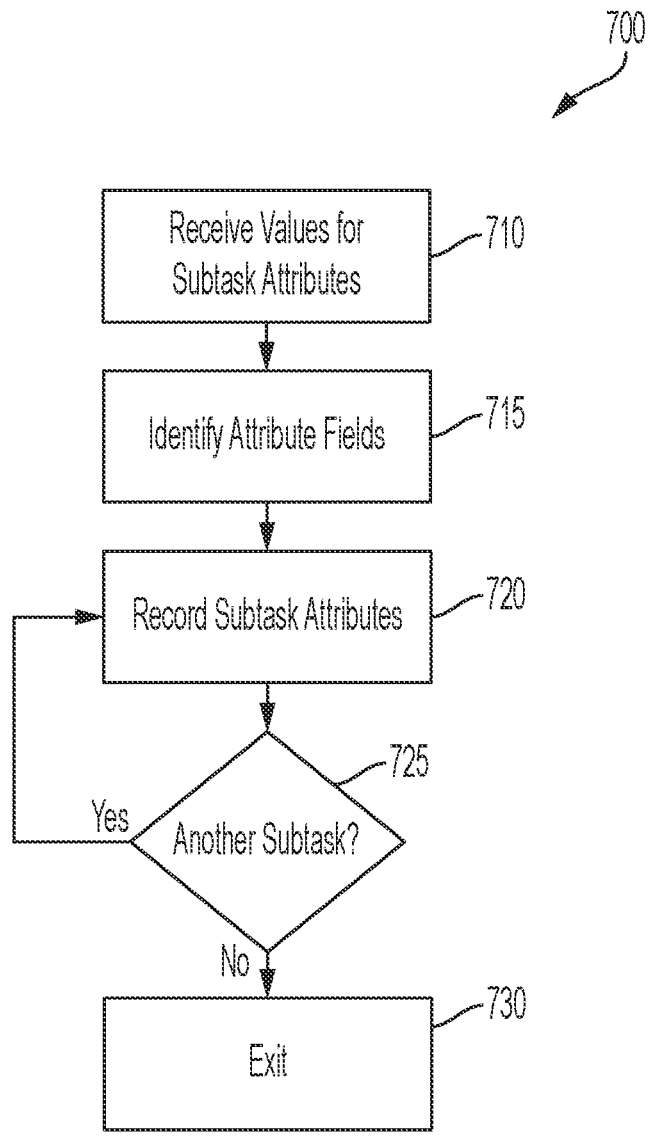
FIG. 7 depicts an example of a process for creating a subtask of a stage in accordance with various aspects of the present disclosure.

Turning now to FIG. 7, additional details are provided regarding a create subtask module 150 used for creating one or more subtasks for a stage found in a custom workflow in accordance with various aspects of the disclosure. As previously noted, the create subtask module 150 according to various aspects is provided as part of a workflow management engine 120. The create subtask module 150 can utilize one or more standardized endpoints to communicate with the subtask component defined within the microservice 115 to store values for various attributes of the subtask(s) in the repository 180 of the microservice 115. Therefore, the flow diagram shown in FIG. 7 may correspond to operations carried out, for example, by computing hardware as described herein, as the computing hardware executes the create subtask module 150.

The process 700 involves the create subtask module 150 receiving value(s) for one or more attributes for each of the subtasks in Operation 710. For example, the values that may be received for each subtask may include a name for the subtask, a description of the stage, an indicator of whether the subtask is required to be performed for the stage, and/or the like. In addition, the create subtask module 150 may receive an identifier for each of the subtasks and/or an identifier for the stage that the subtask(s) are to be associated with for the custom workflow. According to some aspects, the create subtask module 150 may generate the identifier for each of the subtasks.

The create subtask module 150 identifies the fields provided in the Subtasks table 340 that are used in storing the values of the attributes provided by member in Operation 715. Similar to the create workflow module 130 and the create stage module 140, the create subtask module 150 performs this particular operation according to various aspects by referencing mapping data provided in the form of a Schema table 310 that includes records identifying the various attributes that may be defined for a subtask component of a custom workflow and the attributes' corresponding fields in the Subtasks table 340 used in storing values for the attributes. The create subtask module 150 can gain access to the mapping data through using the one or more standardized endpoints to communicate with the subtask component.

The create subtask module 150 queries the Schema table 310 to identify a specific record stored in the Schema table 310 for each attribute of the subtask(s) that a value has been provided for by the member. For example, an attribute identifier (e.g., name of the attribute) and a core component identifier (e.g., "Subtask") may be provided for a particular attribute along with the value for the attribute for each subtask. The create subtask module 150 uses these identifiers in identifying the record stored in the Schema table 310 for the attribute. Once the create subtask module 150 has identified the record in the Schema table 310 that corresponds to the attribute, the create subtask module 150 can then reference the mapping data provided by the record in identifying the field found in the Subtasks table 340 that is used for storing the value for the attribute.

The process 700 continues with the create subtask module 150 storing a record in the Subtasks table 340 for a first one of the subtasks to record the values of the attributes provided by the member for the subtask in Operation 720. Again, the create subtask module 150 may do so by utilizing the one or more standardized endpoints to communicate with the subtask component to store the record in the Subtasks table 340. Accordingly, the create subtask module 150 records the value for each of the attributes in the attribute's corresponding field of the record stored in the Subtasks table 340. In addition, the create subtask module 150 records the identifier for the subtask and the identifier for the stage in the corresponding fields of the record to associate the subtask with the stage of the custom workflow. As a result, the subtask is then persisted in the stage of the custom workflow and defined based on the values provided for the various attributes.

The create subtask module 150 then determines whether another subtask has been provided for the stage in Operation 725. For example, the create subtask module 150 may determine that another identifier for a subtask has been provided along with associated values for other attributes. Therefore, if the create subtask module 150 determines attribute values have been provided for another subtask to include in the stage, then the create subtask module 150 returns to Operation 720 and stores a record in the Subtasks table 340 for the subtask. Once the create subtask module 150 has processed the attribute values for all of the subtasks, the create subtask module 150 exists at Operation 730. As a result, the subtasks that have been define for the stage are now persisted in the repository 180 for the microservice 115 so that the subtasks are available for use with instances generated of the custom workflow.

Although the create subtask module 150 shown in FIG. 7 is configured for creating a subtask for a stage of a custom workflow, the create subtask module 150 may be configured (or other modules may be included) according to various aspects for performing other functionality with respect to a subtask such as editing the attributes (values thereof) defined for the subtask, adding additional attributes (values thereof) to the subtask, deleting attributes (values thereof) for the subtask, and/or the like. Accordingly, the create subtask module 150 (or other modules) may perform such functionality in a similar fashion as recording values for various attributes to persist a subtask in a stage of a custom workflow. For example, the create subtask module 150 (or other modules) may edit, add, delete, and/or the like attributes (values thereof) for the subtask by referencing the Schema table 310 to identify those fields of the Subtasks table 340 used in storing values for the attributes that need to be edited, added, deleted, and/or the like.

Create Rule Module

Figure 8:
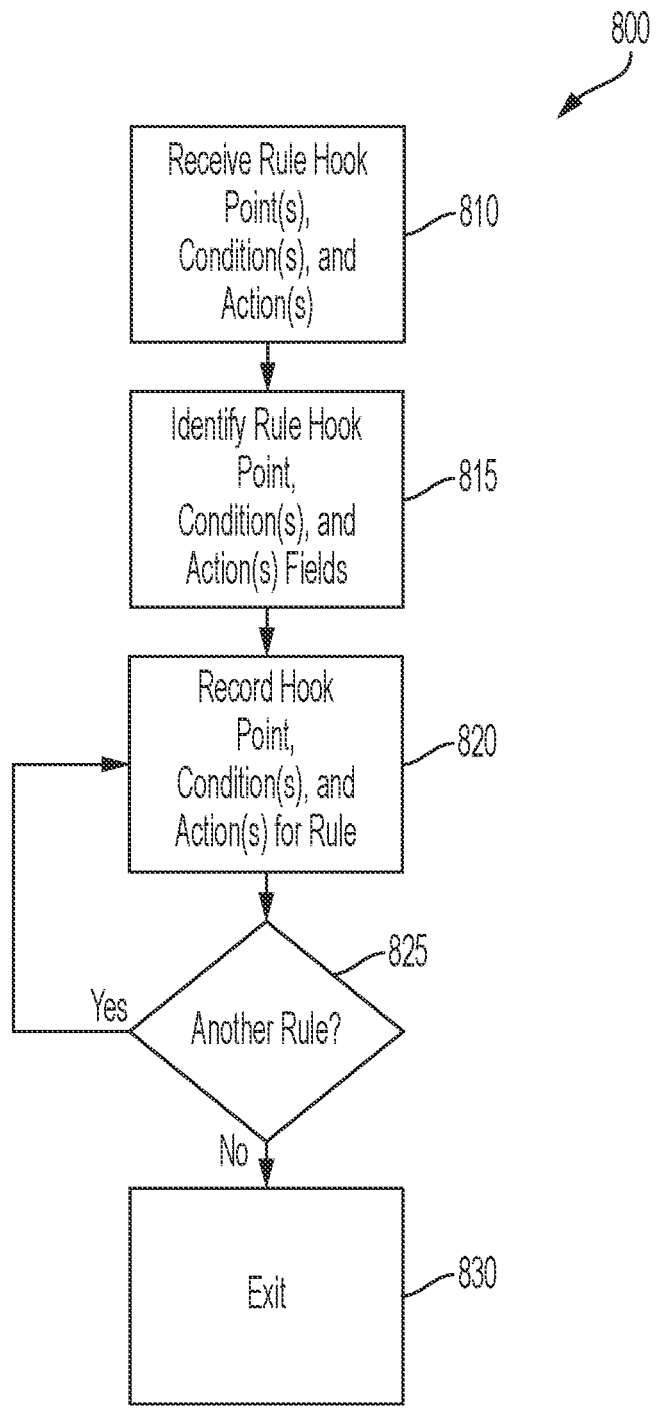
FIG. 8 depicts an example of a process for creating a rule of a custom workflow in accordance with various aspects of the present disclosure.

Turning now to FIG. 8, additional details are provided regarding a create rule module 160 used for creating one or more rules for a custom workflow in accordance with various aspects of the disclosure. As previously noted, the create rule module 160 according to various aspects is provided as part of a workflow management engine 120. The create rule module 160 can utilize one or more standardized endpoints to communicate with the rule component defined within the microservice 115 to store a hook point, one or more conditions, and one or more actions for the rule(s) in the repository 180 of the microservice 115. Therefore, the flow diagram shown in FIG. 8 may correspond to operations carried out, for example, by computing hardware as described herein, as the computing hardware executes the create rule module 160.

The process 700 involves the create rule module 160 receiving an identifier for the hook point, condition(s), and action(s) for each of the rules in Operation 810. In addition, the create rule module 160 may receive an identifier for each of the rules and/or an identifier for the workflow that the rule(s) are to be associated with for the custom workflow. According to some aspects, the create rule module 160 may generate the identifier for each of the rules.

According to various aspects, the identifiers for the hook points may be mapped to particular hook points that are available for use within the custom workflow. The mappings for the identifiers may be provided in a table found within the repository 180. For example, a variety of hook points may be available that may include points such as the beginning and end of a custom workflow, the beginning and end of a stage of the custom workflow, and/or the beginning and end of a subtask of a custom workflow. In addition, hook points may be available that are tied to properties and/or states of the custom workflow. For example, a hook point can be made available that is tied to a particular attribute of a custom workflow, stage, and/or subtask. A specific example may include the status of a custom workflow and/or stage of the custom workflow. Further, hook points may be available that are tied to properties and/or states of a domain object associated with the custom workflow. A specific example, a hook point may be available that is tied to an instance of a domain object representing a particular item or article such as a particular risk.

The create rule module 160 identifies the fields provided in the Rules table 350 that are used in storing the hook point, condition(s), and action(s) for a rule in Operation 815. The create rule module 160 performs this particular operation according to various aspects by referencing mapping data provided in the form of a Schema table 310 that includes records identifying the hook point, conditions, and actions defined for a rule component of a custom workflow and the hook point's, conditions', and rules' corresponding fields in the Rules table 350 used in storing the hook point identifier, conditions, and actions for a rule. The create rule module 160 can gain access to the mapping data through using the one or more standardized endpoints to communicate with the rule component.

The create rule module 160 queries the Schema table 310 to identify a specific record stored in the Schema table 310 for each of the hook point, a condition, and an action. According to particular aspects, the Rules table 350 may include more than one field for storing conditions, as well as more than one field for storing actions. For example, a core component identifier (e.g., "Rule") may be provided along with a hook point identifier for a rule. The create rule module 160 uses the identifier in identifying the record stored in the Schema table 310 for the hook point. Once the create rule module 160 has identified the record in the Schema table 310 that corresponds to the hook point, the create rule module 160 can then reference the mapping data provided by the record in identifying the field found in the Rules table 350 that is used for storing the value for the hook point. The create rule module 160 can do the same for conditions and actions.

The process 800 continues with the create rule module 160 storing a record in the Rules table 350 for a first one of the rules to record the hook point identifier, condition(s), and action(s) provided by the member for the rule in Operation 820. Again, the create rule module 160 may do so by utilizing the one or more standardized endpoints to communicate with the rule component to store the record in the Rules table 350. Accordingly, the create rule module 160 records the hook point identifier, condition(s), and action(s) in their corresponding fields of the record stored in the Rules table 350. In addition, the create rule module 160 records the identifier for the rule and the identifier for the custom workflow in the corresponding fields of the record to associate the rule with the custom workflow. As a result, the rule is then persisted in the custom workflow and defined based on the hook point identifier, condition(s), and action(s) provided.

The create rule module 160 then determines whether another rule has been provided for the custom workflow in Operation 825. For example, the create rule module 160 may determine that another identifier for a rule has been provided along with associated hook point identifier, condition(s), and action(s). Therefore, if the create rule module 160 determines a hook point identifier, condition(s), and action(s) have been provided for another rule to include in the custom workflow, then the create rule module 160 returns to Operation 820 and stores a record in the Rules table 350 for the rule. Once the create rule module 160 has processed the hook point identifiers, condition(s), and action(s) for all of the rules, the create rule module 160 exists at Operation 830. As a result, the rules that have been define for the custom workflow are now persisted in the repository 180 for the microservice 115 so that the rules are evaluated and executed for instances generated of the custom workflow.

Although the create rule module 160 shown in FIG. 8 is configured for creating a rule for a custom workflow, the create rule module 160 may be configured (or other modules may be included) according to various aspects for performing other functionality with respect to a rule such as editing the hook point, condition(s), and/or action(s) defined for the rule, adding additional condition(s) and/or action(s) to the rule, deleting condition(s) and/or action(s) for the rule, and/or the like. Accordingly, the create rule module 160 (or other modules) may perform such functionality in a similar fashion as recording the hook point identifier, condition(s), and action(s) to persist a rule in a custom workflow. For example, the create rule module 160 (or other modules) may edit, add, delete, and/or the like the hook point identifier, condition(s), and/or action(s) for the rule by referencing the Schema table 310 to identify those fields of the Rules table 350 used in storing the hook point identifier, condition(s), and/or action(s) that need to be edited, added, deleted, and/or the like.

Publish Workflow Module

Figure 9:
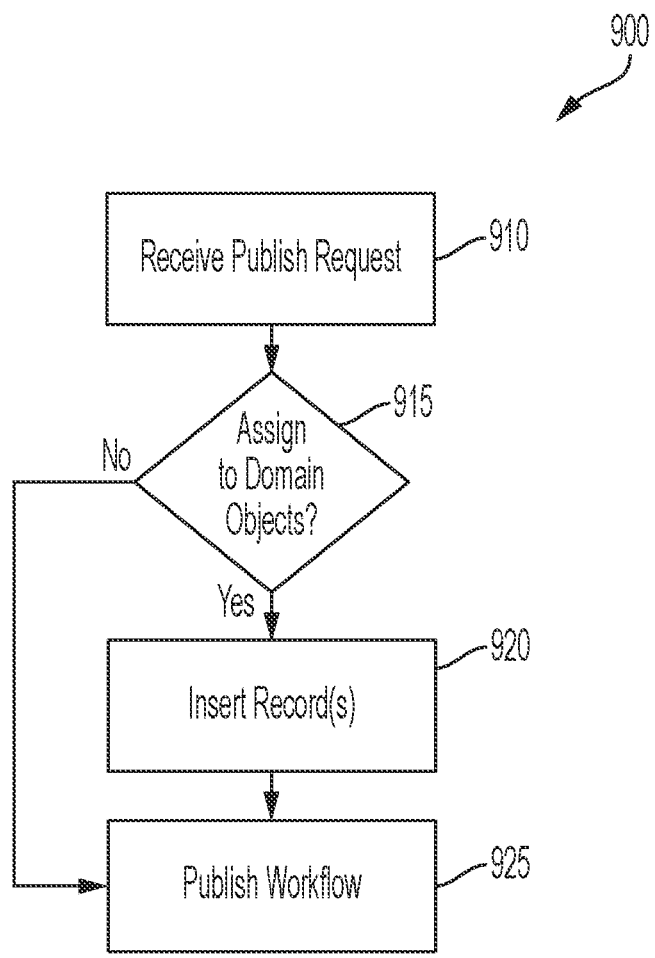
FIG. 9 depicts an example of a process for publishing a custom workflow in accordance with various aspects of the present disclosure.

Turning now to FIG. 9, additional details are provided regarding a publish workflow module 170 used for publishing a custom workflow and assigning the custom workflow to a domain object in accordance with various aspects of the disclosure. As previously noted, the publish workflow module 170 according to various aspects is provided as part of a workflow management engine 120. and the publish workflow module can utilize one or more standardized endpoints to publish the custom workflow and assign the custom workflow to a domain object of the microservice 115 by updating a status attribute for the custom workflow and storing a record mapping the custom workflow to the domain object in the repository 180 of the microservice 115. Therefore, the flow diagram shown in FIG. 9 may correspond to operations carried out, for example, by computing hardware as described herein, as the computing hardware executes the publish workflow module 170.

The process 900 involves the publish workflow module 170 receiving a request to publish the custom workflow in Operation 910. The request may include an identifier for the custom workflow, as well as one or more identifiers for domain objects that are to be associated with the custom workflow. The publish workflow module 170 determines whether the custom workflow is to be assigned to one or more domain objects in Operation 915. For example, the publish workflow module 170 determines whether any domain object identifiers have been provided in the request.

If the publish workflow module 170 determines the custom workflow is to be assigned to one or more domain objects, then the publish workflow module 170 stores a record for each of the domain objects in the Workflow Assignment table 360 in Operation 920. Here, the publish workflow module 170 can utilize the one or more standardized endpoints to gain access to mapping data to identify the Workflow Assignment table 360 and corresponding fields of the table 360. Each record includes the custom workflow identifier for the custom workflow and the domain object identifier for the domain object. Therefore, the record maps the custom workflow to the domain object.

The publish workflow module 170 then publishes the custom workflow in Operation 925 by updating the status of the custom workflow. For example, the publish workflow module 170 according to various aspects updates the "Status" attribute of the custom workflow in the Workflows table 320 to "Published." Here, the publish workflow module 170 queries the records stored in the Workflows table 320 based on the custom workflow identifier and once the record has been identified, the publish workflow module 170 updates the "Status" field for the record to "Published." As a result, the custom workflow is now available in the microservice 115 for use and if assigned to one or more domain objects, instances of the custom workflow become available for instances generated of the one or more domain objects.

Although the publish workflow module 170 shown in FIG. 9 is configured for publishing a custom workflow and assigning domain objects to the custom workflow, the publish workflow module 170 may be configured (or other modules may be included) according to various aspects for performing other functionality with respect to a custom workflow such as setting the status of the custom workflow to something other than published (e.g., "ARCHIVE"), unassigning domain objects to the custom workflow, and/or the like. For example, the publish workflow module 170 (or other modules) may perform such functionality in a similar fashion as publishing a custom workflow and assigning domain objects to the custom workflow.

Examples of Graphical User Interfaces

As previously noted, custom workflows may use various user interfaces (e.g., graphical user interfaces or GUIs) 125 to manage custom workflows and their associated stages, subtasks, and rules. FIG. 10 illustrates an example of an interface 1000 for managing one or more workflows. The interface 1000 includes a listing of custom workflows 1010 and various respective attributes for such workflows. For example, the workflow "Default Rejecting" 1015 may have a current status of "Archived" 1020, a last updated status of "Vendor Rules" 1025, a last modified date of "Sep. 23, 2020" 1030, and a creation date of "Nov. 22, 2019" 1035. In addition, the interface 1000 provides a user-selectable button 1040 for creating a new custom workflow.

Figure 11:
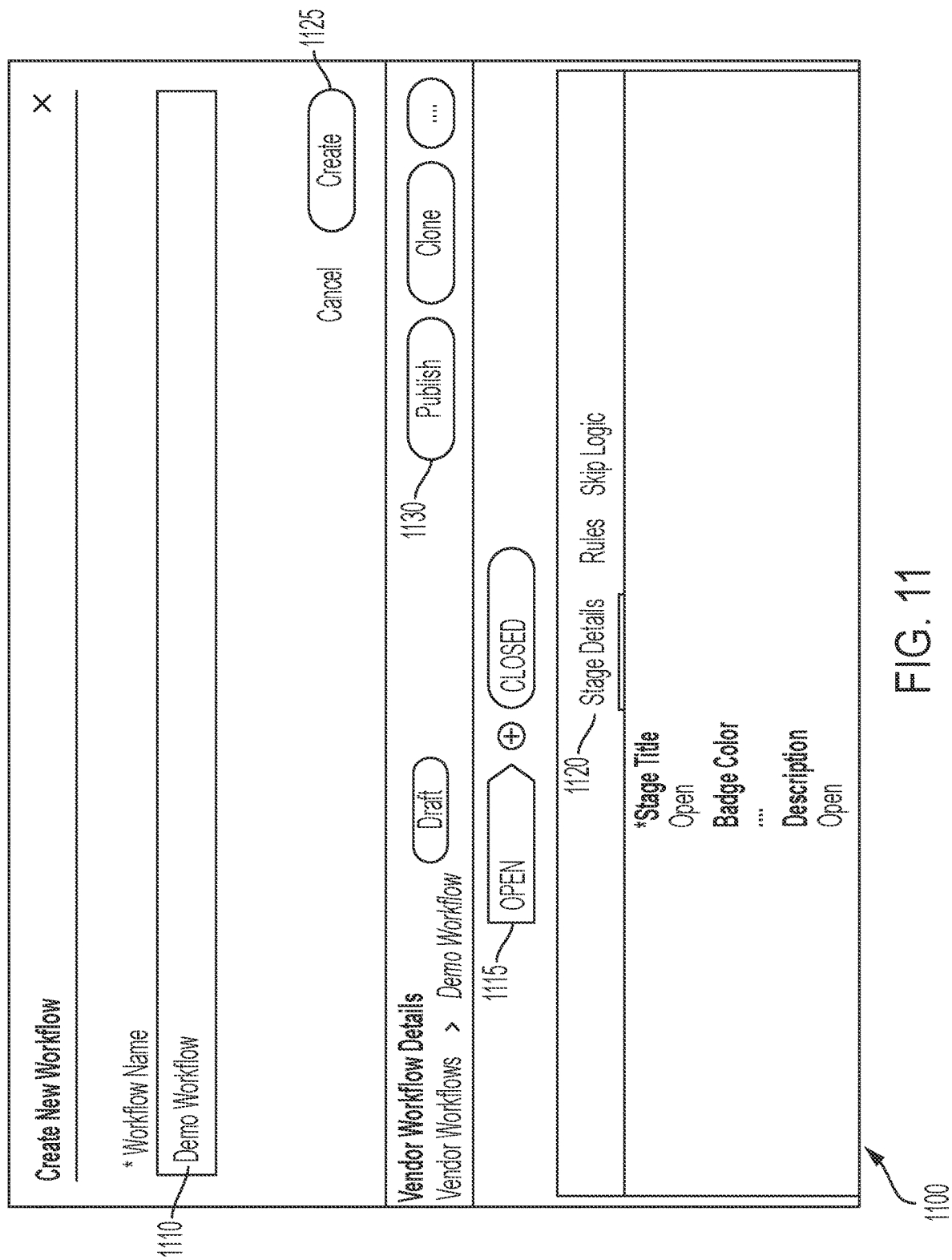
FIG. 11 depicts another example of a graphical user interface that may be used in accordance with various aspects of the present disclosure.

FIG. 11 illustrates an example of an interface 1100 that a custom workflow can use for creating and/or configuring a custom workflow. The interface 1100 allows a user (e.g., team member) to specify various attributes of the custom workflow, such as the workflow name ("Demo Workflow") 1110. The interface 1100 may also present workflow stages such as "OPEN" 1115 and various other details, such as the stage's details 1120. The interface 1100 includes a first button 1125 that can be selected by the user to create the custom workflow in the microservice 115. For example, selection of the first button 1125 may invoke (execute) the create workflow module 130 as previously discussed. In addition, the interface includes a second button 1130 that can be selected by the user to publish the custom workflow. For example, selection of the second button 1130 may invoke (execute) the publish workflow module 170 as previously discussed.

Figure 12:
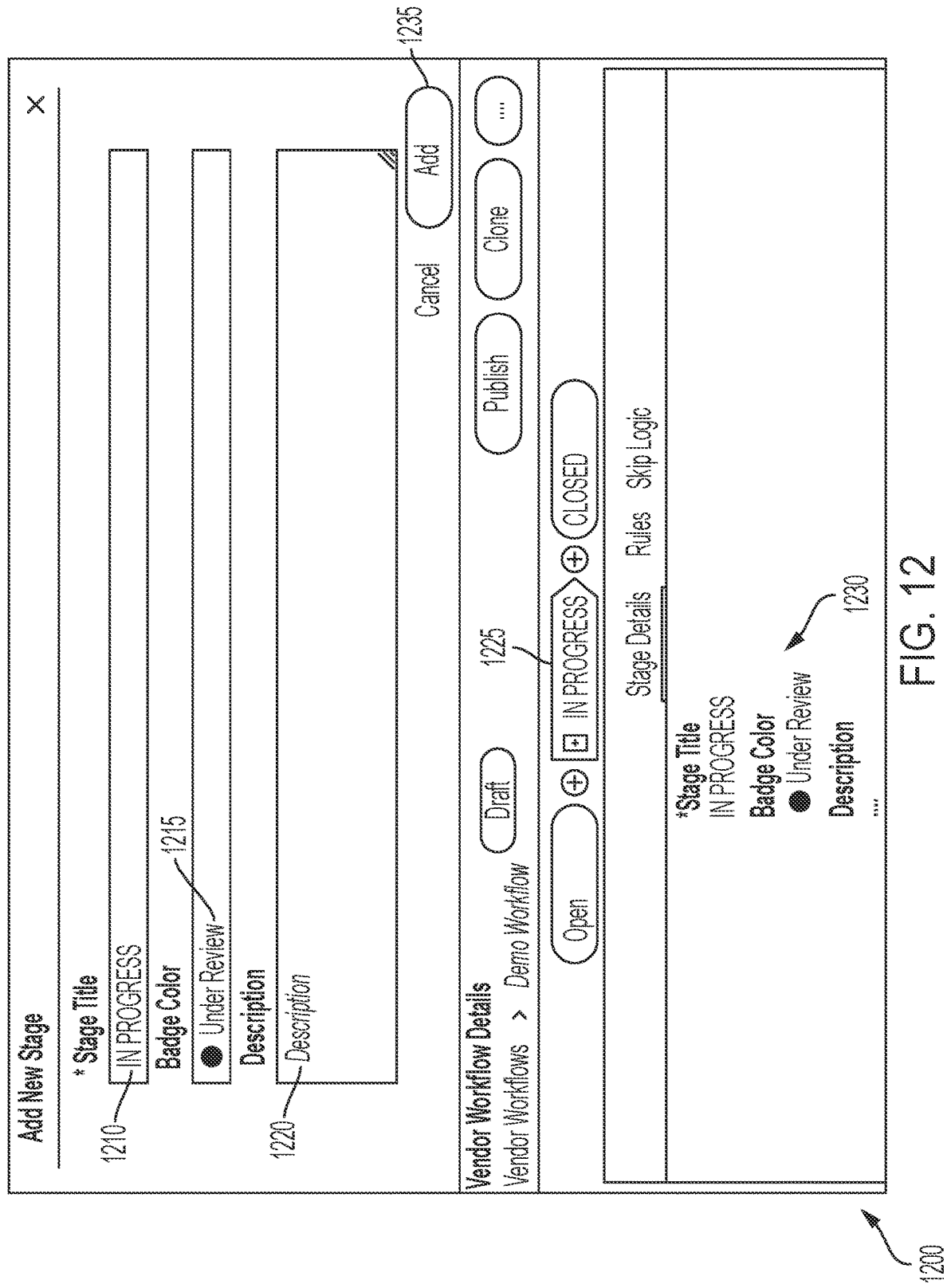
FIG. 12 depicts another example of a graphical user interface that may be used in accordance with various aspects of the present disclosure.

FIG. 12 illustrates an example of an interface 1200 that can be used for creating and/or configuring a stage of a custom workflow. The interface 1200 allows a user to specify various attributes of the workflow stage, such as a workflow stage name ("IN PROGRESS") 1210, a workflow stage status ("Under Review") 1215, and a workflow stage description 1220. The interface 1200 also show a position of the stage ("IN PROGRESS") 1225 in the custom workflow, as well as the stage details 1230 for the stage. In addition, the interface 1200 includes a button 1235 to allow the user to add the stage to the custom workflow. For example, selection of the button 1235 may invoke (execute) the create stage module 140 previously discussed. A similar type of interface may be provided for configuring a subtask for the stage.

Figure 13:
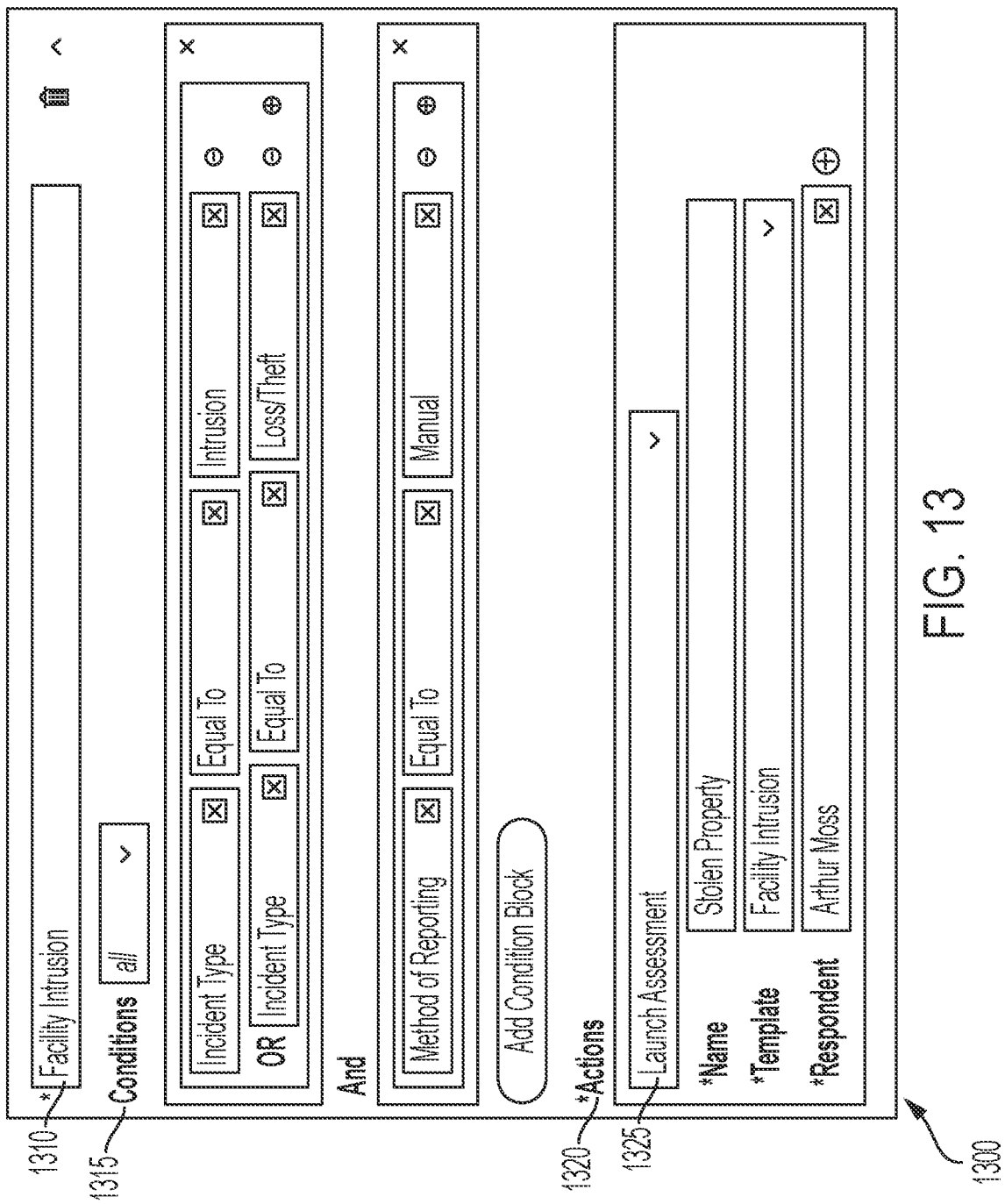
FIG. 13 depicts another example of a graphical user interface that may be used in accordance with various aspects of the present disclosure.

FIG. 13 illustrates an example of an interface 1300 that a custom workflow can use for creating and/or configuring a rule for a custom workflow. For example, a user may navigate to a particular hook point available in the custom workflow configuration and invoke the interface 1300. The interface 1300 provides a name "Facility Intrusion" 1310 for the rule. In addition, the interface 1300 allows a user to specify the conditions 1315 and actions 1320 for the rule. Here, the particular rule shown in FIG. 13 includes an action 1325 to cause an assessment to be launched (sent) when the conditions 1315 for the rule are met. Once the user has identified (set) the conditions 1315 and actions 1320 for the rule, the user may create the rule, for example, by invoking (executing) the create rule module 160 previously discussed.

Figure 14:
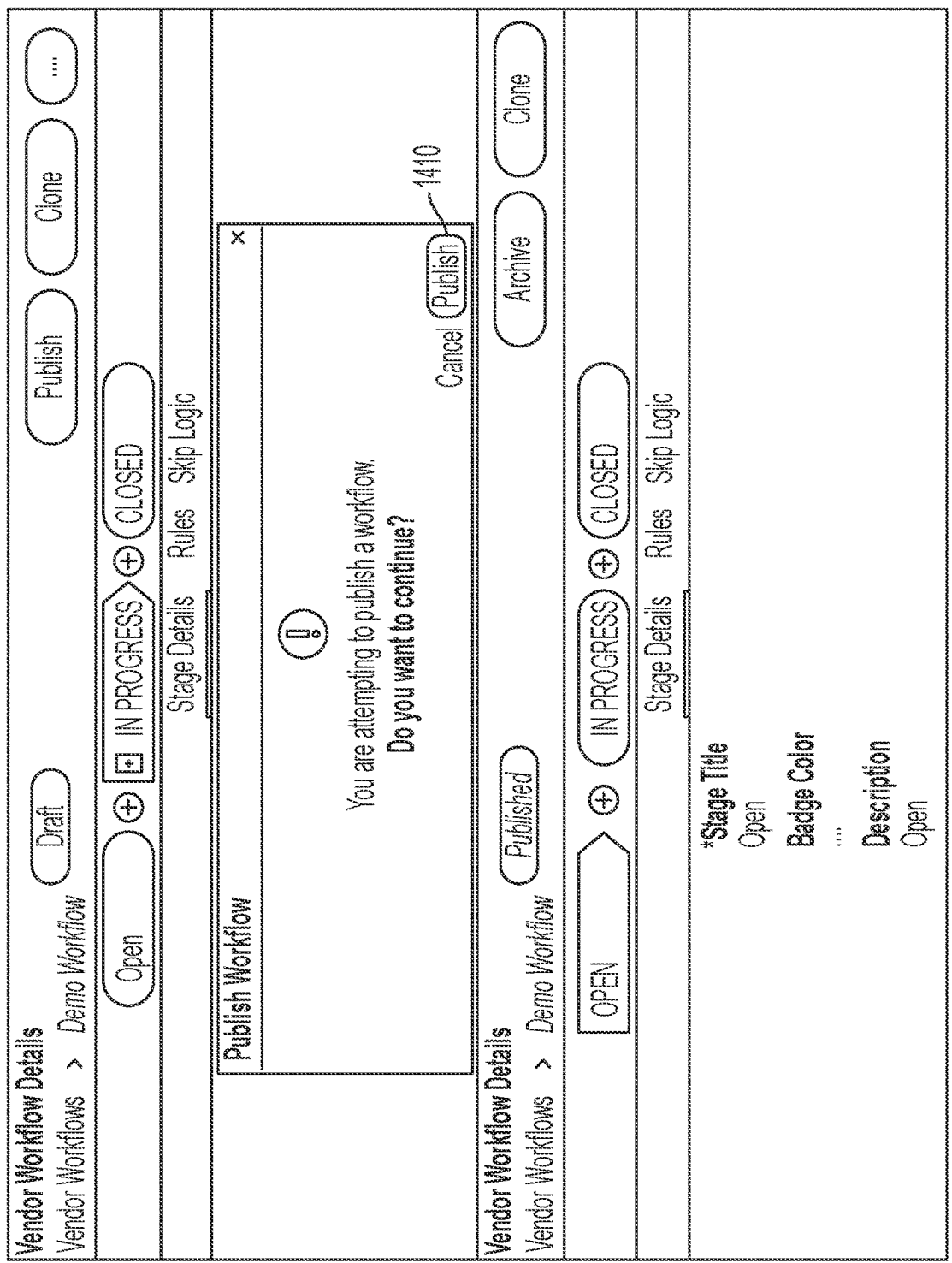
FIG. 14 depicts another example of a graphical user interface that may be used in accordance with various aspects of the present disclosure.

FIG. 14 illustrates an example of an interface 1400 that can be used for publishing a custom workflow. The interface 1400 presents various attributes of the custom workflow and associated stages and allows the user to "publish" the custom workflow. For example, selection of the "publish" button 1410 may invoke (execute) the publish workflow module 170 previously discussed. According to various aspects, once the custom workflow is "published," it becomes available in the microservice 115 and for use by one or more services.

Figure 15:
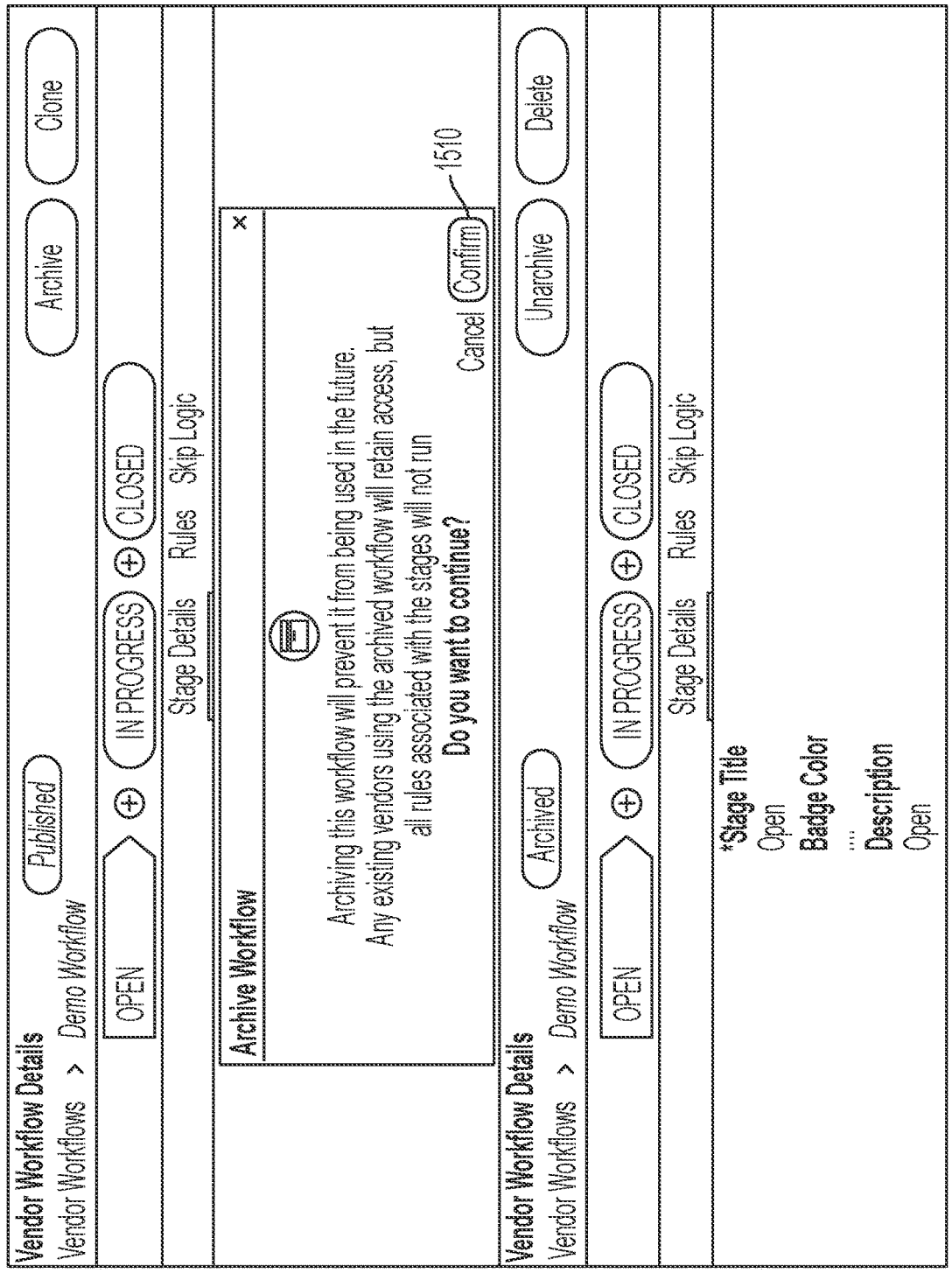
FIG. 15 depicts another example of a graphical user interface that may be used in accordance with various aspects of the present disclosure.

FIG. 15 illustrates an example of an interface 1500 that can be used for archiving a custom workflow. The interface 1500 may present various attributes of the custom workflow and associated stages and allows the user to "archive" the workflow. For example, the user may select the "confirm" button 1510 to archive the custom workflow. According to various aspects, once a custom workflow is "archived," it is no longer available in the microservice 115 and for use by the one or more services. In addition, the various stages and/or subtasks associated with the particular custom workflow may be disabled or otherwise prevented from executing.

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

According to various aspects, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to various aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of aspects, retrieval, loading, and/or execution may be performed in parallel such that multiple instructions are retrieved, loaded, and/or executed together.

Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 16:
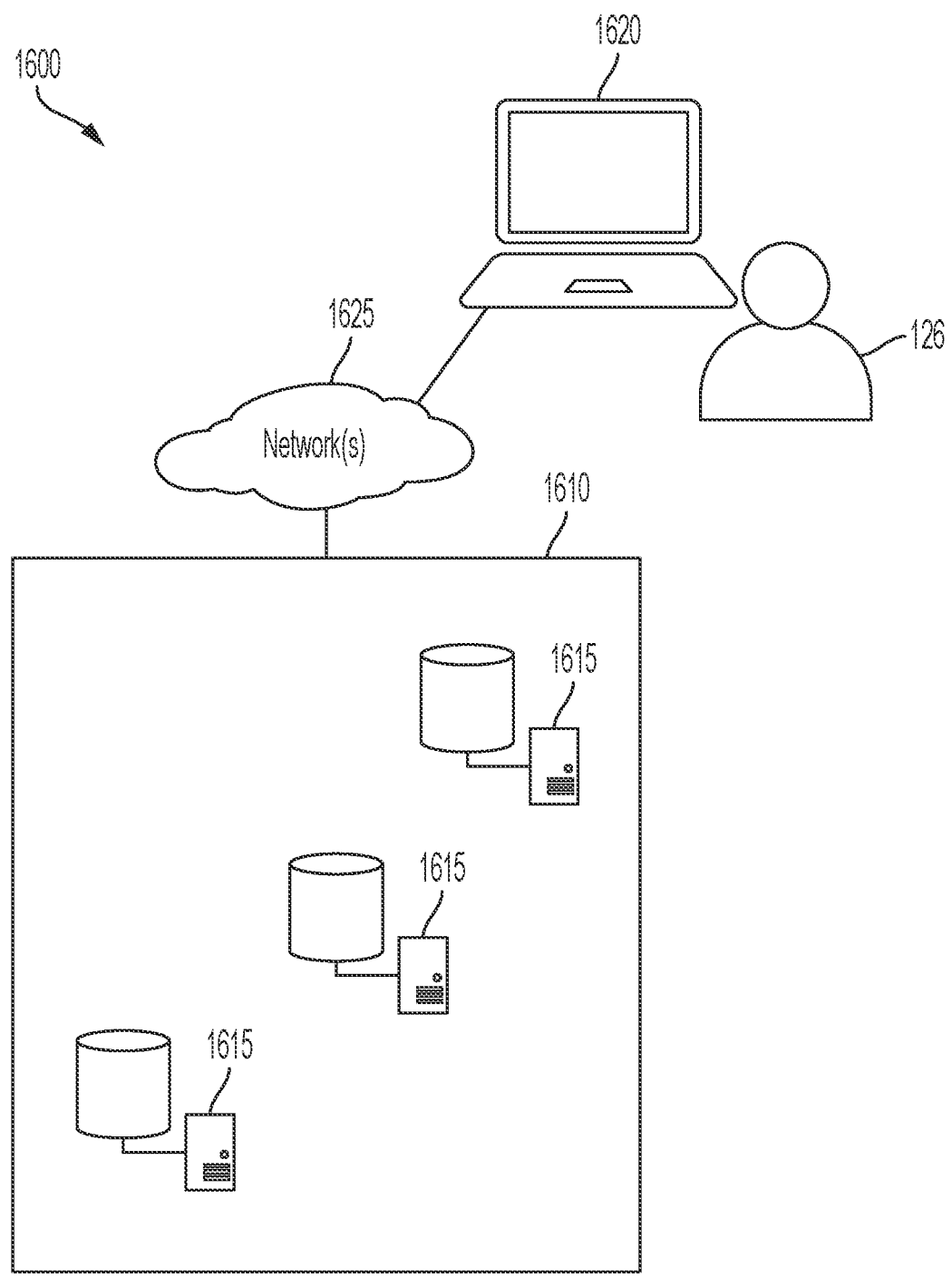
FIG. 16 depicts an example of a system architecture that may be used in accordance with various aspects of the present disclosure.

FIG. 16 depicts a system architecture 1600 that can execute implementations of various aspects of the present disclosure. The architecture 1600 includes one or more team computing systems 1620, a server system 1610, and one or more networks 1625. The server system 1610 includes one or more server devices 1615. According to various aspects, team members 126 can use a team computing system 1620 to interact, via one or more user interfaces 125, with one or more microservices 115 used in implementing an enterprise software application that is hosted by the server system 1610. For example, the team computing system 1620 can include any appropriate type of computing device such as a desktop computer, a laptop computer, a handheld computer, a tablet computer, a network appliance, a smart phone, and/or the like. Here, the team computing system 1620 can communicate with one or more of the server devices 1615 over the network(s) 1625. For example, the network(s) 1625 can include one or more of a large computer network, such as a local area network (LAN), a wide area network (WAN), the Internet, a cellular network, a telephone network (e.g., PSTN) or an appropriate combination thereof.

According to various aspects, each server device 1615 may include at least one server and at least one data store. Here, the server devices 1615 may represent various forms of servers including, but not limited to a web server, an application server, a proxy server, a network server, and/or a server pool. In general, the server system 1610 accepts requests from team member devices (e.g., the team computing system 1620) with respect to implementing and/or managing functionality associated with application services (microservices 115 thereof) over the network(s) 1625.

According to various aspects, the server system 1610 can provide a cloud infrastructure to host one more microservice-based applications (e.g., microservices 115 provided as one or more computer-executable programs executed by one or more server devices 1615). In some examples, computing resources of the server system 1610 can be provisioned based on modelling of network traffic associated with use of the one or more microservices 115. Accordingly, the microservices 115 may be designed to communicate using communication methods and protocols, such as lightweight RESTful APIs (i.e., application programming interfaces (API) implemented using representational state transfer (REST) architectures). For example, the API may be implemented as a REST API, which may be accessed using the hypertext transfer protocol (HTTP), in a manner similar to a standard web page. However, any suitable communication protocol may be used.

Example Computing Hardware

Figure 17:
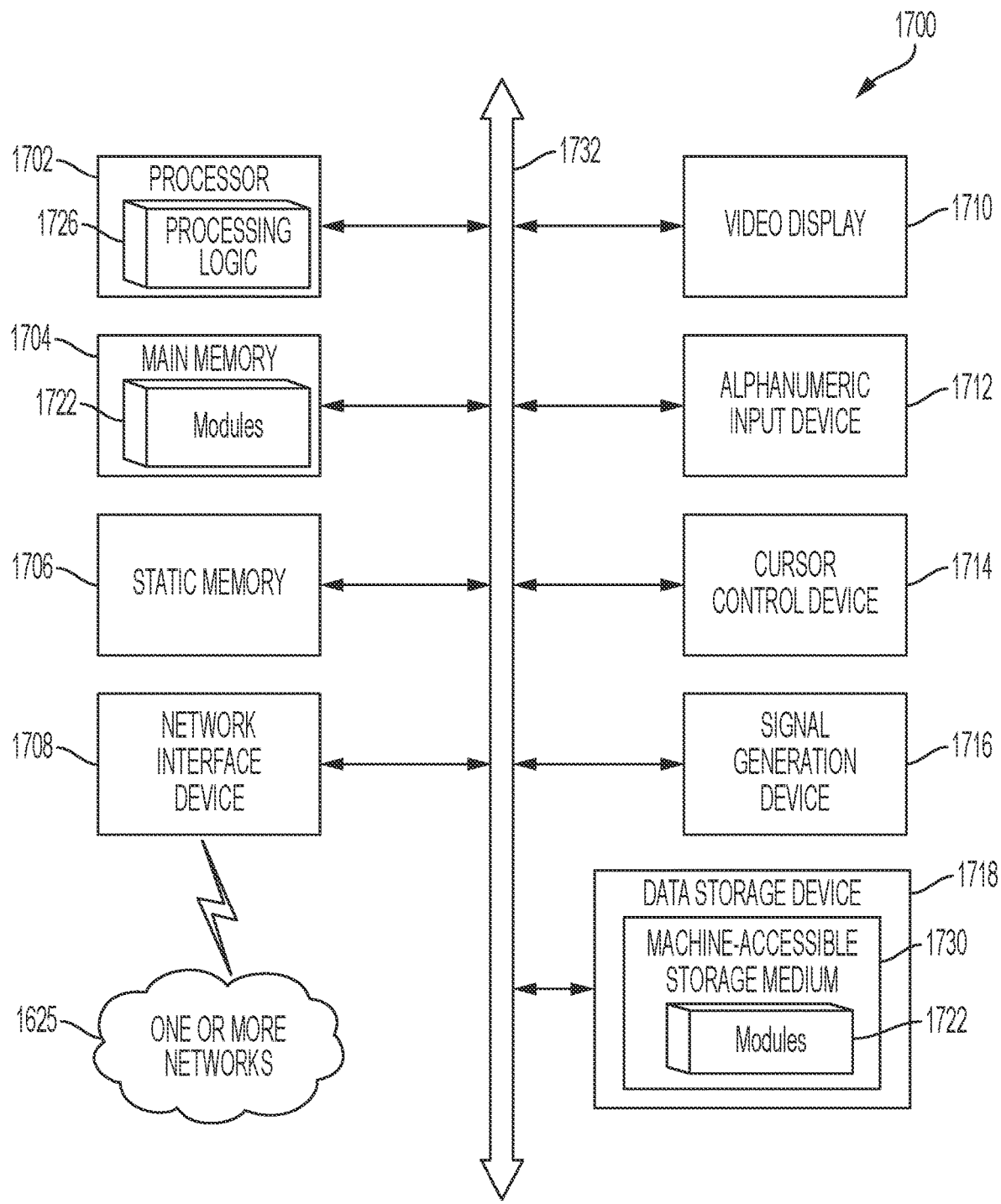
FIG. 17 depicts an example of a computing entity that may be used in accordance with various aspects of the present disclosure.

FIG. 17 illustrates a diagrammatic representation of a computing hardware device 1700 that may be used in accordance with various aspects of the disclosure. For example, the hardware device 1700 may be computing hardware such as a server that is part of a server device 1615 as described in FIG. 16. According to particular aspects, the hardware device 1700 may be connected (e.g., networked) to one or more other computing entities, storage devices, and/or the like via one or more networks such as, for example, a LAN, an intranet, an extranet, and/or the Internet. As noted above, the hardware device 1700 may operate in the capacity of a server and/or a client device in a client-server network environment, or as a peer computing device in a peer-to-peer (or distributed) network environment. According to various aspects, the hardware device 1700 may be a personal computer (PC), a tablet PC, a web appliance, a server, a network router, a switch or bridge, or any other device capable of executing a set of instructions (sequential or otherwise) that specify actions to be taken by that device. Further, while only a single hardware device 1700 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 1700 includes a processor 1702, a main memory 1704 (e.g., read-only memory (ROM), flash memory, dynamic random-access memory (DRAM) such as synchronous DRAM (SDRAM), Rambus DRAM (RDRAM), and/or the like), a static memory 1706 (e.g., flash memory, static random-access memory (SRAM), and/or the like), and a data storage device 1718, that communicate with each other via a bus 1732.

The processor 1702 may represent one or more general-purpose processing devices such as a microprocessor, a central processing unit, and/or the like. According to some aspects, the processor 1702 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 1702 may be one or more special-purpose processing devices such as an application specific integrated circuit (ASIC), a field programmable gate array (FPGA), a digital signal processor (DSP), network processor, and/or the like. The processor 1702 can execute processing logic 1726 for performing various operations and/or steps described herein.

The hardware device 1700 may further include a network interface device 1708, as well as a video display unit 1710 (e.g., a liquid crystal display (LCD), a cathode ray tube (CRT), and/or the like), an alphanumeric input device 1712 (e.g., a keyboard), a cursor control device 1714 (e.g., a mouse, a trackpad), and/or a signal generation device 1716 (e.g., a speaker). The hardware device 1700 may further include a data storage device 1718. The data storage device 1718 may include a non-transitory computer-readable storage medium 1730 (also known as a non-transitory computer-readable storage medium or a non-transitory computer-readable medium) on which is stored one or more modules 1722 (e.g., sets of software instructions) embodying any one or more of the methodologies or functions described herein. For instance, according to particular aspects, the modules 1722 include a create workflow module 130, create stage module 140, create subtask module 150, create rule module 160, and/or publish workflow module 170 that are part of a workflow management engine 120 as described herein. The one or more modules 1722 may also reside, completely or at least partially, within main memory 1704 and/or within the processor 1702 during execution thereof by the hardware device 1700—main memory 1704 and processor 1702 also constituting computer-accessible storage media. The one or more modules 1722 may further be transmitted or received over a network 1625 via the network interface device 1708.

While the computer-readable storage medium 1730 is shown to be a single medium, the terms "computer-readable storage medium" and "machine-accessible storage medium"

should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 1700 and that causes the hardware device 1700 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

CONCLUSION

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

What is claimed is:

1. A method comprising:
receiving, via a graphical user interface communicating with at least one endpoint that is available through a microservice, a first plurality of attribute values for a custom workflow to include in the microservice, wherein each attribute value of the first plurality of attribute values corresponds to a corresponding attribute of a first plurality of attributes defined for a workflow component that is available through the microservice;
accessing, by computing hardware and from a schema table defined in a repository for the microservice, mapping data for an attribute of the first plurality of attributes;
identifying, by the computing hardware and based on the mapping data for the attribute of the first plurality of attributes, a corresponding field of a workflows table mapped to the attribute of the first plurality of attributes, wherein the workflows table is defined in the repository for the workflow component;
storing, by the computing hardware, a first record in the workflows table for the custom workflow, wherein an attribute value of the first plurality of attribute values is stored for the first record in the corresponding field mapped to the attribute of the first plurality of attributes;
receiving, via the graphical user interface communicating with the at least one endpoint that is available through the microservice, a second plurality of attribute values for a first stage to include in the custom workflow, wherein each attribute value of the second plurality of attribute values corresponds to a corresponding attribute of a second plurality of attributes defined for a stage component that is available through the microservice;
accessing, by the computing hardware and from the schema table, mapping data for an attribute of the second plurality of attributes;
identifying, by the computing hardware and based on the mapping data for the attribute of the second plurality of attributes, a corresponding field of a stages table mapped to the attribute of the second plurality of attributes, wherein the stages table is defined in the repository for the stage component; and
storing, by the computing hardware, a first record in the stages table for the first stage to include in the custom workflow, wherein an attribute value of the second plurality of attribute values is stored for the first record in the corresponding field mapped to the attribute of the second plurality of attributes, and storing the first record in the workflows table for the custom workflow and the first record in the stages table for the first stage persists the custom workflow in the microservice.

2. The method of claim 1 further comprising:
receiving, via the graphical user interface communicating with the at least one endpoint that is available through the microservice, a third plurality of attribute values for a second stage to include in the custom workflow, wherein each attribute value of the third plurality of attribute values corresponds to a corresponding attribute of the second plurality of attributes;

identifying, by the computing hardware and based on the mapping data for the attribute of the second plurality of attributes, the corresponding field of the stages table mapped to the attribute of the second plurality of attributes; and storing, by the computing hardware, a second record in the stages table for the second stage to include in the custom workflow, wherein an attribute value of the third plurality of attribute values is stored for the second record in the corresponding field mapped to the attribute of the second plurality of attributes.

3. The method of claim 1 further comprising:

receiving, via the graphical user interface communicating with the at least one endpoint that is available through the microservice, a third plurality of attribute values for a first subtask to include in the first stage of the custom workflow, wherein each attribute value of the third plurality of attribute values corresponds to a corresponding attribute of a third plurality of attributes defined for a subtask component that is available through the microservice;

accessing, by the computing hardware and from the schema table, mapping data for an attribute of the third plurality of attributes;

identifying, by the computing hardware and based on the mapping data for the attribute of the third plurality of attributes, a corresponding field of a subtasks table mapped to the attribute of the third plurality of attributes, wherein the subtasks table is defined in the repository for the subtask component; and storing, by the computing hardware, a first record in the subtasks table for the first subtask to include in the first stage of the custom workflow, wherein an attribute value of the third plurality of attribute values is stored for the first record in the corresponding field mapped to the attribute of the third plurality of attributes.

4. The method of claim 3 further comprising:

receiving, via the graphical user interface communicating with the at least one endpoint that is available through the microservice, a fourth plurality of attribute values for a second subtask to include in the first stage of the custom workflow, wherein each attribute value of the fourth plurality of attribute values corresponds to a corresponding attribute of the third plurality of attributes;

accessing, by the computing hardware and from the schema table, the mapping data for an attribute of the third plurality of attributes;

identifying, by the computing hardware and based on the mapping data for the attribute of the third plurality of attributes, the corresponding field of the subtasks table mapped to the attribute of the third plurality of attributes; and storing, by the computing hardware, a second record in the subtasks table for the second subtask to include in the first stage of the custom workflow, wherein an attribute value of the fourth plurality of attribute values is stored for the second record in the corresponding field mapped to the attribute of the third plurality of attributes.

5. The method of claim 1 further comprising:

receiving, via the graphical user interface communicating with the at least one endpoint that is available through the microservice, a condition and an action for a first rule to include in the first stage of the custom workflow, wherein the condition corresponds to a first attribute defined for a rule component and the action corresponds to a second attribute defined for the rule component that is available through the microservice;

for the condition:
identifying, by the computing hardware and based on an identifier for the first attribute, a third record stored in the schema table for the first attribute; and identifying, by the computing hardware and based on mapping data stored in the third record of the schema table, a first field of a rules table mapped to the first attribute, wherein the rules table is defined in the repository for the rule component;

for the action:
identifying, by the computing hardware and based on an identifier for the second attribute, a fourth record stored in the schema table for the second attribute; and identifying, by the computing hardware and based on mapping data stored in the fourth record of the schema table, a second field of the rules table mapped to the second attribute; and storing, by the computing hardware, a first record in the rules table for the first rule to include in the first stage of the custom workflow, wherein the condition and the action are stored for the first record in the first field and the second field, respectively.

6. The method of claim 1 further comprising:

receiving, via the graphical user interface, an identifier for a domain object defined within the microservice and an identifier for the custom workflow; and storing, by the computing hardware, a record in a workflow assignment table defined in the repository for the microservice, the record comprising mapping data that maps the domain object to the custom workflow, wherein storing the record in the workflow assignment table results in the custom workflow being made available for use with an instance generated of the domain object.

7. The method of claim 6, wherein the custom workflow being made available to the instance comprises allowing a user, through a second graphical user interface, to define properties for the first stage of the custom workflow that are applicable to the instance of the domain object.

8. A system comprising:

a non-transitory computer-readable medium storing instructions; and a processing device communicatively coupled to the non-transitory computer-readable medium, wherein, the processing device is configured to execute the instructions and thereby perform operations comprising:

receiving, via a graphical user interface communicating with at least one endpoint that is available through a microservice, a first plurality of attribute values defined for a custom workflow to include in the microservice, wherein each attribute value of the first plurality of attribute values corresponds to a corresponding attribute of a first plurality of attributes defined for a workflow component that is available through the microservice;

for each attribute value of the first plurality of attribute values:
identifying, based on an identifier for the corresponding attribute of the first plurality of attributes, a first record stored in a schema table for the corresponding attribute of the first plurality of attributes, wherein the schema table is defined in a repository for the microservice; and identifying, based on mapping data stored in the first record of the schema table, a corresponding field of a workflows table mapped to the corresponding attribute of the first plurality of attributes, wherein the workflows table is defined in the repository for the workflow component;

storing a first record in the workflows table for the custom workflow, wherein each of the first plurality of attribute values is stored for the first record in the corresponding field mapped to the corresponding attribute of the first plurality of attributes;

receiving, via the graphical user interface communicating with the at least one endpoint that is available through the microservice, a second plurality of attribute values for a first stage to include in the custom workflow, wherein each attribute value of the second plurality of attribute values corresponds to a corresponding attribute of a second plurality of attributes defined for a stage component that is available through the microservice;

for each attribute value of the second plurality of attribute values:
identifying, based on an identifier for the corresponding attribute of the second plurality of attributes, a second record stored in the schema table for the corresponding attribute of the second plurality of attributes; and
identifying, based on mapping data stored in the second record of the schema table, a corresponding field of a stages table mapped to the corresponding attribute of the second plurality of attributes, wherein the stages table is defined in the repository for the stage component; and storing a first record in the stages table for the first stage to include in the custom workflow, wherein each of the second plurality of attribute values is stored for the first record in the corresponding field mapped to the corresponding attribute of the second plurality of attributes, and storing the first plurality of attribute values and the second plurality of attribute values persists the custom workflow in the microservice.

9. The system of claim 8, wherein the operations further comprise:
receiving, via the graphical user interface communicating with the at least one endpoint that is available through the microservice, a third plurality of attribute values for a second stage to include in the custom workflow, wherein each attribute value of the third plurality of attribute values corresponds to a corresponding attribute of the second plurality of attributes;

for each attribute value of the third plurality of attribute values:
identifying, based on the identifier for the corresponding attribute of the second plurality of attributes, the second record stored in the schema table for the corresponding attribute of the second plurality of attributes; and
identifying, based on the mapping data stored in the second record of the schema table, the corresponding field of the stages table mapped to the corresponding attribute of the second plurality of attributes; and storing a second record in the stages table for the second stage to include in the custom workflow, wherein each of the third plurality of attribute values is stored for the second record in the corresponding field mapped to the corresponding attribute of the second plurality of attributes and a particular attribute value of the third plurality of attribute values identifies a position in a sequence of the second stage to include in the custom workflow with respect to the first stage to include in the custom workflow.

10. The system of claim 8, wherein the operations further comprise:
receiving, via the graphical user interface communicating with the at least one endpoint that is available through the microservice, a third plurality of attribute values for a first subtask to include in the first stage of the custom workflow, wherein each attribute value of the third plurality of attribute values corresponds to a corresponding attribute of a third plurality of attributes defined for a subtask component that is available through the microservice;

for each attribute value of the third plurality of attribute values:
identifying, based on an identifier for the corresponding attribute of the third plurality of attributes, a third record stored in the schema table for the corresponding attribute of the third plurality of attributes; and
identifying, based on mapping data stored in the third record of the schema table, a corresponding field of a subtasks table mapped to the corresponding attribute of the third plurality of attributes, wherein the subtasks table is defined in the repository for the subtask component; and storing a first record in the subtasks table for the first subtask to include in the first stage of the custom workflow, wherein each of the third plurality of attribute values is stored for the first record in the corresponding field mapped to the corresponding attribute of the third plurality of attributes.

11. The system of claim 10, wherein the operations further comprise:
receiving, via the graphical user interface communicating with the at least one endpoint that is available through the microservice, a fourth plurality of attribute values for a second subtask to include in the first stage of the custom workflow, wherein each attribute value of the fourth plurality of attribute values corresponds to a corresponding attribute of the third plurality of attributes;

for each attribute value of the fourth plurality of attribute values:
identifying, based on the identifier for the corresponding attribute of the third plurality of attributes, the third record stored in the schema table for the corresponding attribute of the third plurality of attributes; and
identifying, based on the mapping data stored in the third record of the schema table, the corresponding field of the subtasks table mapped to the corresponding attribute of the third plurality of attributes; and storing a second record in the subtasks table for the second subtask to include in the first stage of the custom workflow, wherein each of the fourth plurality of attribute values is stored for the second record in the corresponding field mapped to the corresponding attribute of the third plurality of attributes.

12. The system of claim 8, wherein the operations further comprise:
receiving, via the graphical user interface communicating with the at least one endpoint that is available through the microservice, a condition and an action for a first rule to include in the first stage of the custom workflow, wherein the condition corresponds to a first attribute defined for a rule component and the action corresponds to a second attribute defined for the rule component that is available through the microservice;

for the condition:
- identifying, based on an identifier for the first attribute, a third record stored in the schema table for the first attribute; and
- identifying, based on mapping data stored in the third record of the schema table, a first field of a rules table mapped to the first attribute, wherein the rules table is defined in the repository for the rule component;

for the action:
- identifying, based on an identifier for the second attribute, a fourth record stored in the schema table for the second attribute; and
- identifying, based on mapping data stored in the fourth record of the schema table, a second field of the rules table mapped to the second attribute; and storing a first record in the rules table for the first rule to include in the first stage of the custom workflow, wherein the condition and the action are stored for the first record in the first field and the second field, respectively.

13. The system of claim 8, wherein the operations further comprise:
- receiving, via the graphical user interface, an identifier for a domain object defined within the microservice and an identifier for the custom workflow; and
- storing a record in a workflow assignment table defined in the repository for the microservice, the record comprising mapping data that maps the domain object to the custom workflow, wherein storing the record in the workflow assignment table results in the custom workflow being made available for use with an instance generated of the domain object.

14. The system of claim 13, wherein the custom workflow being made available to the instance comprises allowing a user, through a second graphical user interface, to define properties for the first stage of the custom workflow that are applicable to the instance of the domain object.

15. A non-transitory computer-readable medium having program code that is stored thereon, the program code executable by one or more processing devices for performing operations comprising:
- receiving, via a graphical user interface communicating with at least one endpoint that is available through a microservice, a first attribute value for a custom workflow to include in the microservice, wherein the first attribute value corresponds to a first attribute defined for a workflow component that is available through the microservice;
- identifying, based on an identifier for the first attribute defined for the workflow component, a first record stored in a schema table for the first attribute, wherein the schema table is defined in a repository for the microservice;
- identifying, based on mapping data stored in the first record of the schema table, a corresponding field of a workflows table mapped to the first attribute defined for the workflow component, wherein the workflows table is defined in the repository for the workflow component;
- storing a first record in the workflows table for the custom workflow, wherein the first attribute value is stored for the first record in the corresponding field mapped to the first attribute defined for the workflow component;
- receiving, via the graphical user interface communicating with the at least one endpoint that is available through the microservice, a second attribute value for a first stage to include in the custom workflow, wherein the second attribute value corresponds to a first attribute defined for a stage component that is available through the microservice;
- identifying, based on an identifier for the first attribute defined for the stage component, a second record stored in the schema table for the first attribute defined for the stage component;
- identifying, based on mapping data stored in the second record of the schema table, a corresponding field of a stages table mapped to the first attribute defined for the stage component, wherein the stages table is defined in the repository for the stage component; and
- storing a first record in the stages table for the first stage to include in the custom workflow, wherein the second attribute value is stored for the first record in the corresponding field mapped to the first attribute defined for the stage component, and storing the first attribute value and the second attribute value persists the custom workflow in the microservice.

16. The non-transitory computer-readable medium of claim 15, wherein the operations further comprise:
- receiving, via the graphical user interface communicating with the at least one endpoint that is available through the microservice, a third attribute value for a second stage to include in the custom workflow, wherein the third attribute value corresponds to the first attribute defined for the stage component;
- identifying, based on the identifier for the first attribute defined for the stage component, the second record stored in the schema table for the first attribute defined for the stage component;
- identifying, based on the mapping data stored in the second record of the schema table, the corresponding field of the stages table mapped to the first attribute defined for the stage component; and
- storing a second record in the stages table for the second stage to include in the custom workflow, wherein the third attribute value is stored for the second record in the corresponding field mapped to the first attribute defined for the stage component.

17. The non-transitory computer-readable medium of claim 15, wherein the operations further comprise:
- receiving, via the graphical user interface communicating with the at least one endpoint that is available through the microservice, a third attribute value for a first subtask to include in the first stage of the custom workflow, wherein the third attribute value corresponds to a first attribute defined for a subtask component that is available through the microservice;
- identifying, based on an identifier for the first attribute defined for the subtask component, a third record stored in the schema table for the first attribute defined for the subtask component;
- identifying, based on mapping data stored in the third record of the schema table, a corresponding field of a subtasks table mapped to the first attribute defined for the subtask component, wherein the subtasks table is defined in the repository for the subtask component; and
- storing a first record in the subtasks table for the first subtask to include in the first stage of the custom workflow, wherein the third attribute value is stored for the first record in the corresponding field mapped to the first attribute defined for the subtask component.

18. The non-transitory computer-readable medium of claim 15, wherein the operations further comprise:

receiving, via the graphical user interface communicating with the at least one endpoint that is available through the microservice, a condition and an action for a first rule to include in the first stage of the custom workflow, wherein the condition corresponds to a first attribute defined for a rule component and the action corresponds to a second attribute defined for the rule component that is available through the microservice;

for the condition:
identifying, based on an identifier for the first attribute defined for the rule component, a third record stored in the schema table for the first attribute defined for the rule component; and
identifying, based on mapping data stored in the third record of the schema table, a first field of a rules table mapped to the first attribute defined for the rule component, wherein the rules table is defined in the repository for the rule component;

for the action:
identifying, based on an identifier for the second attribute defined for the rule component, a fourth record stored in the schema table for the second attribute defined for the rule component; and
identifying, based on mapping data stored in the fourth record of the schema table, a second field of the rules table mapped to the second attribute defined for the rule component; and storing a first record in the rules table for the first rule to include in the first stage of the custom workflow, wherein the condition and the action are stored for the first record in the first field and the second field, respectively.

19. The non-transitory computer-readable medium of claim 15, wherein the operations further comprise:

receiving, via the graphical user interface, an identifier for a domain object defined within the microservice and an identifier for the custom workflow; and storing a record in a workflow assignment table defined in the repository, the record comprising mapping data that maps the domain object to the custom workflow, wherein storing the record in the workflow assignment table results in the custom workflow being made available for use with an instance generated of the domain object.

20. The non-transitory computer-readable medium of claim 19, wherein the custom workflow being made available to the instance comprises allowing a user, through a second graphical user interface, to define properties for the first stage of the custom workflow that are applicable to the instance of the domain object.

* * * * *